(12) United States Patent
Runchey

(10) Patent No.: US 9,189,501 B2
(45) Date of Patent: Nov. 17, 2015

(54) SEMANTIC MODEL OF EVERYTHING RECORDED WITH UR-URL COMBINATION IDENTITY-IDENTIFIER-ADDRESSING-INDEXING METHOD, MEANS, AND APPARATUS

(71) Applicant: Margaret Runchey, Escondido, CA (US)

(72) Inventor: Margaret Runchey, Escondido, CA (US)

( * ) Notice: Subject to any disclaimer, the term of this patent is extended or adjusted under 35 U.S.C. 154(b) by 124 days.

(21) Appl. No.: 13/789,545

(22) Filed: Mar. 7, 2013

(65) Prior Publication Data

US 2013/0204872 A1 Aug. 8, 2013

Related U.S. Application Data

(63) Continuation-in-part of application No. 13/725,673, filed on Dec. 12, 2012, which is a continuation-in-part of application No. 12/802,058, filed on May 28, 2010, now abandoned, which is a continuation of application No. 10/231,085, filed on Aug. 29, 2002, now abandoned.

(60) Provisional application No. 60/315,923, filed on Aug. 31, 2001.

(51) Int. Cl.
*G06F 17/30* (2006.01)

(52) U.S. Cl.
CPC .... *G06F 17/30283* (2013.01); *G06F 17/30734* (2013.01)

(58) Field of Classification Search
None
See application file for complete search history.

(56) References Cited

U.S. PATENT DOCUMENTS 8,813,125 B2 * 8/2014 Reisman .......................... 725/34
2007/0112714 A1 * 5/2007 Fairweather .................... 706/46

* cited by examiner

*Primary Examiner* — Wilson Lee
(74) *Attorney, Agent, or Firm* — Sheppard Mullin Richter & Hampton LLP

(57) ABSTRACT

A computer program product embodied on a non-transitory computer readable storage medium, comprising non-transitory computer executable program code configured to perform the steps of: receiving a representation of an unlabeled event; labeling the unlabeled event according to a unitary relative event ontology; and storing the labeled event in the computer readable storage medium. The unitary relative event ontology can comprise an information description vector comprising a plurality of ontological primitives, and the plurality of ontological primitives can comprise a point description element, a reference-body description element, an observer description element, a position description element, a scene description element, and a specification description element.

15 Claims, 65 Drawing Sheets

FIG. 1 Everything
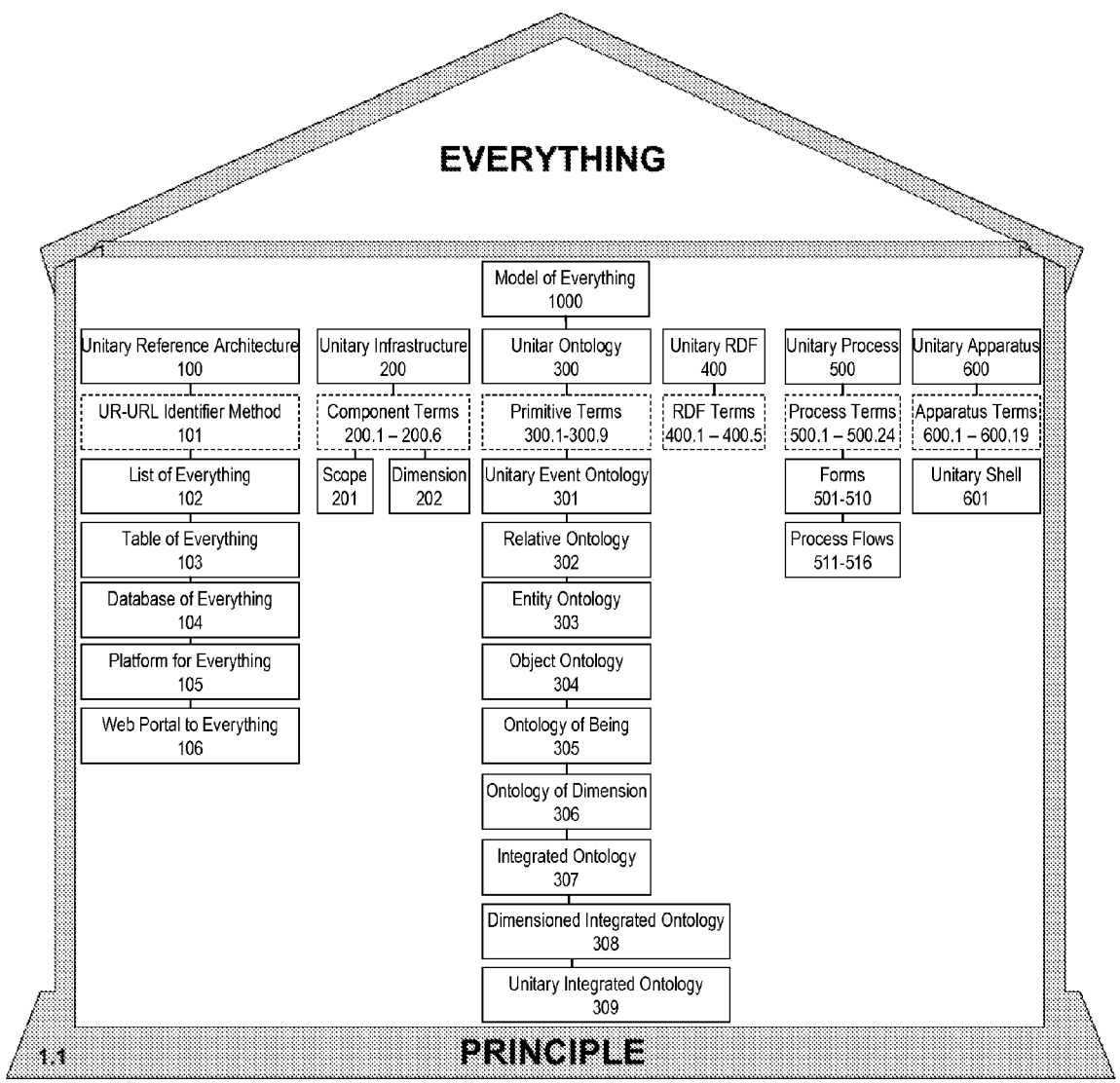

FIG. 2 Construction of Everything
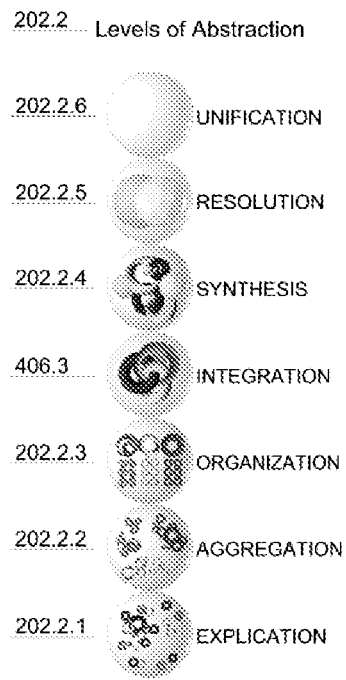
FIG. 3 Deconstruction of Everything
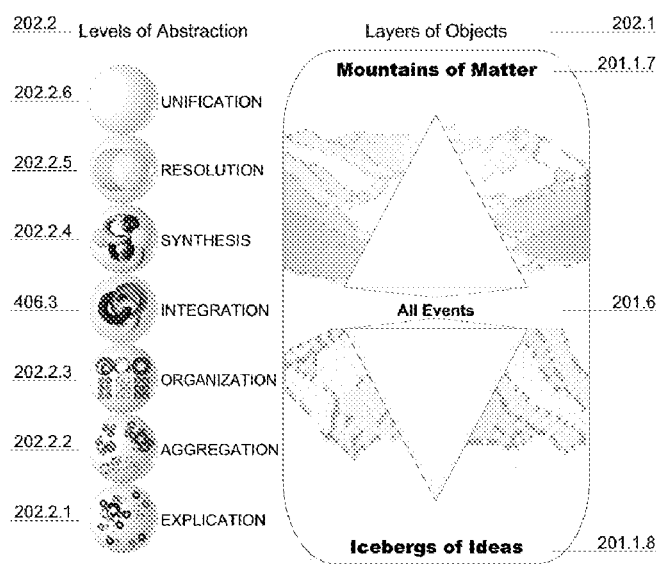

FIG. 4 Dimension of Everything
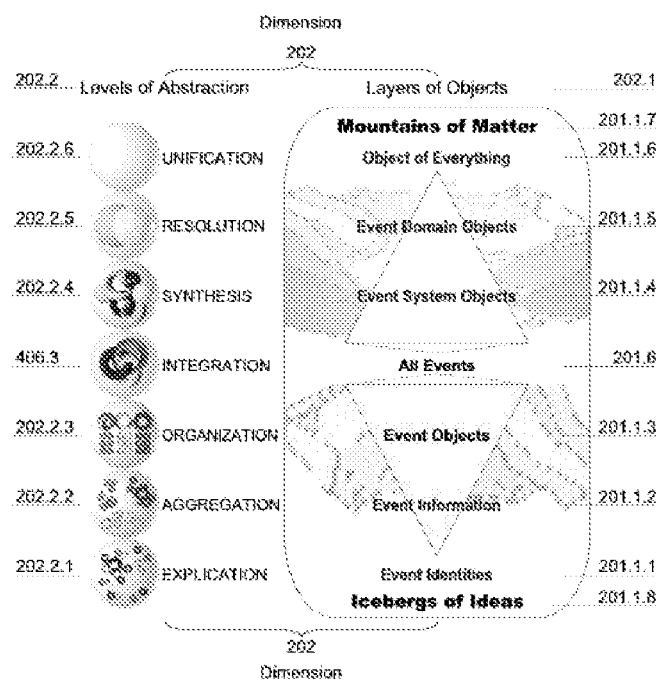
FIG. 5 Extent of Everything
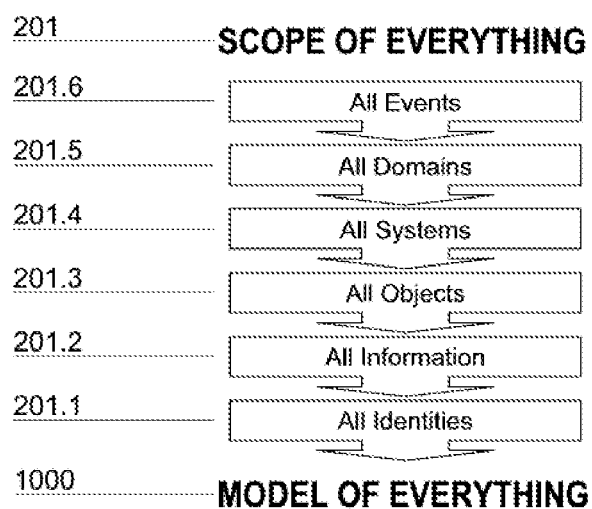

FIG. 6 Description of Everything
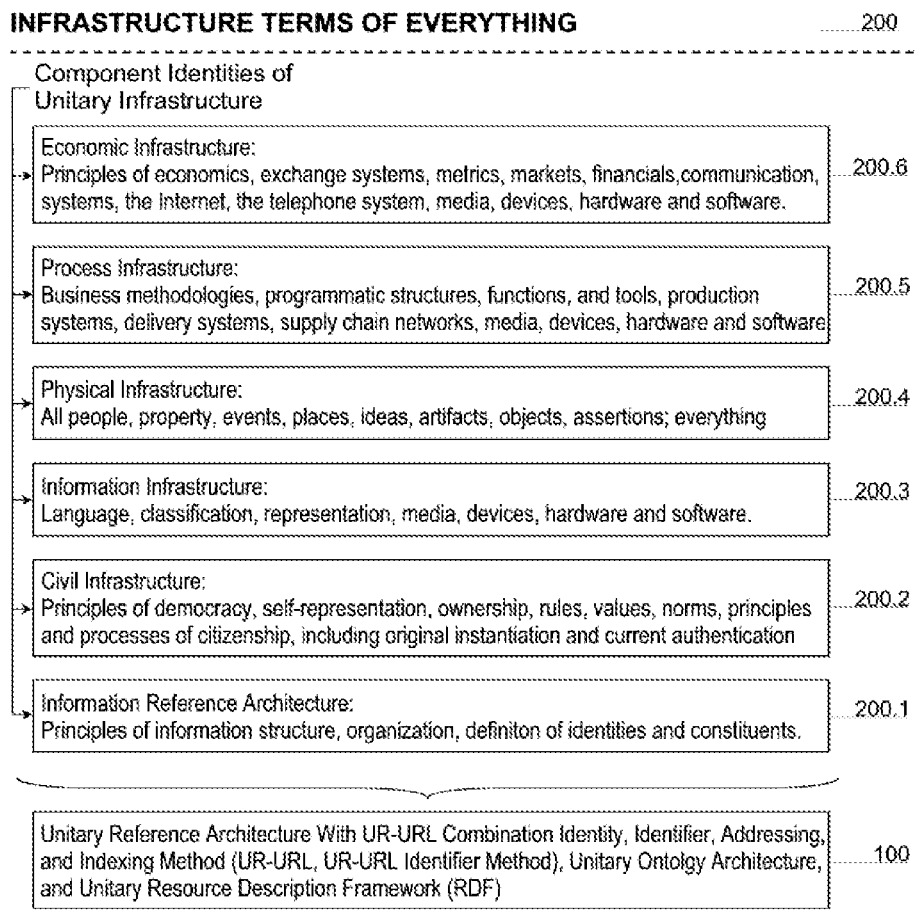
FIG. 7 Unitary Reference Architecture Components
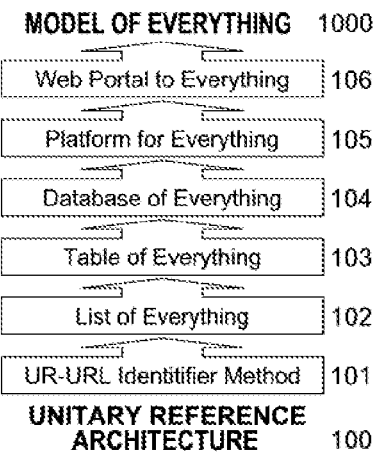

FIG. 8 Alignment of Scope and Components
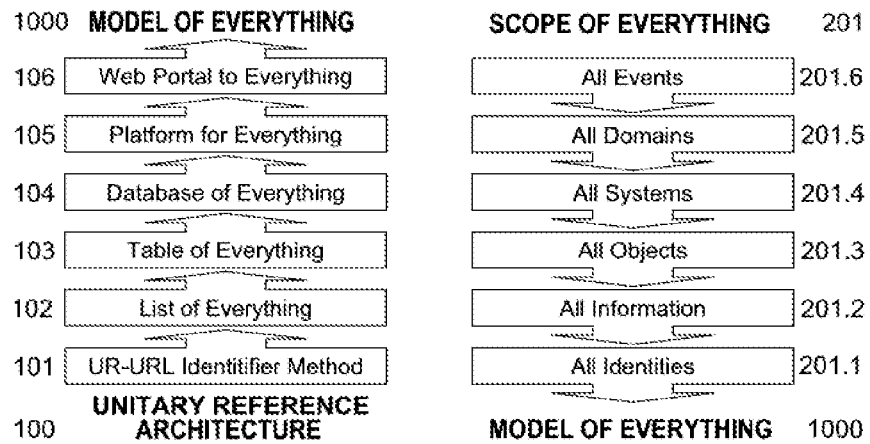
FIG. 9 Relation of Scope and Components
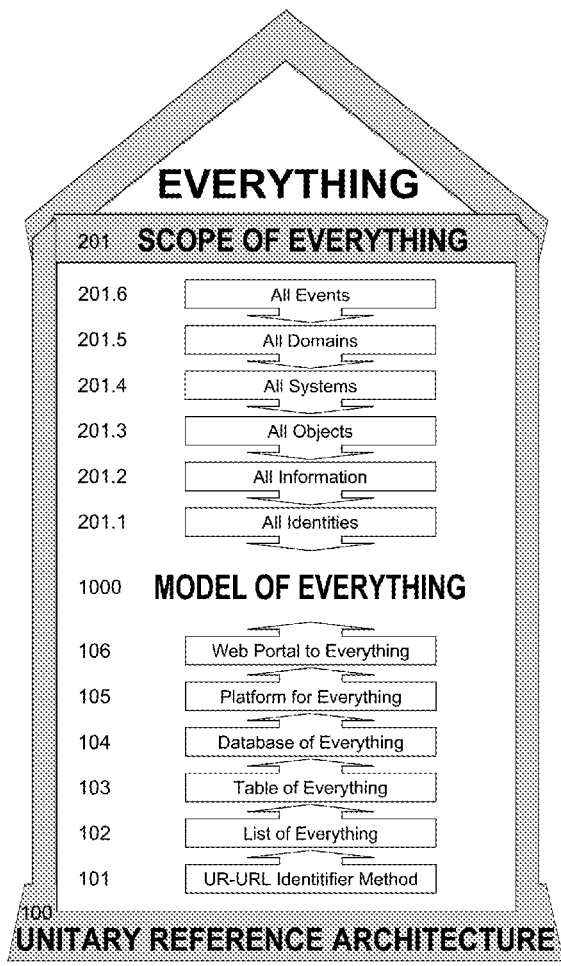

FIG. 10 Everything Components
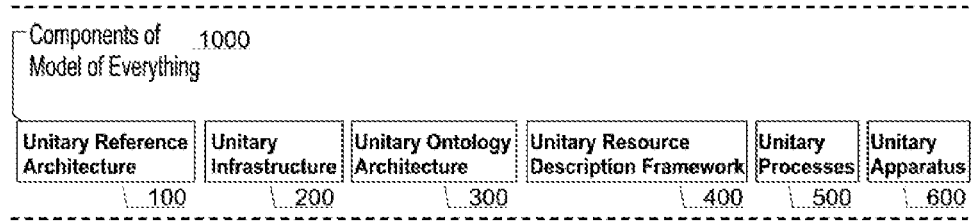
FIG. 11 Unitary Reference Architecture Components
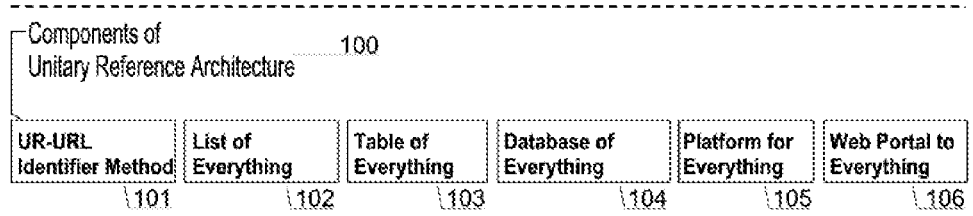
FIG. 12 UR-URL Identity Architecture Components
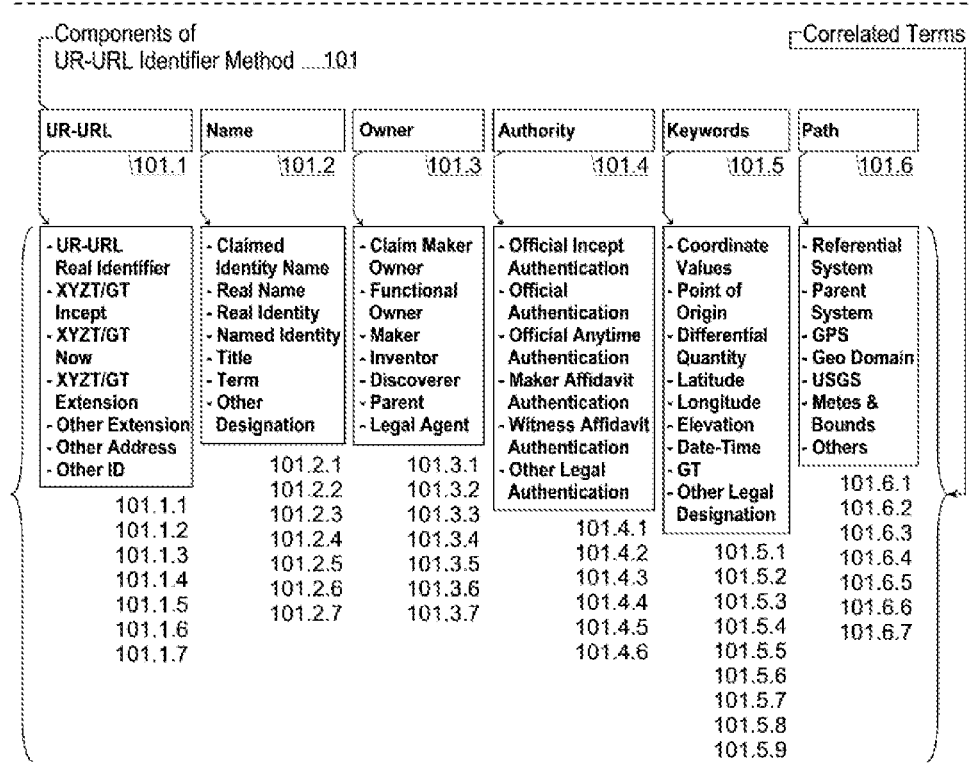

FIG. 13 List of Everything Components
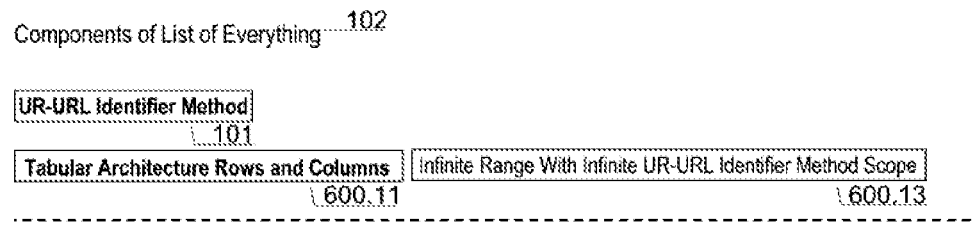
FIG. 14 List View
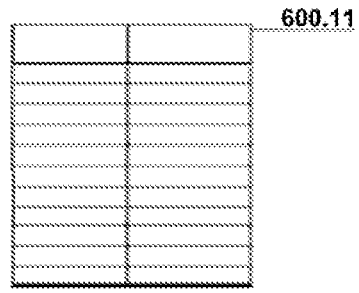
FIG. 15 List With Prior Art Reference Architecture
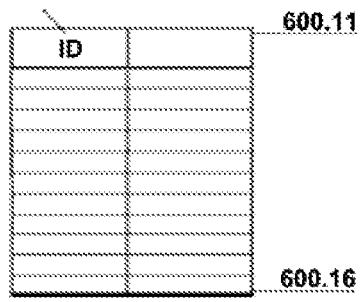
FIG. 16 List With Unitary Reference Architecture
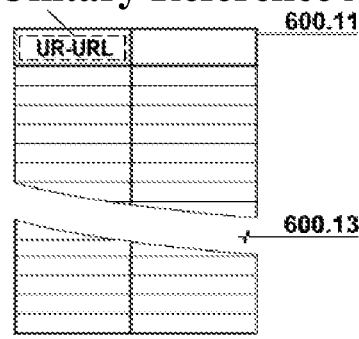

FIG. 17 Table of Everything Components
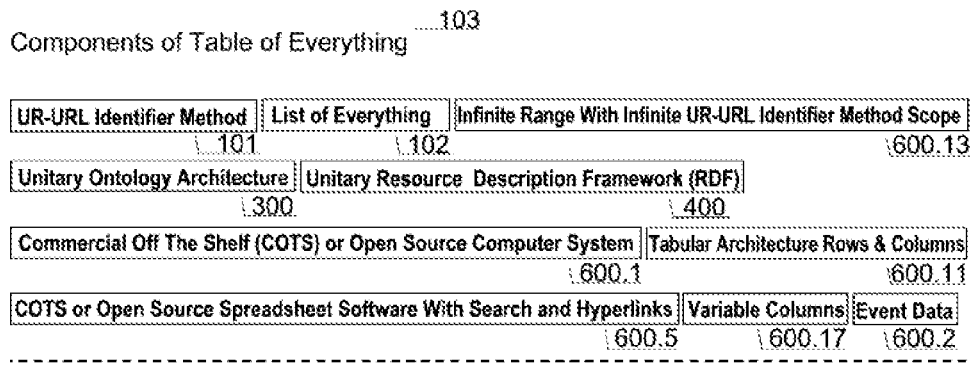
FIG. 18 Table View
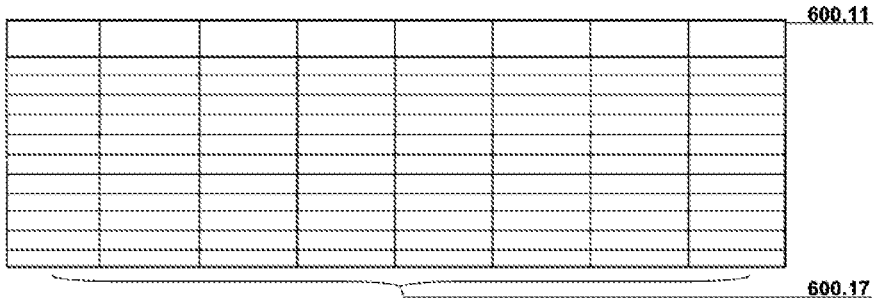
FIG. 19 Table With Prior Art Reference Architecture
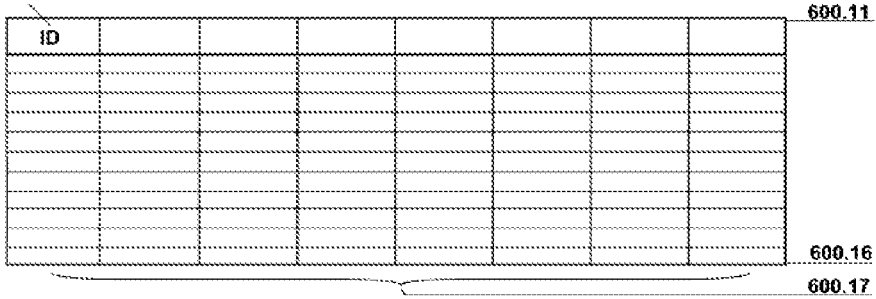
FIG. 20 Table With Unitary Reference Architecture
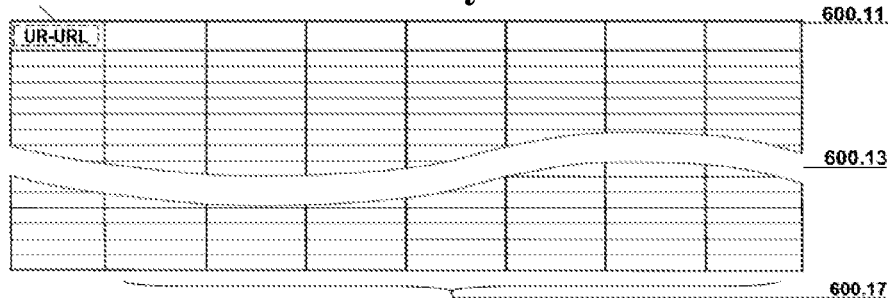

FIG. 21 Top-Level Ontology
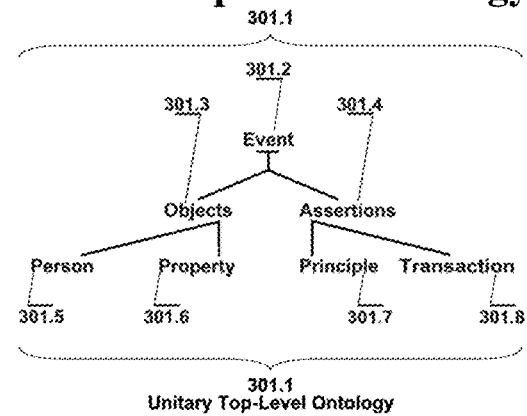
FIG. 22 Event Ontology
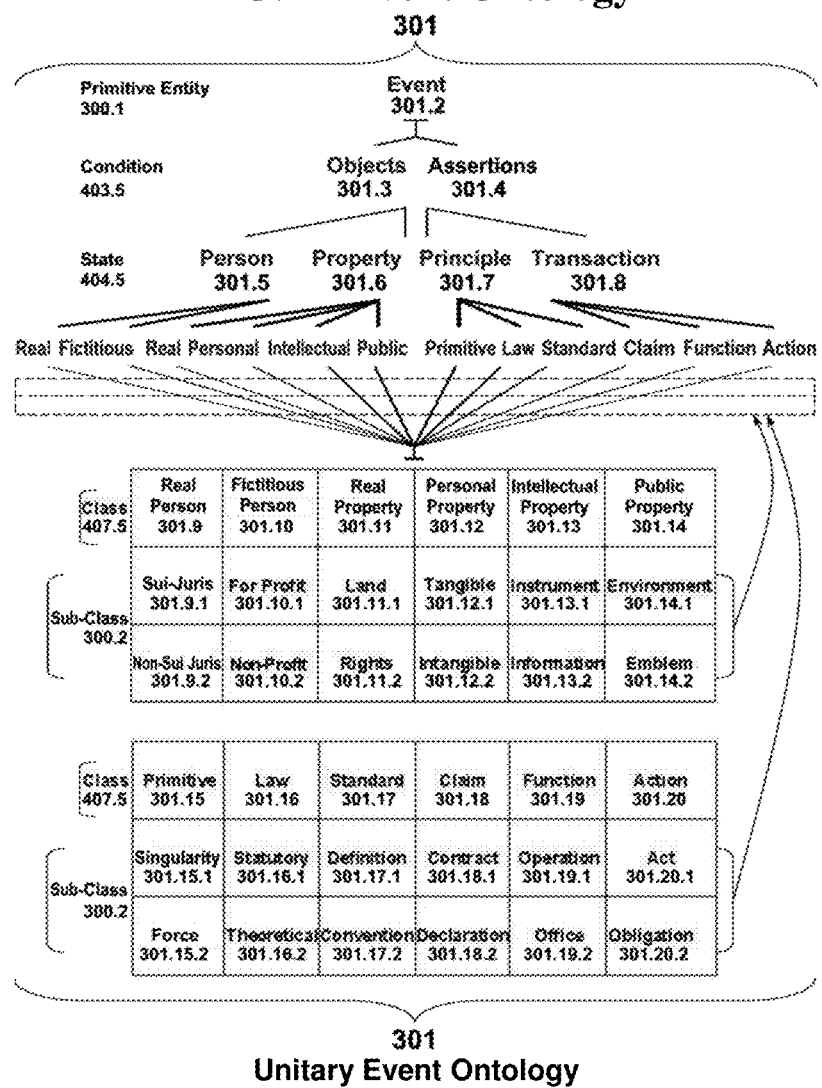

FIG. 23 Relative Event Ontology
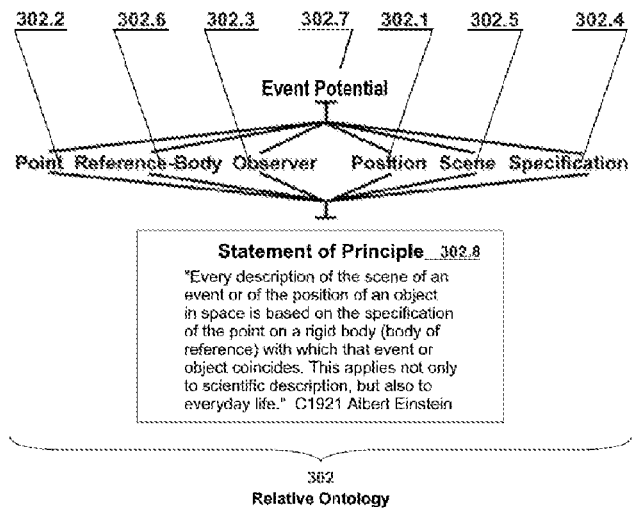
FIG. 24 Entity Ontology
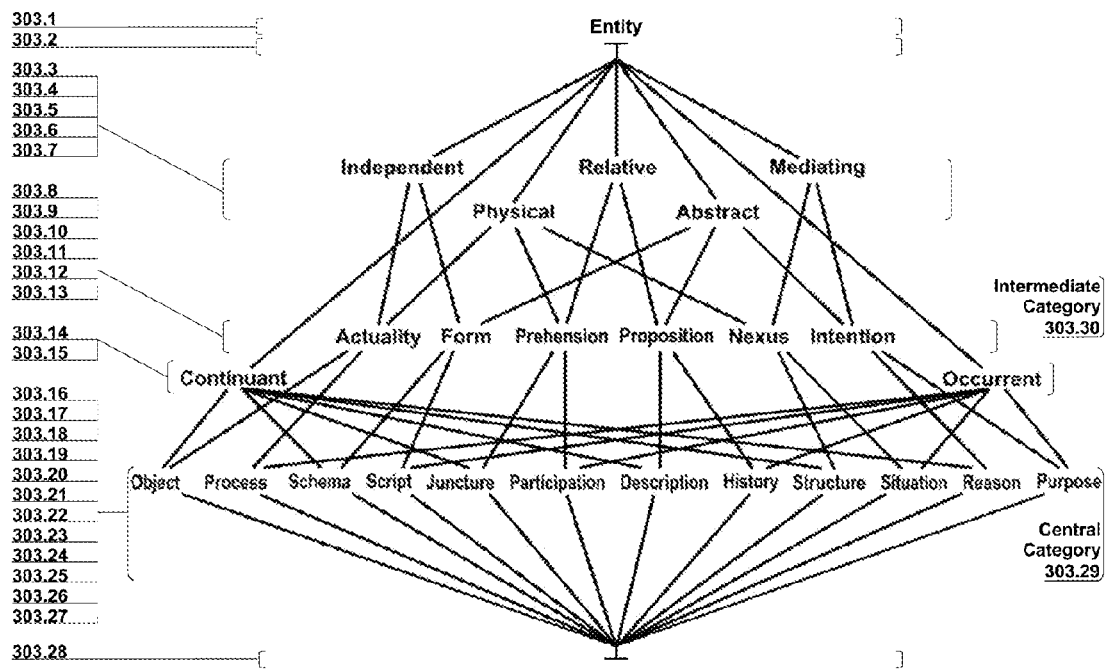

FIG. 25 Object Ontology
304
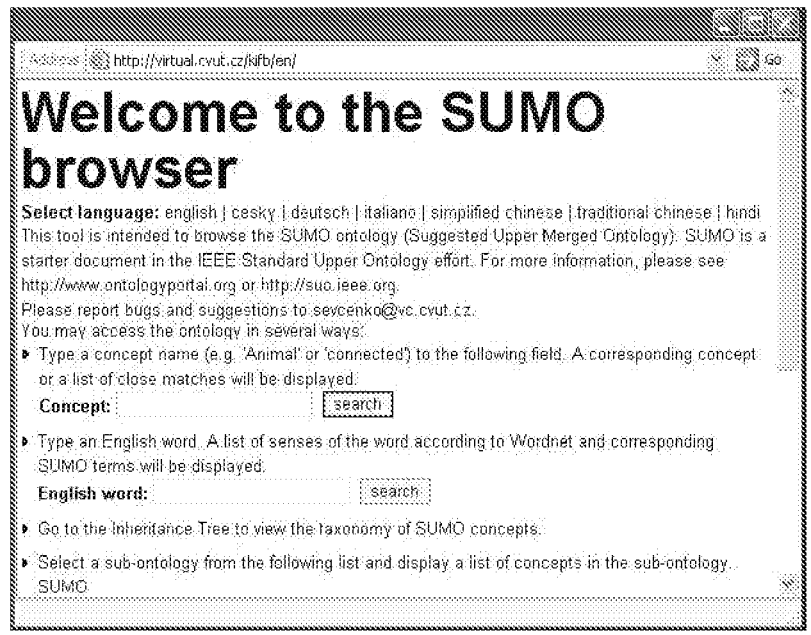
304.1
304.2
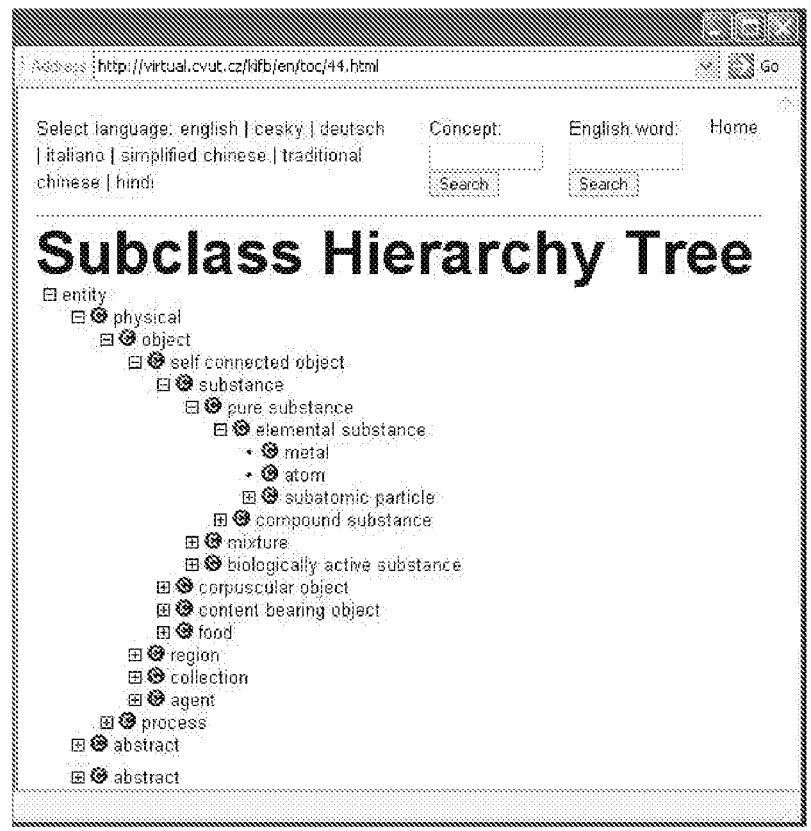

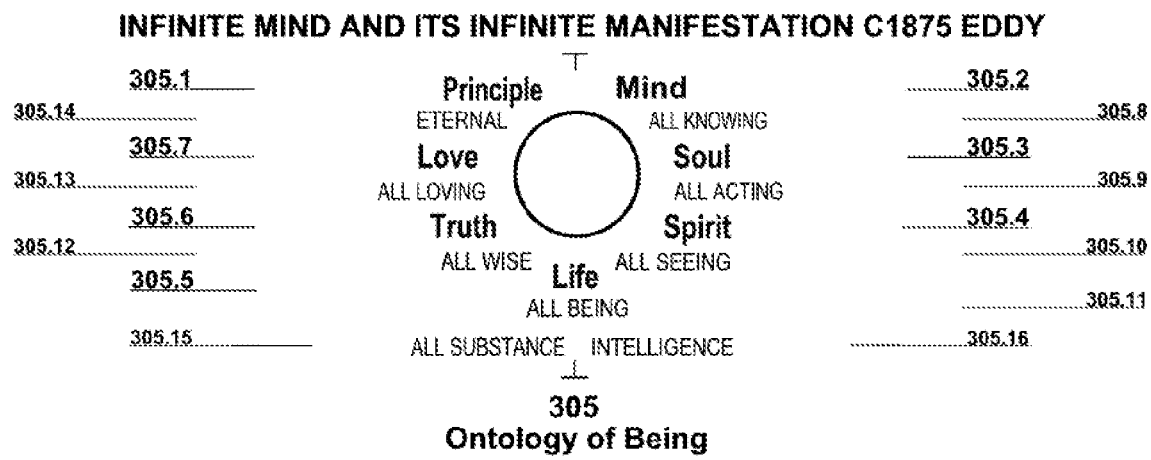
FIG. 26 Ontology of Origination
FIG. 27 Ontology of Dimension

FIG. 28 Ontological Integration
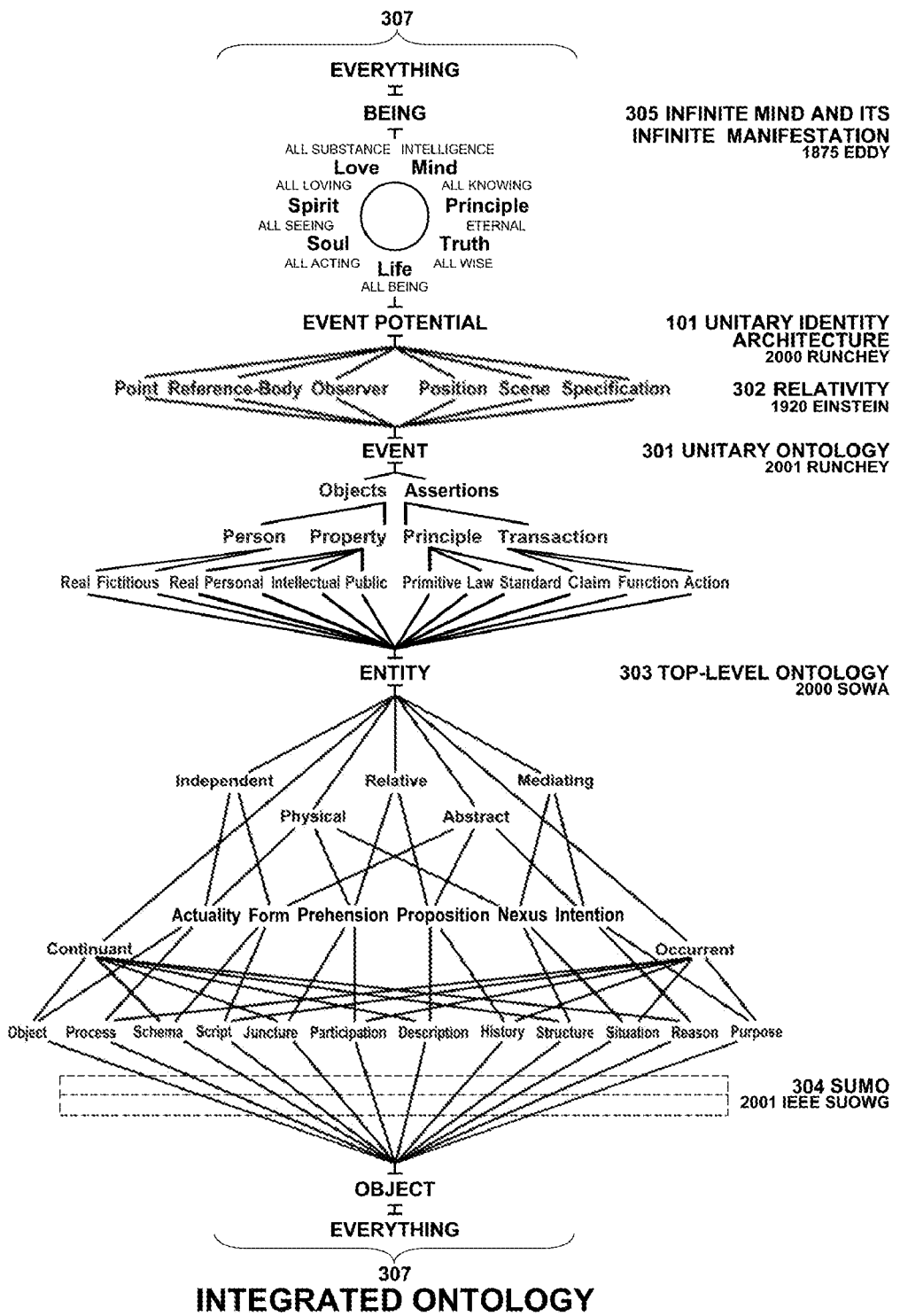
INTEGRATED ONTOLOGY

FIG. 29 Dimensional Integration
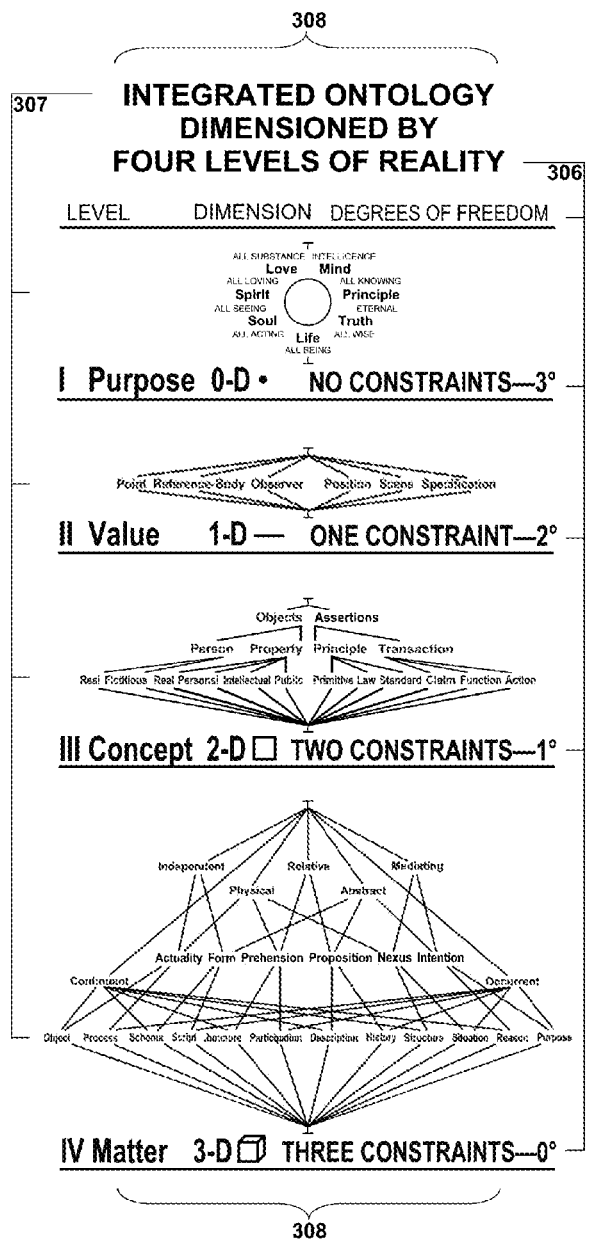

FIG. 30 Alignment Between Primitive Terms

| | | | | | | |
|---|---|---|---|---|---|---|
| Relativity 302 | Position 302.1 | Point 302.2 | Observer 302.3 | Specification 302.4 | Scene 302.5 | Reference-Body 302.6 |
| Analog 413 | Address 401.5 | Name 101.2 | Maker(s) 101.3.1 | Contract/Artifact 301.18.1 | Claim(s) 301.18 | Witness 101.4.5 |
| Sowa 303 | Proposition 303.11 | Actuality 303.8 | Prehension 303.10 | Intention 303.13 | Nexus 303.12 | Form 303.9 |
| Logic 411 | ID 101.1.7 | Bearer 411.1 | Normative Agent 411.2 | Condition of Obligation 411.3 | Obligation 411.4 | Sanction 411.5 |
| ERP 412 | ID 101.1.7 | Name 101.2 | Functional Owner 101.3..2 | Work Order/SOW 412.1 | Resources & Activities 407   408.1 | Constraints 412.2 |
| RDF Array 400 | Identifier 401 | Identity 402 | Origin 403 | Agreement 404 | Constituents 405 | System 406 |
| URA Terms 101 | UR-URL 101.1 | Name 101.2 | Owner 101.3 | Authority 101.4 | Keyword 101.5 | Path 101.6 |

409
Resource Description Synthesis

FIG. 31 Matrix of Ontological Terms

| | IDENTIFIER 401 | IDENTITY 402 | ORIGIN 403 | AGREEMENT 404 | CONSTITUENT 405 | SYSTEM 406 | RESOURCE 407 | RELATION 408 |
|---|---|---|---|---|---|---|---|---|
| RDF ARRAY 400 | | | | | | | | |
| EXPRESSION 400.5 | Address 401.5 | Element 402.5 | Condition 403.5 | State 404.5 | Category 405.5 | Domain 406.5 | Class 407.5 | Union 408.5 |
| ASPECT 400.4 | Uniqueness 401.4 | Representation 402.4 | Inception 403.4 | Legitimacy 404.4 | Composition 405.4 | Orientation 406.4 | Eligibility 407.4 | Context 408.4 |
| PURPOSE 400.3 | Differentiation 401.3 | Designation 402.3 | Ownership 403.3 | Instantiation 404.3 | Classification 405.3 | Integration 406.3 | Utilization 407.3 | Operation 408.3 |
| SET 400.2 | Record 401.2 | Register 402.2 | Ontology 403.2 | Concordance 404.2 | Taxonomy 405.2 | Architecture 406.2 | Pool 407.2 | Model 408.2 |
| LOGIC: HAS 400.1 | Has UR-URL 401.1 | Has Name 402.1 | Has Owner 403.1 | Has Authority 404.1 | Has Keyword 405.1 | Has Path 406.1 | Has Profile 407.1 | Has Activity 408.1 |

410
Resource Description Matrix

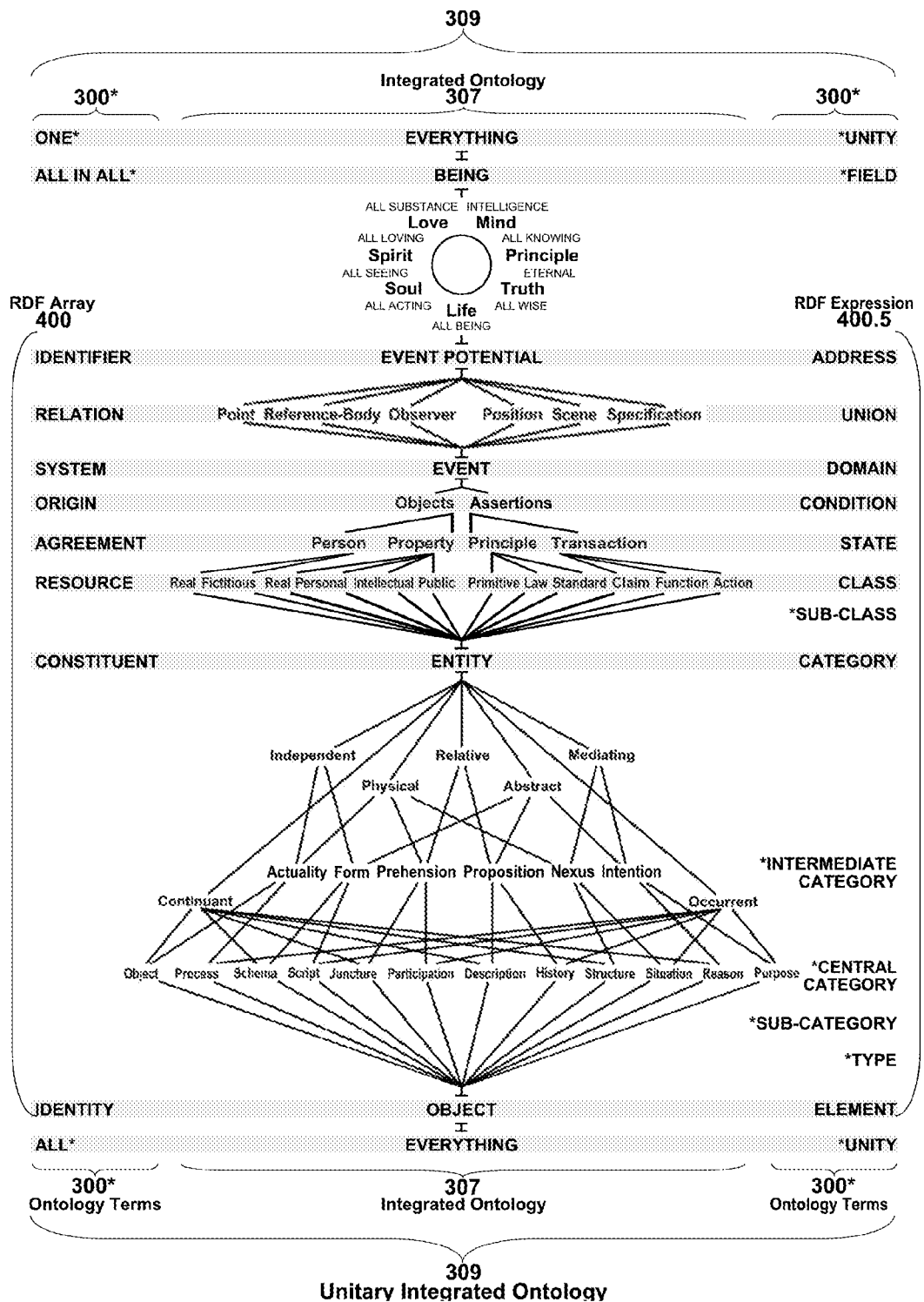
FIG. 32 Ontology of Everything

FIG. 33 Table With Unitary Resource Description Framework
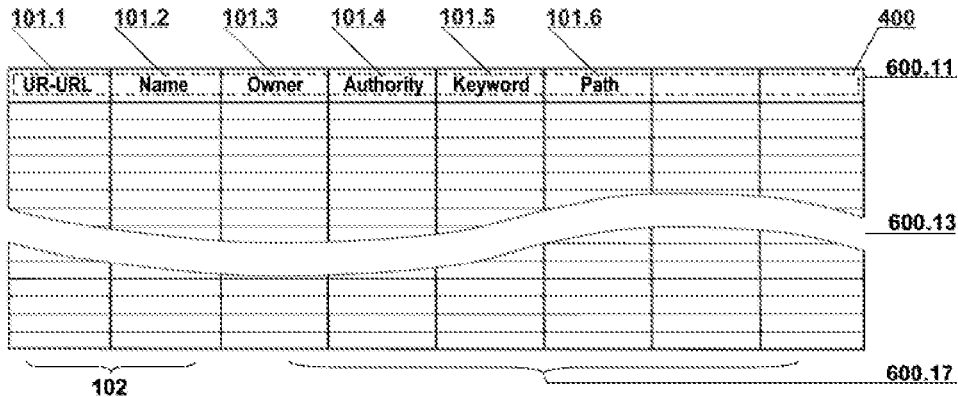
FIG. 34 Table With Extended Unitary Resource Description Framework
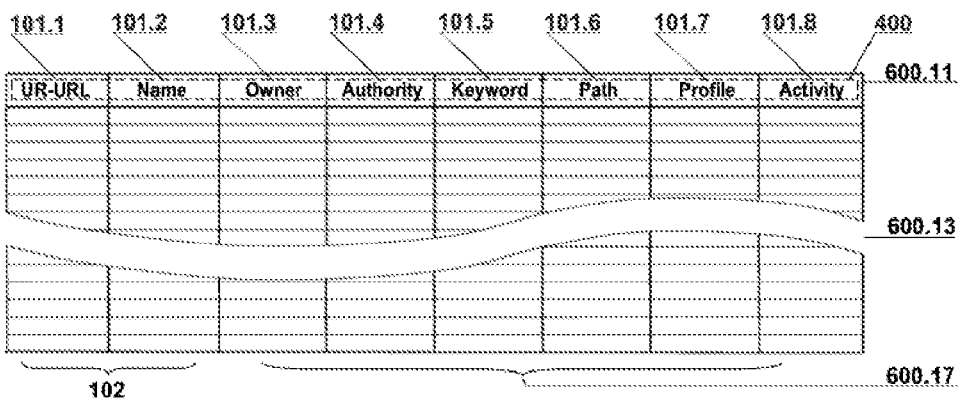
FIG. 35 Table With Simple Unitary Resource Description Framework
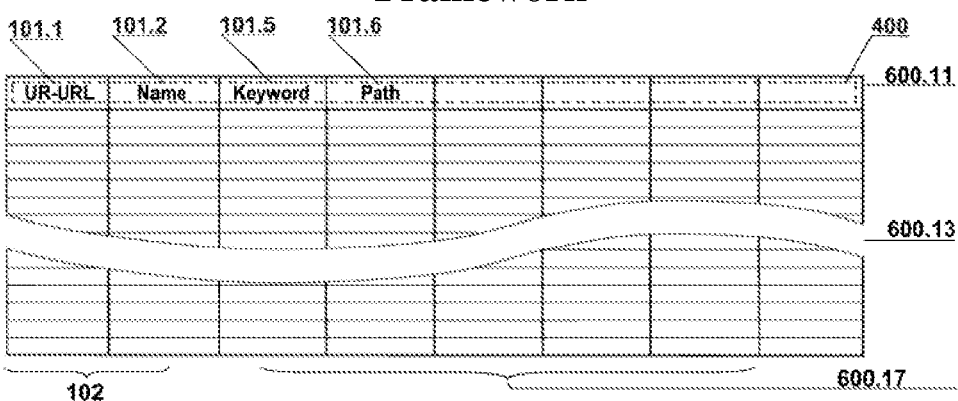

FIG. 36 Table With Unitary Reference Architecture, Ontology, RDF, Hardware and Software
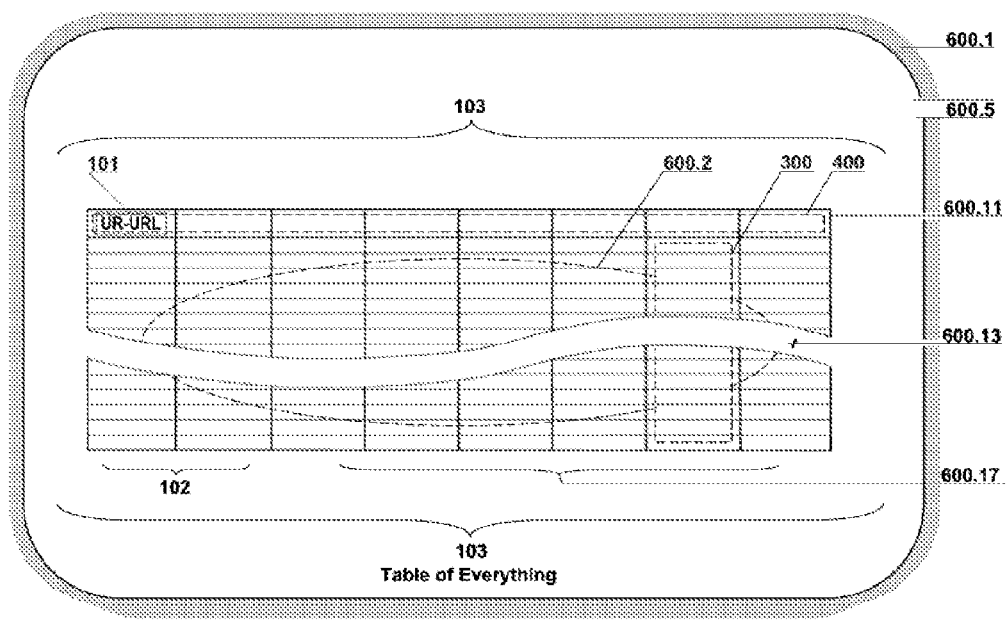

FIG. 37 Database of Everything Components
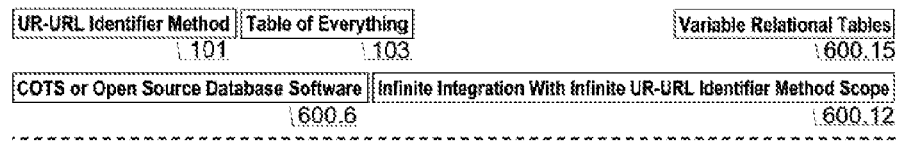
FIG. 38 Database View
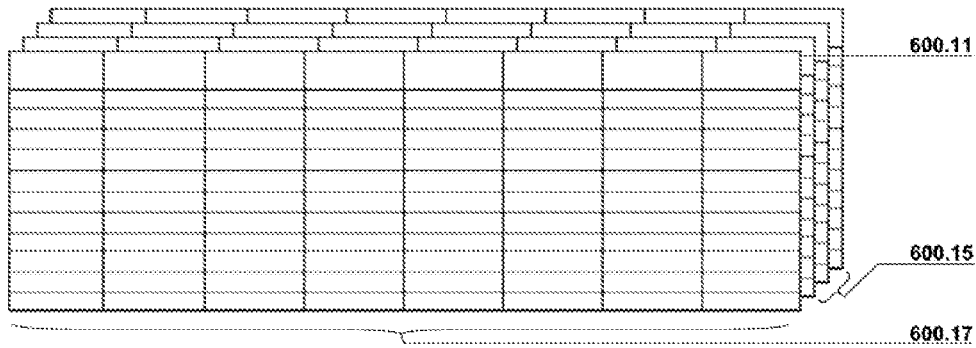
FIG. 39 Database With Prior Art Reference Architecture
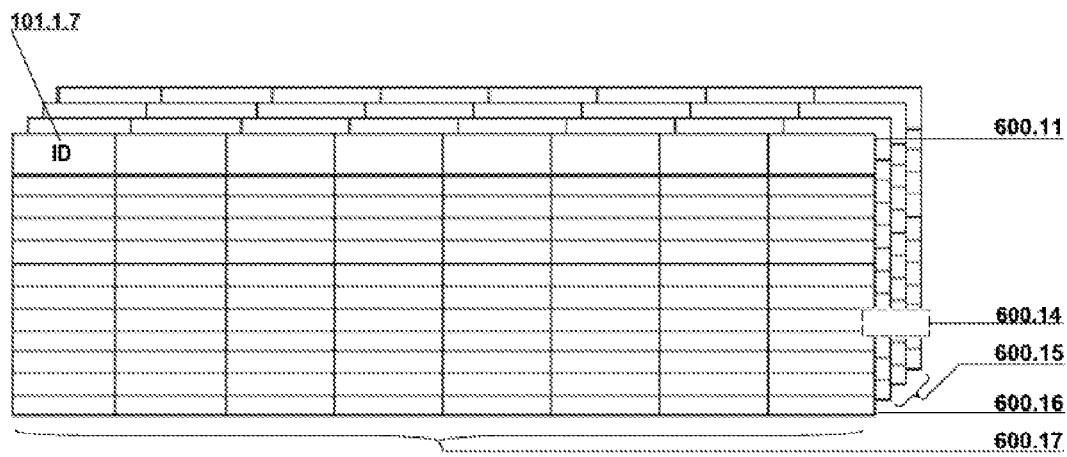

FIG. 40 Database With Unitary Reference Architecture
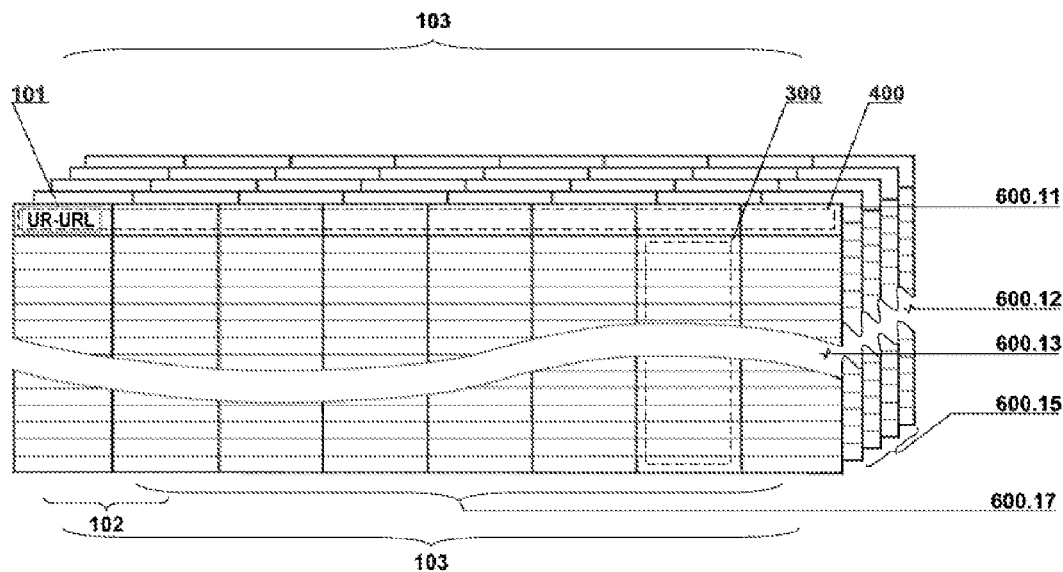
FIG. 41 Database With Unitary Reference Architecture, Ontology, RDF, Hardware and Software
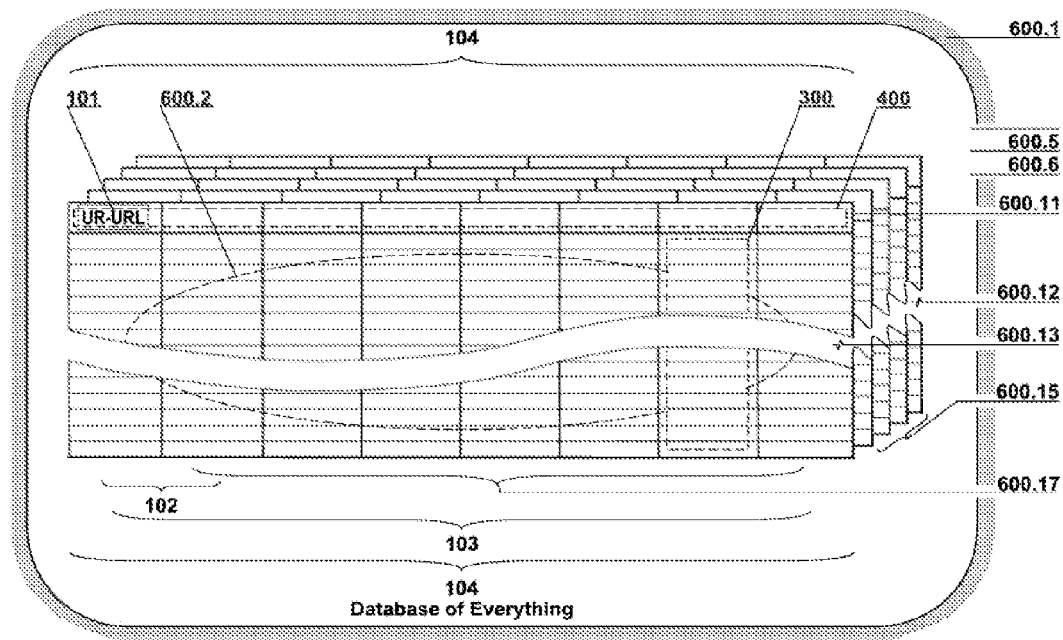

FIG. 42 Platform for Everything Components
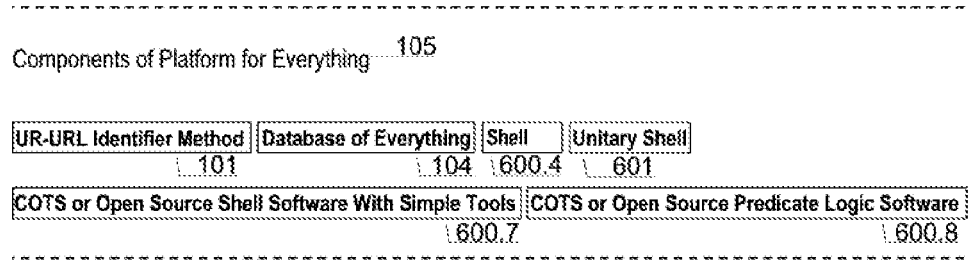
FIG. 43 Platform View
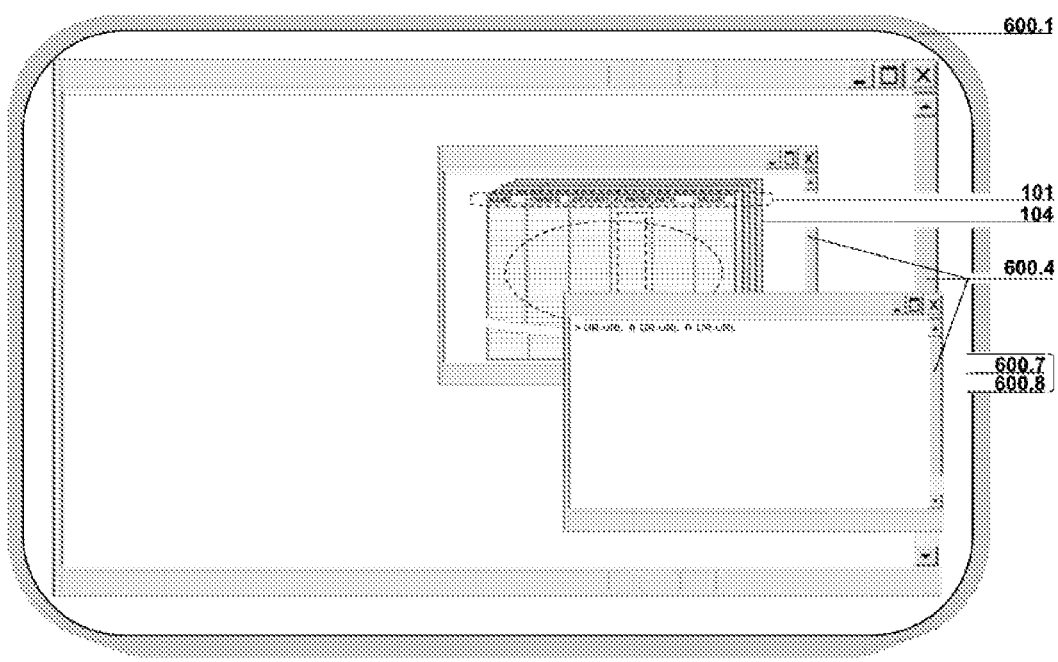

FIG. 44 Identity Expressions

UNITARY ENTITY IDENTITY STATEMENT     501.1

| Entity | | Assertion |
|---|---|---|
| Name | ∩ | UR-URL |

---

UNITARY EVENT OWNERSHIP STATEMENTS 501.2

| Entity | | Object | | Assertion |
|---|---|---|---|---|
| UR-URL | ∩ | Name | ∩ | UR-URL |

| Entity | | Object | | Assertion |
|---|---|---|---|---|
| UR-URL | ∩ | UR-URL | ∩ | Properties |

---

UNITARY OBJECT IDENTITY STATEMENT     501.3

| Event | | Objects | | Assertions |
|---|---|---|---|---|
| UR-URL | ∩ | Names | ∩ | Properties |
| | | | | |
| | | | | |
| | | | | |
| | | | | |
| | | | | |
| | | | | |

---

UNITARY EVENT IDENTITY STATEMENT     501.4

| Event | | Objects | | | | | | Assertions | | | | | |
|---|---|---|---|---|---|---|---|---|---|---|---|---|---|
| Identifier | ∩ | Identity | ∩ | Origin | ∩ | Agreement | ∩ | Constituents | ∩ | System | 400 | } | 409 |
| UR-URL | ∩ | Name | ∩ | Owner | ∩ | Authority | ∩ | Keyword | ∩ | Path | 101 | | |
| | | | | | | | | | | | | | |
| | | | | | | | | | | | | | |
| | | | | | | | | | | | | | |
| | | | | | | | | | | | | | |

⎫ 501
Event Identity Forms

FIG. 45 Logical Expressions

TUPLE STATEMENT 502.1
ID
∩ Subject    ∩ Predicate    ∩ Object

---

UNITARY TUPLE STATEMENT 502.2
UR-URL
∩ UR-URL    ∩ UR-URL    ∩ UR-URL

---

N-TUPLE STATEMENT 502.3
ID
∩ Bearer    ∩ Sanction    ∩ NormAgent    ∩ Obligation    ∩ Condition

---

UNITARY N-TUPLE STATEMENT 502.4
UR-URL
∩ UR-URL    ∩ UR-URL    ∩ UR-URL    ∩ UR-URL    ∩ UR-URL

502
Tuple Forms

FIG. 46 Correspondence Between Expressions
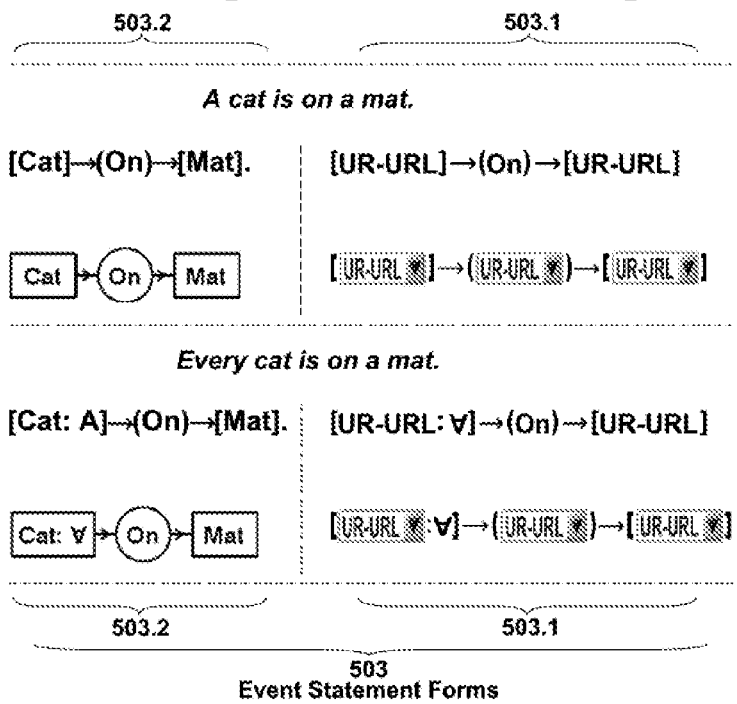
503
Event Statement Forms
FIG. 47 Description Expressions
SINGLE ENTRY ——— 504.1
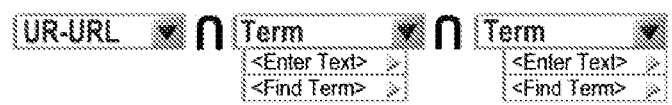
MULTIPLE ENTRIES ——— 504.2
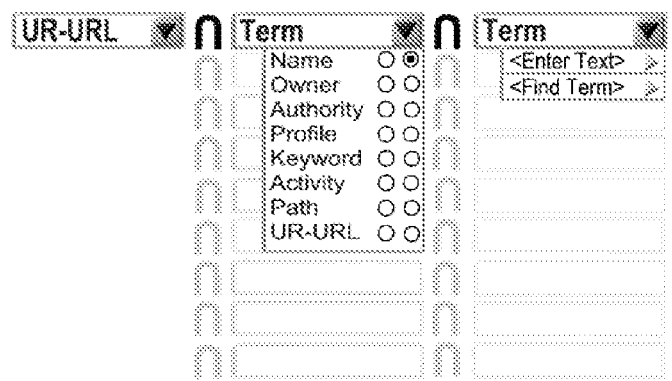
504
Event Description Forms

FIG. 48 Programmatic Expressions

RESOURCE PLANNING 505.1

| Event | Resource | Constituent | Relation | Value |
|---|---|---|---|---|
| UR-URL ∩ | Object ∩ | Assertion ∩ | Function ∩ | Term |
| Enterprise ○ | Program ○ | Description ○ | Function ○ | \<Enter Text\> |
| Component ○ | Project ○ | Duration ○ | Process ○ | \<Find Term\> |
| Division ○ | Activity ○ | Resource ○ | Obligation ○ | |
| Department ○ | Task ⊙ | Material ○ | Role ○ | |
| Work Center ○ | Step ○ | Equipment ○ | Relation ○ | |
| Work Station ○ | More ▸ | Cost ○ | Action ○ | |
| Crew ○ | | Constraint ⊙ | Predicate ○ | |
| Person ⊙ | | Calendar ○ | Operation ○ | |
| More ▸ | | More ▸ | Argument ○ | |
| | | | Predecessor ⊙ | |
| | | | Successor ○ | |
| | | | Vector ○ | |
| | | | Graph ○ | |
| | | | More ▸ | |

OPERATIONS SEQUENCING 505.2

| Event | Sequence |
|---|---|
| UR-URL ∩ | UR-URL |
| | UR-URL |
| | UR-URL |
| | UR-URL |

BINARY PAIRS 505.3

| Event ID | Resource ID |
|---|---|
| UR-URL ∩ | UR-URL |
| UR-URL | UR-URL |
| UR-URL | UR-URL |
| UR-URL | UR-URL |

505
Programmatic Forms

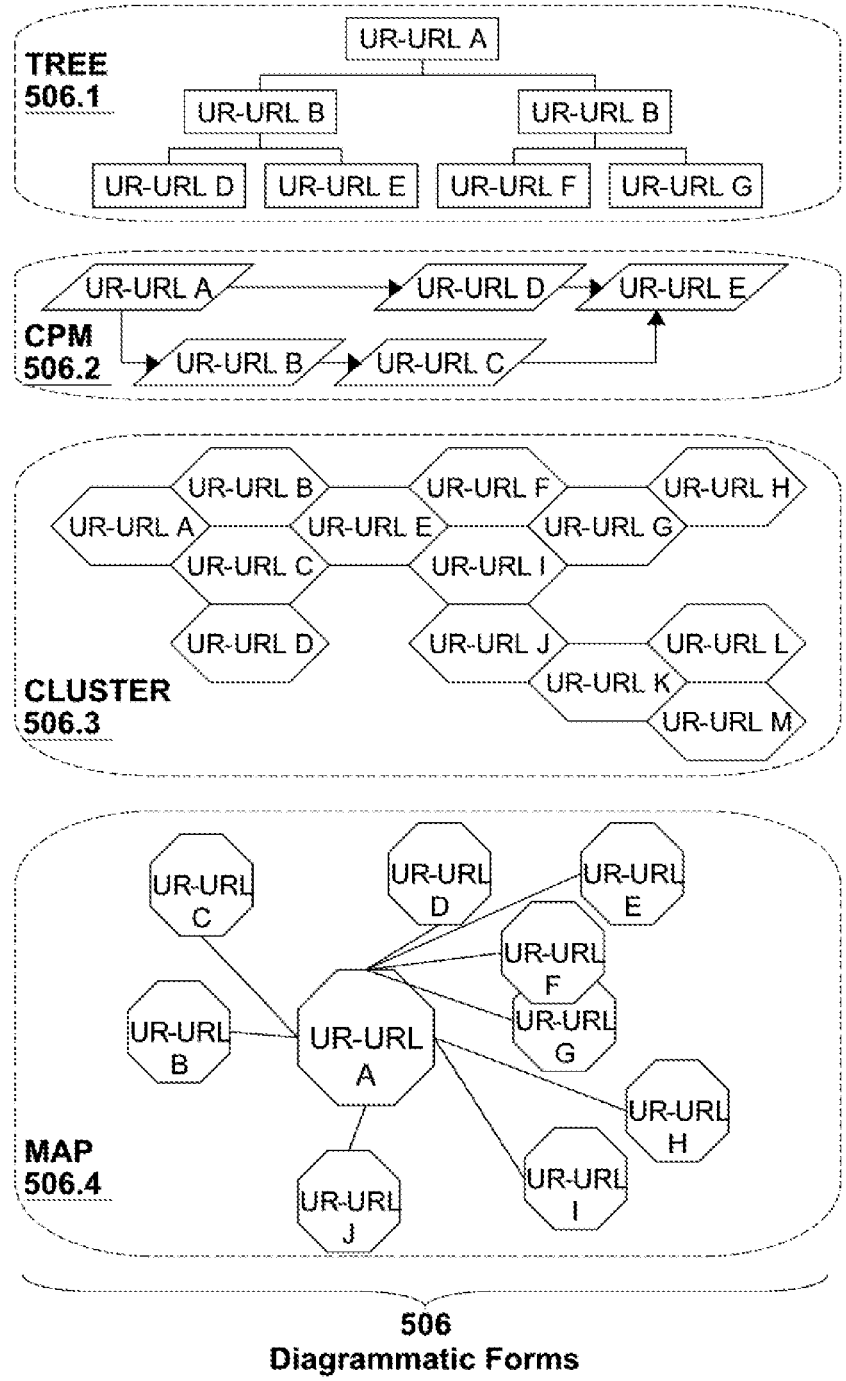
FIG. 49 Diagrammatic Expressions
506 Diagrammatic Forms

FIG. 50 Menu Expressions

PRIOR ART MENUS 507.1

Main Menus
- File
- Edit
- View
- Insert
- Format
- Tools
- Window
- Help

Drop-Down Menus
File
- New
- Open
- Close
- Save
- Save As
- Save as web page
- Versions
- Web page preview
- Page set-up
- Print preview
- Print
- Send to
- Properties
- Exit

Drop-Down Sub-Menus
File
- New
  - New File [Pop-Up Window]
  - Help [? On clickbox]
  - Cancel [X on click box]
  - General [tab]
    - Blank document [icon]
    - Web page [icon]
    - Email message [icon]
  - Direct mail manager [tab]
  - Legal pleadings [tab]
  - Letters and faxes [tab]
  - Memos [tab]
  - Other documents [tab]
  - Publications [tab]
  - Reports [tab]
  - Web pages [tab]
  - Business planner templates [tab]
  - Preview [window]
  - Create new [bullseye select]
  - OK [on clickbox]
  - Cancel [on clickbox]

PRIOR ART MENU EXPRESSIONS 507.2

| Main Menus | Sub Menus | Sub Menus | Sub Menus |
|---|---|---|---|
| Object | Object | Object | Object |
| File | New | New File | Blankdocument |
| Edit | Open | Help | Webpage |
| View | Close | Cancel | Emailmessage |
| Insert | Save | General | |
| Format | SaveAs | Directmailmgr | |
| Tools | SaveAsHtml | Legalpleads | |
| Window | Versions | Lettersfaxes | |
| Help | Webpreview | Memos | |
| | Pageset-up | Otherdocs | |
| | Printpreview | Publications | |
| | Print | Reports | |
| | Sendto | Webpages | |
| | Properties | Businessplan | |
| | Exit | Preview | |
| | | Createnew | |
| | | OK | |
| | | Cancel | |

507
Menu Forms

FIG. 51 Prior Art Menu Synthesis and Simplification

508

| | 508.2.1 | 508.2.2 | 508.2.3 | 508.2.4 | 508.2.5 | 508.2.6 | 508.2.7 | 508.2.8 | 508.2.9 | 508.2.10 | 508.2.11 | 508.2.12 |
|---|---|---|---|---|---|---|---|---|---|---|---|---|
| | WEB | MAIL | WP | HTM-ED | SS | DB | GRFX | PRES | PUB | PNT | PM | PROC |
| | File | File | File | File | File | File | File | File | File | File | File | File |
| | Edit | Edit | Edit | Edit | Edit | Edit | Edit | Edit | Edit | Edit | Edit | Edit |
| | View | View | View | View | View | View | View | View | View | View | View | View |
| | | | Insert | Insert | Insert | Insert | Insert | Insert | Insert | | Insert | Insert |
| | | | Format | Format | Format | | Format | Format | Format | | Format | Format |
| | Tools | Tools | Tools | Tools | Tools | Tools | Tools | Tools | Tools | | Tools | Tools |
| | Favorites | Favorites | Table | Table | Data | | Effects | Slideshow | Table | Image | Project | Link |
| | Search | Actions | | Frames | | | Arrange | | Arrange | Colors | | |
| | Address | Contacts | | | | | | | Mailmerge | | | |
| | Links | | | | | | | | | | | |
| | | | Window | Window | Window | Window | Window | Window | | | Window | Window |
| | Help | Help | Help | Help | Help | Help | Help | Help | Help | Help | Help | Help |

Twelve Program Objects—One Hundred and Five Menu Objects 508.1

| 508.1.1 | 508.1.2 | 508.1.3 | 508.1.4 | 508.1.5 | 508.1.6 | 508.1.7 | 508.1.8 | 508.1.9 | 508.1.10 | 508.1.11 |
|---|---|---|---|---|---|---|---|---|---|---|
| File | Edit | View | Insert | Format | Tools | Table | Data | Function | Window | Help |
| Favorites | | | | Image | | | | Action | Arrange | |
| Search | | | | Colors | | | | Project | Frames | |
| Address | | | | Effects | | | | Mailmerge | | |
| Links | | | | | | | | Slideshow | | |
| | | | | | | | | Contacts | | |

One Platform—Twenty-Five Menu Objects 508.2

508
Menu Synthesis

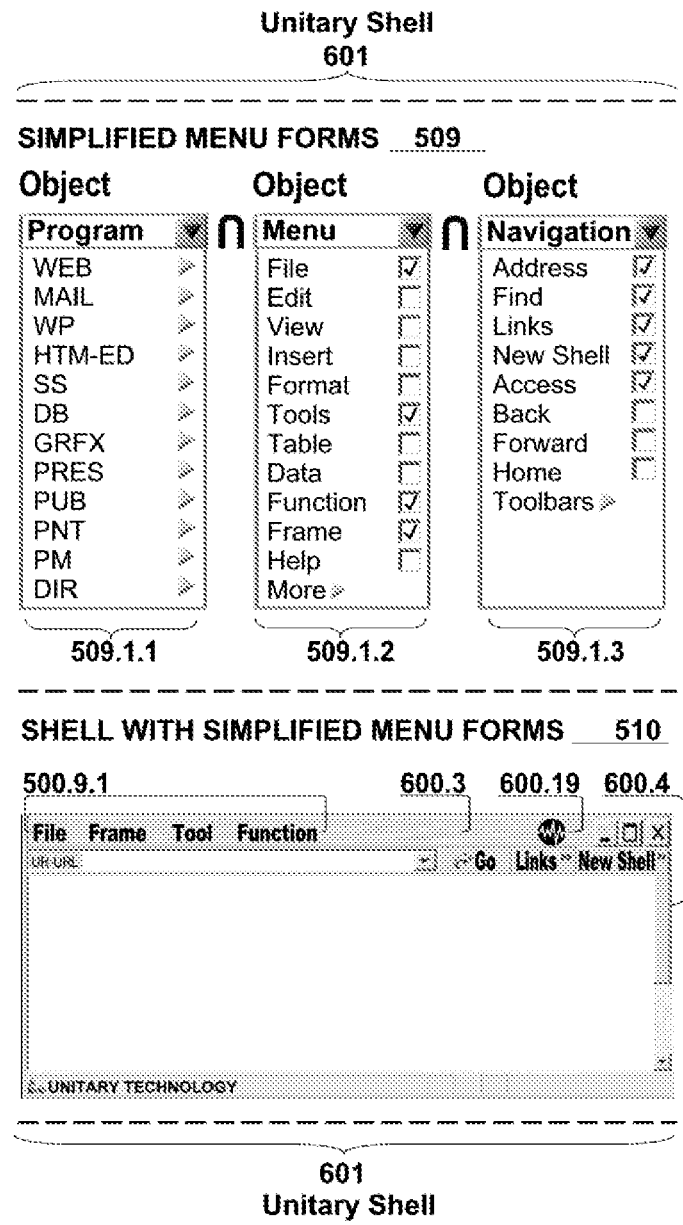
FIG. 52 Simplified Menu Expression

FIG. 53 Unitary Platform
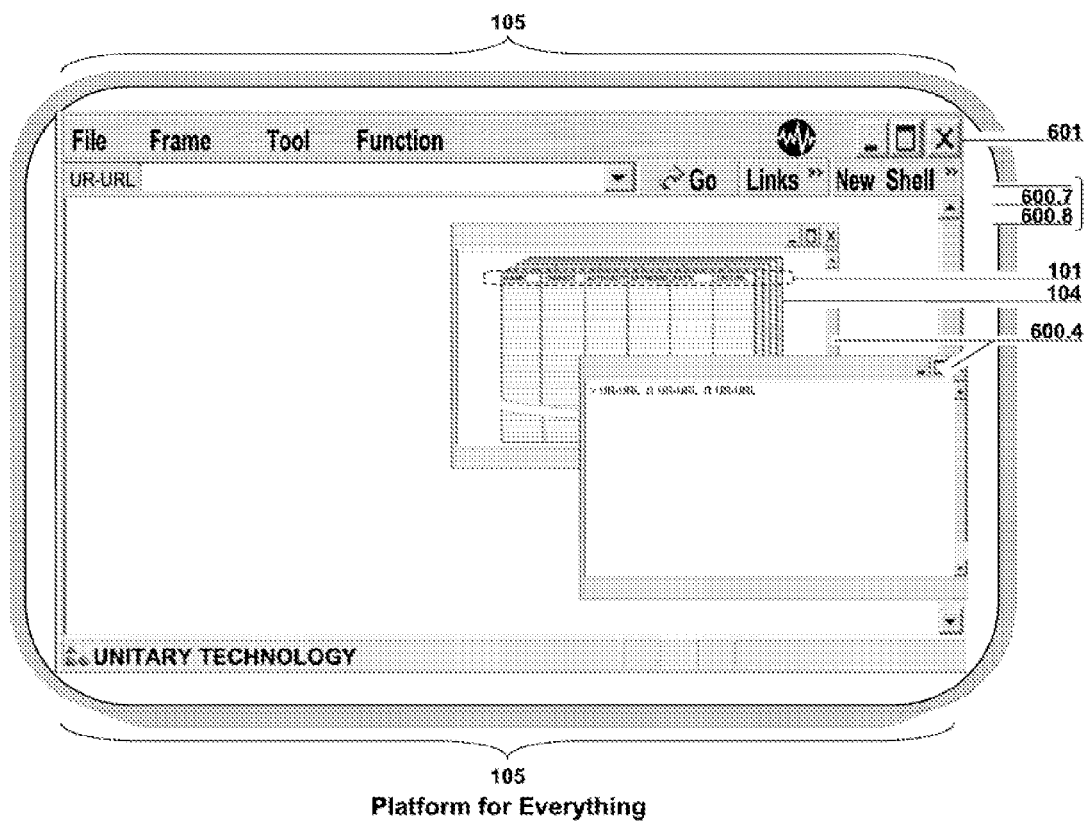
FIG. 54 Current Embodiment Access Process
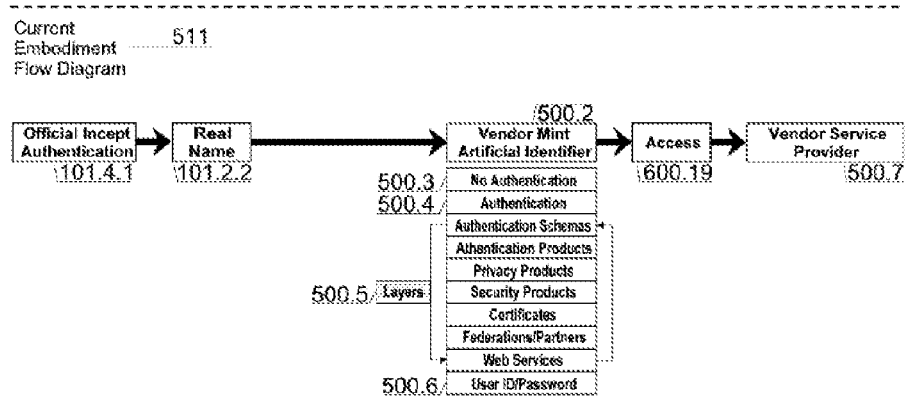

FIG. 55 Web Services Vendor Mint Access Process
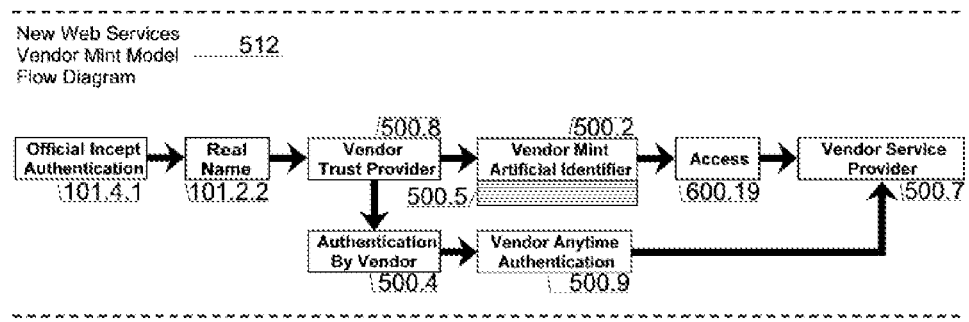
FIG. 56 Worst Case Future Vendor Mint Access Process
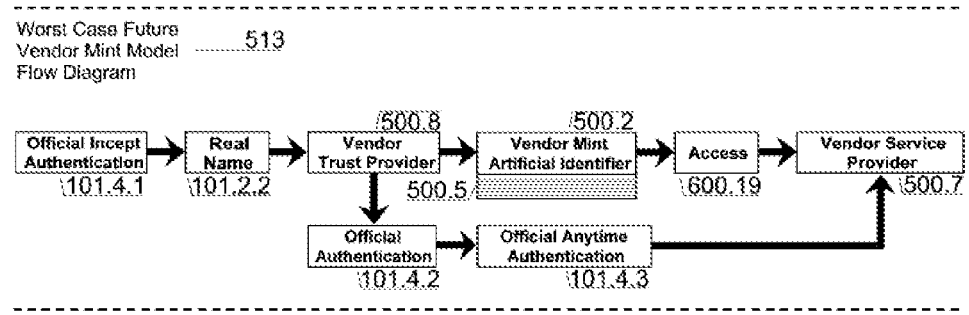
FIG. 57 Present Invention Access Process
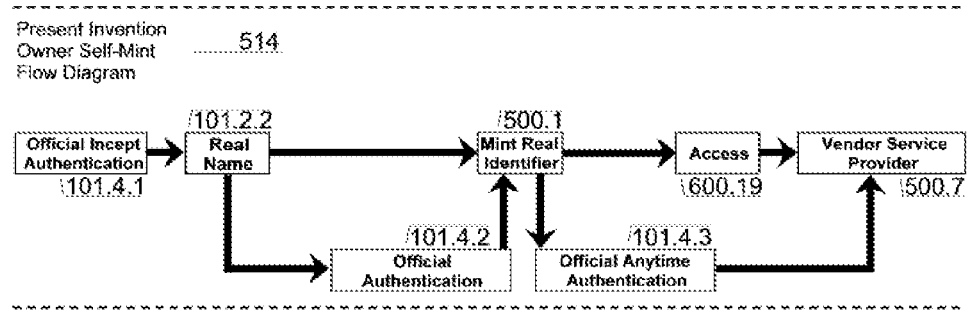

FIG. 58 Access Process Comparison
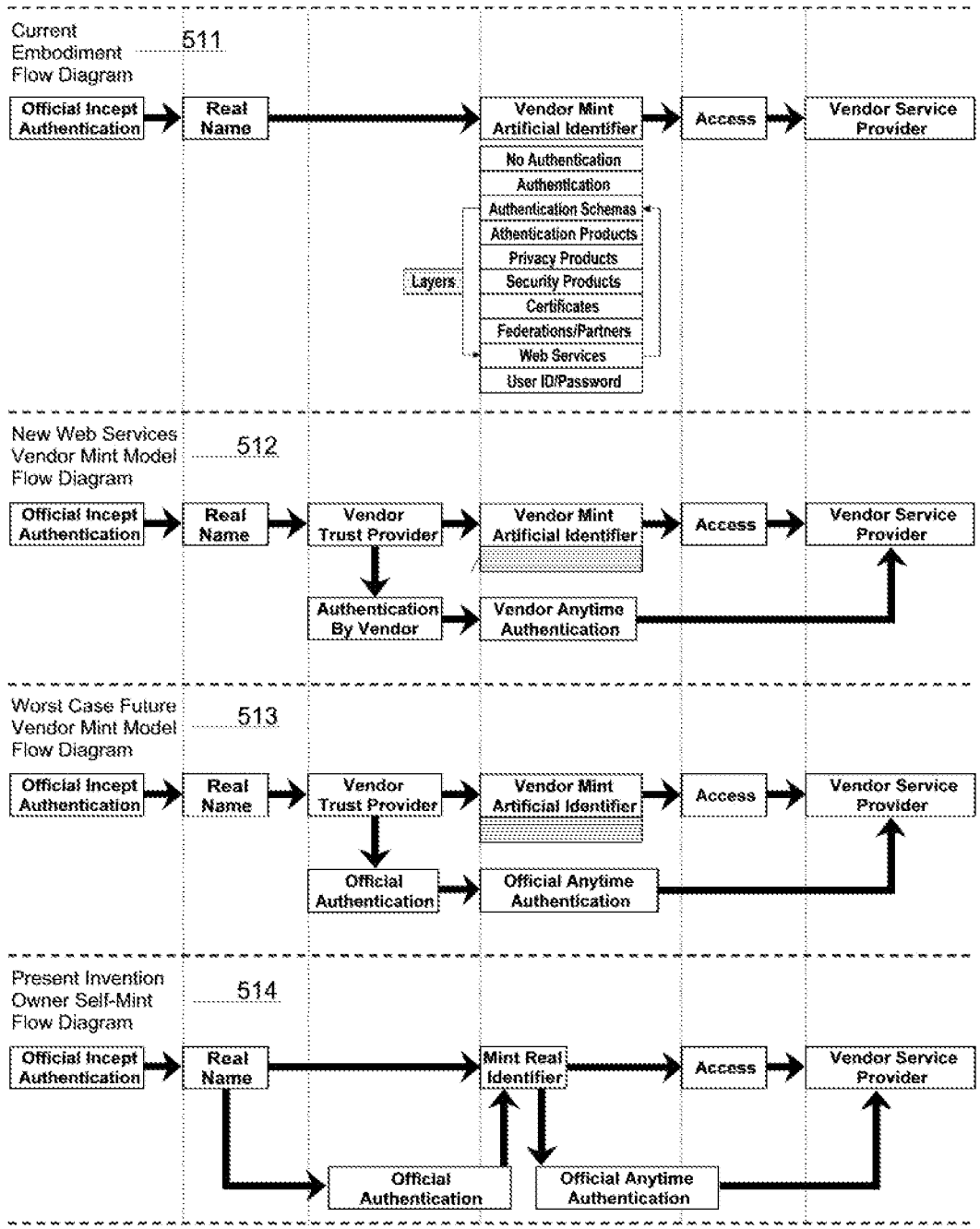

FIG. 59 Direct Ownership Process Components
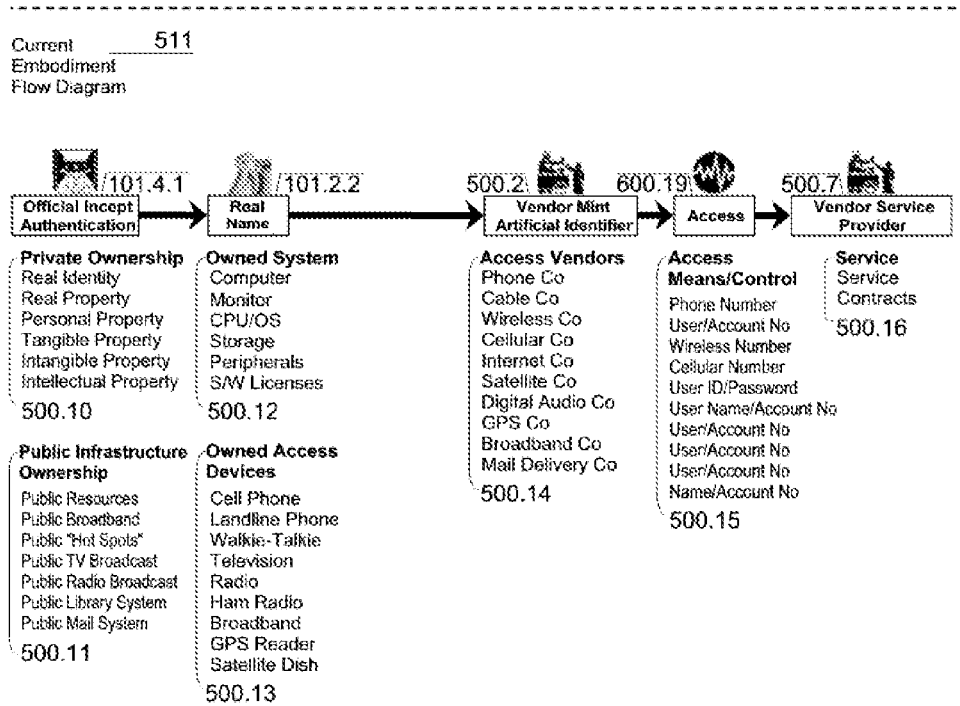
FIG. 60 Intermediary Ownership Process Components
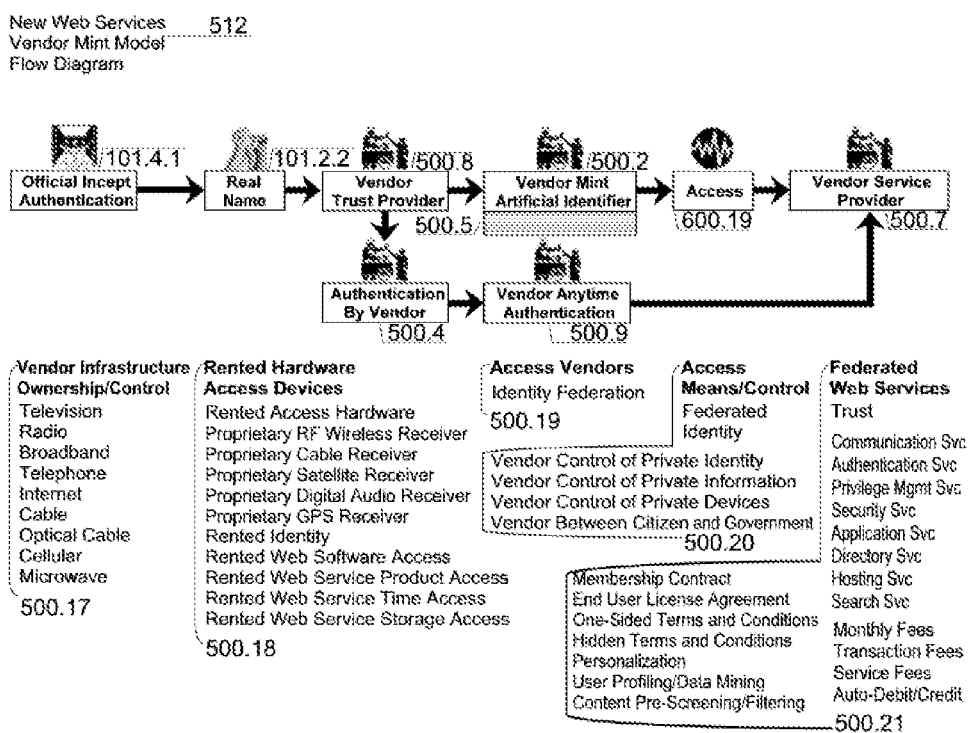

FIG. 61 Ownership Process Components Comparison
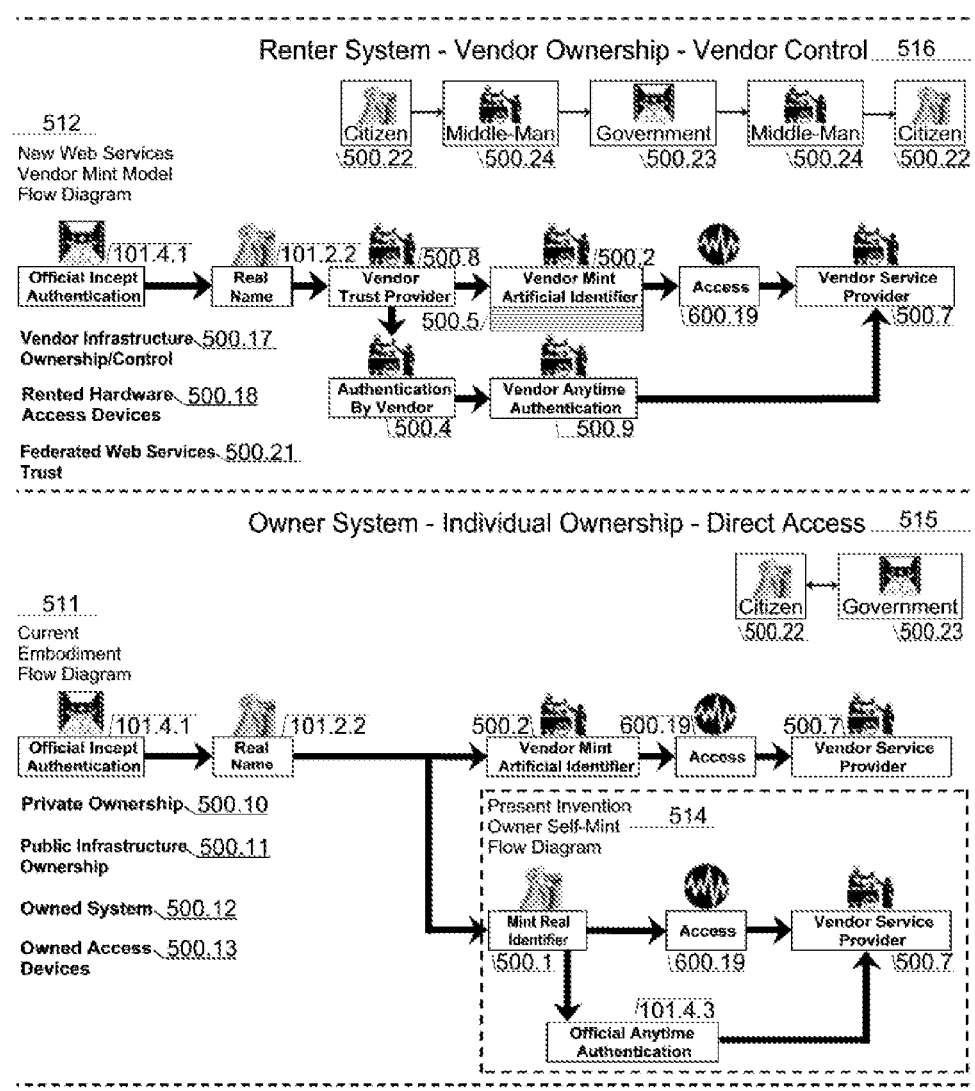

FIG. 62 Web Portal to Everything Components
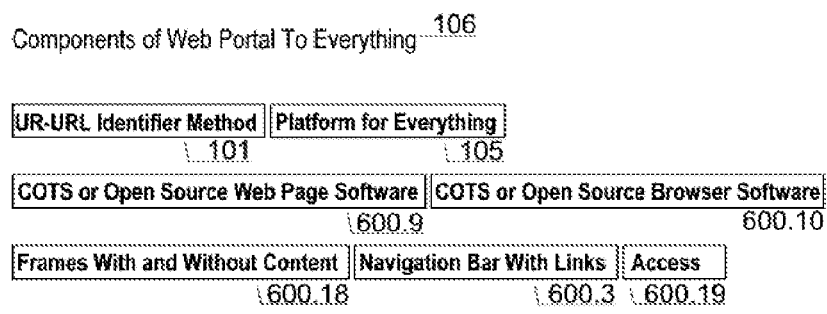
FIG. 63 Web Portal View
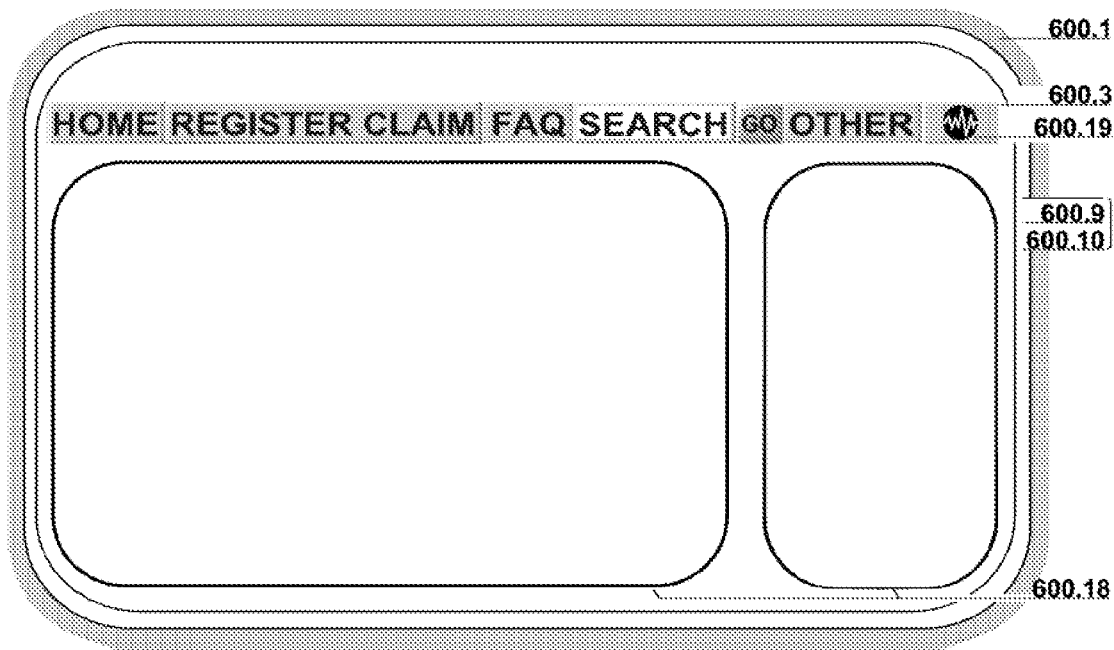

FIG. 64 Unitary Web Portal
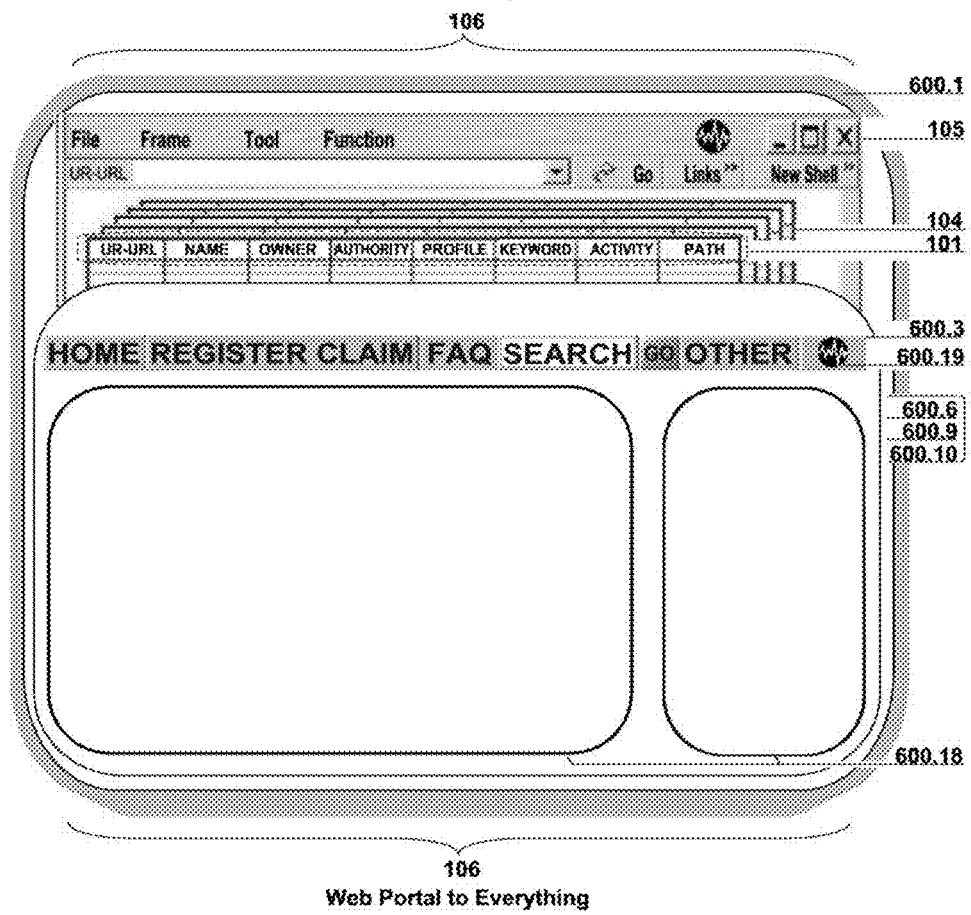
Web Portal to Everything
FIG. 65 Sample Web Portal to Everything Page 1
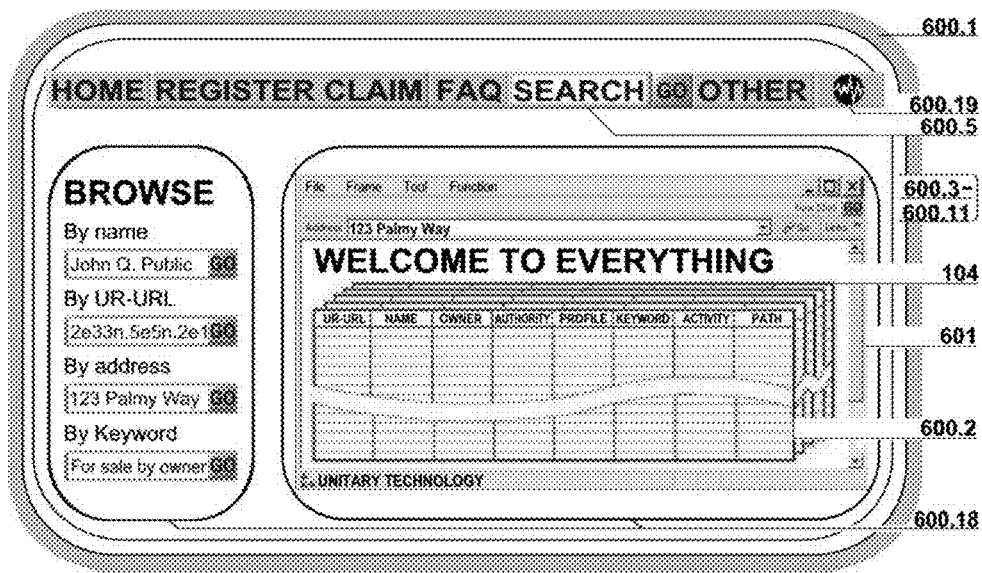

FIG. 66 Sample Record 1

| UR-URL | N02649095.W08006333.E00040.10172000.133000 |
| Name | Record of single-family home ownership |
| Owner | PoDunk County Tax-Collector |
| Authority | Deed or Title Company; Has artifact |
| Keyword | Instantiation: Incept date/time/loc at closing; Has desc |
| Path | www.pdc.fl.gov/records/titles |

101     414.1
OFFICIAL RECORD OF OWNERSHIP SAMPLE

FIG. 67 Sample Record 2

| UR-URL | N02649095.W08006333.E00040.10172000.133000 |
| Name | N02649095.W08006333.E00040.10172000.133000 |
| Owner | Public, John Q. and Public, Jane Q. |
| Authority | www.pdc.fl.gov/records/titles |
| Keyword | Claim: Incept date/time/loc at closing; Has title, Joint |
| Path | www.jqpfamily/homepage |

101     414.2
INDIVIDUAL PUBLIC CLAIM SAMPLE

FIG. 68 Sample Record 3

| UR-URL | S12345675.W22222333.E00050.04012003.108300 |
| Name | Listing for single-family home |
| Owner | Good Realty Company Inc |
| Authority | Listing 3333-456 |
| Keyword | Fl pool home; gated community; water view; 3% to selling broker; 3br; 2ba; FR; Bonus rm; 3CGrg; owner will carry 2nd |
| Path | www..goodrealty.com/listings/homes/florida.htm |

101     414.3
VENDOR CLAIM SAMPLE

FIG. 69 Sample Record 4

| | | |
|---|---|---|
| UR-URL | | N02649095.W08006333.E00040. 04012003.108300 (Δ T) |
| Name | | N02649095.W08006333.E00040.10172000.133000 |
| Owner | | Public, John Q. |
| Authority | | www.pdc.fl.gov/records/titles |
| Keyword | | Now date/time/loc at record registration; Has agent, Good Realty |
| Path | | www.goodrealty.com/listings/homes/florida.htm |

101        414.4
INDIVIDUAL UPDATE RECORD SAMPLE

FIG. 70 Sample Record 5

| | | |
|---|---|---|
| UR-URL | | 2e33n.5e5n.2e10n.37e47n.1e5n.10e20n.E00040.10172000.133000 (alternate format) |
| Name | | John Q. Public |
| Owner | | Phone Co |
| Authority | | www.pdc.fl.gov/records/titles (which references maker and location) |
| Keyword | | Has Link, www.jqpfamily.com/communication/access; Has Constraint, No solicitation |
| Path | | www.phoneco.com (where this record is) |

101        414.5
PUBLIC DIRECTORY RECORD SAMPLE

FIG. 71 Sample Record 6

| | | |
|---|---|---|
| UR-URL | | Entity, S00236666.E55555555.E00010.08011951.233022 |
| Name | | NameFirst, John, NameMiddle, Q., NameLast, Public |
| Owner | | Makers, Mary Q. Public nee Smith and Jack Q. Public |
| Authority | | Witness, www.goodhospital.com/records/contact.htm |
| Keyword | | InceptLoc, S00236666.E55555555.E00010; Incept D/T .08011951.233022 |
| Path | | www.pdc.fl.gov/deptvitalstatistics/ (where the authenticating artifact is) |

101        414.6
ORIGINAL INCEPT CLAIM SAMPLE

FIG. 72 Sample Record 7

| UR-URL | S00236666.E55555555.E00010.08011951.233022 |
|---|---|
| Name | John Q. Public |
| Owner | US Census Bureau |
| Authority | www.pdc.fl.gov/deptvitalstatistics/ (where the authenticating artifact is) |
| Keyword | Has (name, relation, gender, DOB, Latino Y/N, race) |
| Path | www.us.gov/census/ (where this record is) |

101     414.7
US CENSUS RECORD SAMPLE

FIG. 73 Sample Record 8

| UR-URL | N02649095.W08006333.E00040.10172000.133000 (chooses home UR-URL) |
|---|---|
| Name | John Q. Public Homepage |
| Owner | John Q. Public |
| Authority | Affidavit |
| Keyword | No solicitation |
| Path | None |

101     414.8
PERSONAL RECORD SAMPLE

FIG. 74 Sample Record 9

| UR-URL | N02649095.W08006333.E00040.10172000.133000 (chooses home UR-URL) |
|---|---|
| Name | John Q. Public Homepage |
| Owner | John Q. Public |
| Authority | Affidavit |
| Keyword | PMP, CPF, project management; Resume: www.jqpfamily.com/resume.htm |
| Path | Voice/data www.jqpfamily.com/communication/access (his routing program) |

101     414.9
PERSONAL HOMEPAGE RECORD SAMPLE

FIG. 75 Sample Record 10

414.10

SEARCH:  John Q.Public

UR-URL: N02649095.W08006333.E00040.10172000.133000

Homepage: www.jqpfamily.com/login.htm

Phone Co: www.phoneco.com/jqpfamily.com/login.htm

PDCFL: www.pdc.fl.gov/records/titles.index.htm

SEARCH:  123 Palmy Way, City of Warmtown, County of Po Dunk

UR-URL: N02649095.W08006333.E00040.10172000.133000

PDCFL: www.pdc.fl.gov/records/titles.index.htm

Owner: www.jqpfamily.com/login.htm

Agent: www..goodrealty.com/listings/homes/florida.htm 414.10
SEARCH RESULTS SAMPLE

FIG. 76 Sample Records Summarized

| Samples 414 | UR-URL | Name | Owner | Authority | Keywords | Path | 101 |
|---|---|---|---|---|---|---|---|
| OFFICIAL RECORD OF OWNERSHIP SAMPLE | N02649095.W08006333.E00040.10172000.133000 | Record of single-family home ownership | PoDunk County Tax-Collector | Deed or Title Company; Has artifact | Instantiation: Incept date/time/loc at closing; Has desc | www.pdc.fl.gov/records/titles | 414.1 |
| INDIVIDUAL PUBLIC CLAIM SAMPLE | N02649095.W08006333.E00040.10172000.133000 | N02649095.W08006333.E00040.10172000.133000 | Public, John Q. and Public, Jane Q. | www.pdc.fl.gov/records/titles | Claim: Incept date/time/loc at closing; Has title, Joint | www.jqpfamily/homepage | 414.2 |
| VENDOR'S CLAIM SAMPLE | S12345675.W22222333.E00050.04012003.108300 | Listing for single-family home | Good Realty Company Inc | Listing 3333-456 | Fl pool home; gated community; water view; 3% to selling broker; 3br; 2ba; FR; Bonus rm; 3C Grg; onr carry 2nd | www..goodrealty.com/listings/homes/florida.htm | 414.3 |
| INDIVIDUAL UPDATE RECORD SAMPLE | N02649095.W08006333.E00040.04012003.108300 (Δ T) | N02649095.W08006333.E00040.10172000.133000 | Public, John Q. | www.pdc.fl.gov/records/titles | Now date/time/loc at record registration; Has agent, Good Realty | www..goodrealty.com/listings/homes/florida.htm | 414.4 |
| PUBLIC DIRECTORY RECORD SAMPLE | 2e33n.5e5n.2e10n.37e47n.1e5n.10e20n.E00040.10172000.133000 (alt format) | John Q. Public | Phone Co | www.pdc.fl.gov/records/titles (which references maker and location) | www.jqpfamily.com/communication/access; Constraint, No solicitation | www.phoneco.com | 414.5 |
| ORIGINAL INCEPT CLAIM SAMPLE | S00236666.E55555555.E00010.08011951.233022 | NameFirst, John, NameMiddle, Q., NameLast, Public | Makers, Mary Q. Public nee Smith and Jack Q. Public | Witness, www.goodhospital.com/records/contact.htm | InceptLoc, S00236666.E55555555.E00010;Incept D/T.08011951.23302 | www.pdc.fl.gov/deptvitalstatistics/ | 414.6 |
| US CENSUS RECORD SAMPLE | S00236666.E55555555.E00010.08011951.233022 | John Q. Public | US Census Bureau | www.pdc.fl.gov/deptvitalstatistics/ | Has (name, relation, gender, DOB, Latino Y/N, race) | www.us.gov/census/ | 414.7 |
| PERSONAL RECORD SAMPLE | N02649095.W08006333.E00040.10172000.1330 (chooses home UR-URL) | John Q. Public Homepage | John Q. Public | Affidavit | No solicitation | None | 414.8 |
| PERSONAL HOMEPAGE RECORD SAMPLE | N02649095.W08006333.E00040.10172000.133000 | John Q. Public Homepage | John Q. Public | Affidavit | PMP CPF project management; Resume: www.jqpfamily.com/resume.htm | Voice/data www.jqpfamily.com/communication/access | 414.9 |

FIG. 77 Sample Web Portal to Everything Page 2

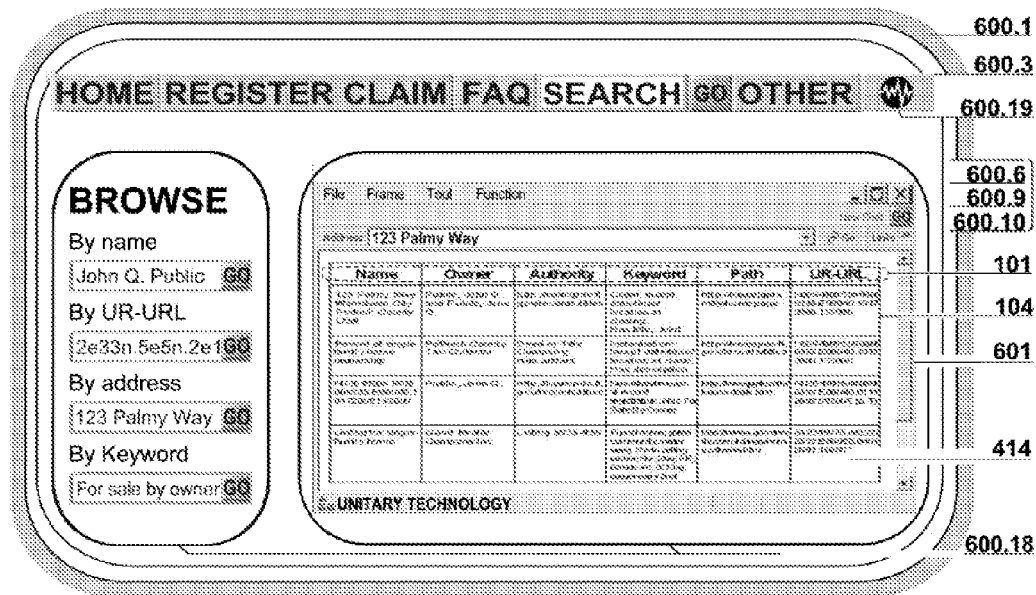

FIG. 78 Enterprise Record Examples

| 101 | Name | Owner | Authority | Profile | Keyword | Activity | Path | UR-URL |
|---|---|---|---|---|---|---|---|---|
| 415 | Entity | Boss | Authorization | Class | Organization | Obligation | System Link | Unique ID |
| 415.1 | Company | Stockholders | Bylaws Articles | Enterprise Assets | CEO Has Components | Fin/Op Plan —Profit | USGOV/EIN | .XYZT/gt. |
| 415.2 | Component | CEO | Charter-Scope of Work | Portfolio Programs | VP Has Divisions | Wk Contract —Performance | Corp/USGOV | .ext..XYZT/gt. |
| 415.3 | Division | VP | Management Directive | Division Projects | Director Has Departments | Wk Auth —Control | Comp/Corp | ext..ext |
| 415.4 | Department | Director | Department Instructions | Department Work Orders | Manager Has Work Centers | Wk Package —Product | Div/Comp | ext..ext |
| 415.5 | Work Center | Manager | Process Instructions | Section Activities | Supervisor Has Work Stations | Work Order —Support Svc | Dept/Div | ext..ext |
| 415.6 | Work Station | Supervisor | Desktop Instructions | Resource Steps | Employee Has Resources | Work Schedule —Work | Section/Dept | ext..ext |
| 400 | IDENTITY | ORIGIN | AGREEMENT | RESOURCE | CONSTITUENT | RELATION | SYSTEM | IDENTIFIER |

415
Enterprise Summary Array

FIG. 79 Enterprise Record Example Detail

| Name | Owner | Authority | Profile | Keyword | Activity | Path | UR-URL | 101 |
|---|---|---|---|---|---|---|---|---|
| Name, Corporation Icon, ※ | Owner, Stockholders | State, Person Stmt, Literal Authority, Bylaws Authority, Articles Source, E-gov.fl.us | Class, Person Ent Subclass, For Profit CEO, Able, Izzy S. BOD; VisionMission Contact, 800.123.4567 Portal, /www.abccorp | Components, MFR, ENG FIN, HR, MATL, MKTG Products Customers Assets VP's, Smythe, Dobbs | SpecificationBus Plan FunctionAsset Mgmt ObligationProcedure DeliverableProfit | SystemUSGOV ReferenceEIN Protocols | UR-URL | 416.1 |
| Name, Component Icon, ※ | Owner, CEO | State, Component Authority, Scope of Stmt, Charter Stmt, PDxx-- Program Directive | Class, Portfolio Role, Vice President Resource, Smythe, B. Capacity Utility | Divisions, PGM, R&D Structural, Elec, IE Projects Directors Project Managers | Specification, FunctionInfo Mgmt ObligationProcedure DeliverablePerforman | ABC Corp | UR-URL | 416.2 |
| Name, Division Icon, ※ | Owner, VP | State, Division Authority, MDxx-- Mgmt Directive | Class, Functional Div Role, Director Resource, Green, H. Capacity Utility | Departments SCHD, EVMS, CRP Managers, Brown Projects Project Managers | Specification, Work Function, Process ObligationProcedure Deliverable, Control | ENG/ABC Corp | UR-URL | 416.3 |
| Name, Department Icon, ※ | Owner, Director | State, Department Authority, DIxx-- Dept Instruction | Class, WBS Role, Manager Resource, Brown Capacity | WorkGroups/Centers Team Leads, Jones Project Managers | Specification, Wk Pkg Function, Product Obligation, Procedure Deliverable, Product | EPPMP/ENG | UR-URL | 416.4 |
| Name, Work Center Estimating Workgroup Icon, ※ | Owner, Manager | State, Work Center Authority, SPIxx-- Process Instruction | Class, Activity Role, Team Leader Resource, JonesD.M. Capacity | Work Station, 2011 Team Members Work Station, 2012 Team Members | Specification, Wk Function, Res Mgmt ObligationProcedure DeliverableSupport | EP/EPPMP | UR-URL | 416.5 |
| Name, Work Station Icon, ※ | Owner, Lead | State, Work Station Authority, DTIxx-- Desktop Instruction | Class, Step Role, Est- Planner Links SME, Process Owner | Resources, Smith, Doe HW/SW Availability | Specification, Acti Function, Task Mgmt Obligation, Procedure Deliverable, Cost Est | IDCPE/PE | UR-URL | 416.6 |
| Name, Resource Last, Smith NameFirst, Chris Identity, xyzt@real Icon, ※ | Owner, Contact, x5678 Link | State, Person Stmt, Resume Authority, Requisition Stmt, Job Description | Class, Non-Exempt Role, Estimator Access, Level II | Properties Credential, PMP, CPF Skill, Advanced Attribute, Self-Starter Attribute, ISTJ | Activity, Schedule Obligation, Job Desc Procedure, Cost Est | IDCPE/PE | UR-URL | 416.7 |
| Name, Estimator Role Icon, ※ | Owner, Estimator | State, Specification Stmt, Literal Authority, SPIxx | Class, Contract ProcessGroup, FIN | Grade/Range Rate/Range Equipment Material Constraint | Function, Literal Proc: Estimate Cost Proc: Progress Sched Proc: Earned Value Proc: Audit Proj BAC | IDCPE/PE | UR-URL | 416.8 |
| Name, Estimating Process Icon, ※ | Owner, Estimator | State, Specification Stmt, Process Authority, SPIxx | Class, Declaration ProcessGroup, FIN | Role, Estimator Graph, Process Map Inputs Tools & Techniques Outputs | Step1, Literal Step2, Literal Step3, Literal Step4, Literal Step5, Literal | IDCPE/PE | UR-URL | 416.9 |

416 Enterprise Detail Array

FIG. 80 Present Invention Part-List Example

| Path | UR-URL | Owner | Name | Keywords | Authority |
|---|---|---|---|---|---|
| FIG. No. | Part No. | FIG. Name | Part Name | Sub-Parts | Parent Component |
| 1 | 1 | | Model of Everything | | UR-URL Identifier Method View 0 |
| 1 | 1000 | | Model of Everything | | 1 |
| 1 | 100 | | Unitary Reference Architecture | | 1000 |
| 1 | 101 | | | UR-URL Identifier Method | 100 |
| 1 | 102 | | | List of Everything | 100 |
| 1 | 103 | | | Table of Everything | 100 |
| 1 | 104 | | | Database of Everything | 100 |
| 1 | 105 | | | Platform for Everything | 100 |
| 1 | 106 | | | Web Portal of Everything | 100 |
| 1 | | | Unitary Scope | | 1000 |
| 1 | 201 | | | All Identities | 200 |
| 1 | 202 | | | All Information | 200 |
| 1 | 203 | | | All Objects | 200 |
| 1 | 204 | | | All Systems | 200 |
| 1 | 205 | | | All Domains | 200 |
| 1 | 206 | | | All Events | 200 |
| 2 | 202 | | Dimensions of Everything | | UR-URL Identifier Method View 0 |
| 2 | 202.1 | | Levels of Abstraction | | 200 |
| 2 | 202.1.1 | | | Unification | 211 |
| 2 | 202.1.2 | | | Resolution | 211 |
| 2 | 202.1.3 | | | Synthesis | 211 |
| 2 | 202.1.4 | | | Integration | 211 |
| 2 | 202.1.5 | | | Organization | 211 |
| 2 | 202.1.6 | | | Order | 211 |
| 2 | 202.1.7 | | | Definition | 211 |
| 2 | 202.2 | | Layers of Objects | | 200 |
| 2 | 202.2.1 | | | Icebergs of Ideas | 200 |
| 2 | 202.2.2 | | | Event Identities | 201 |
| 2 | 202.2.3 | | | Event Data | 200 |
| 2 | 202.2.4 | | | Event Information | 211 |
| 2 | 202.2.5 | | | Event Objects | 221 |
| 2 | 202.2.6 | | | Event System Objects | 231 |
| 2 | 202.2.7 | | | Event Sub-System Objects | 241 |
| 2 | 202.2.8 | | | Object of Everything | 251 |
| 2 | 202.2.9 | | | Mountains of Matter | 200 |

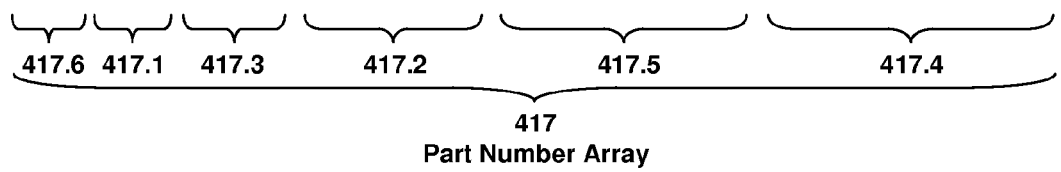

417.6  417.1  417.3  417.2  417.5  417.4

**417
Part Number Array**

FIG. 81 Homepage 1
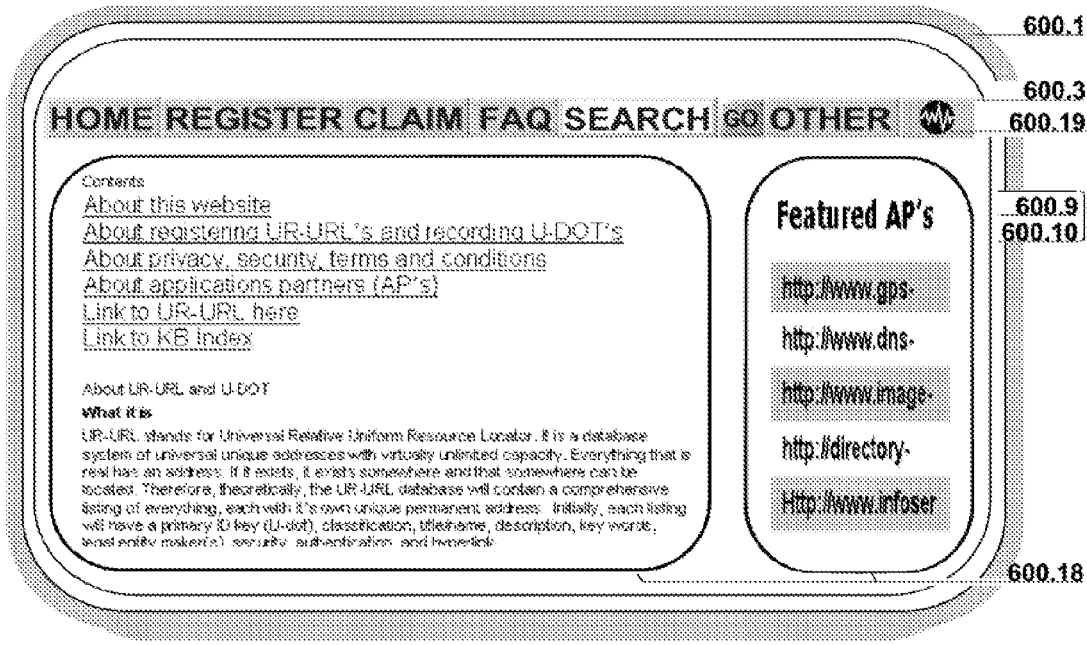
FIG. 82 Homepage 2
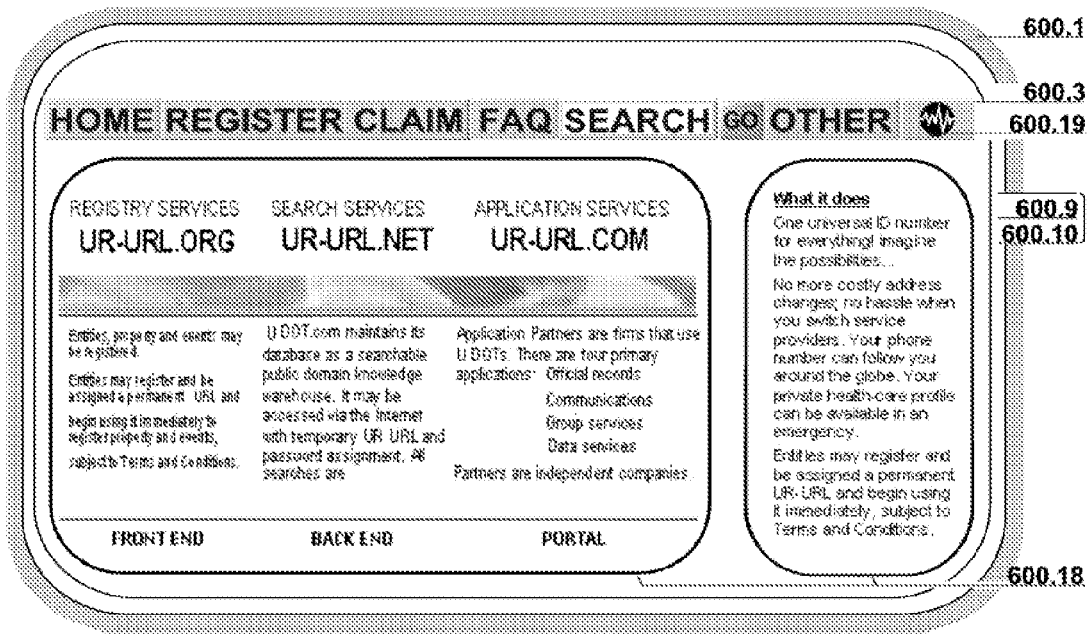

FIG. 83 Homepage 3
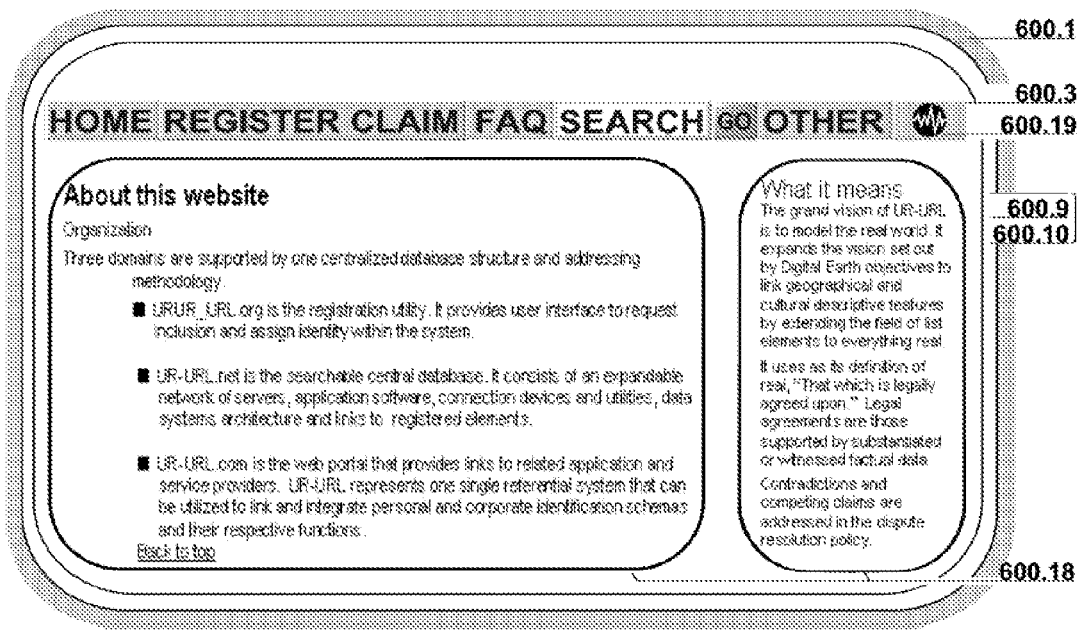
FIG. 84 Homepage 4
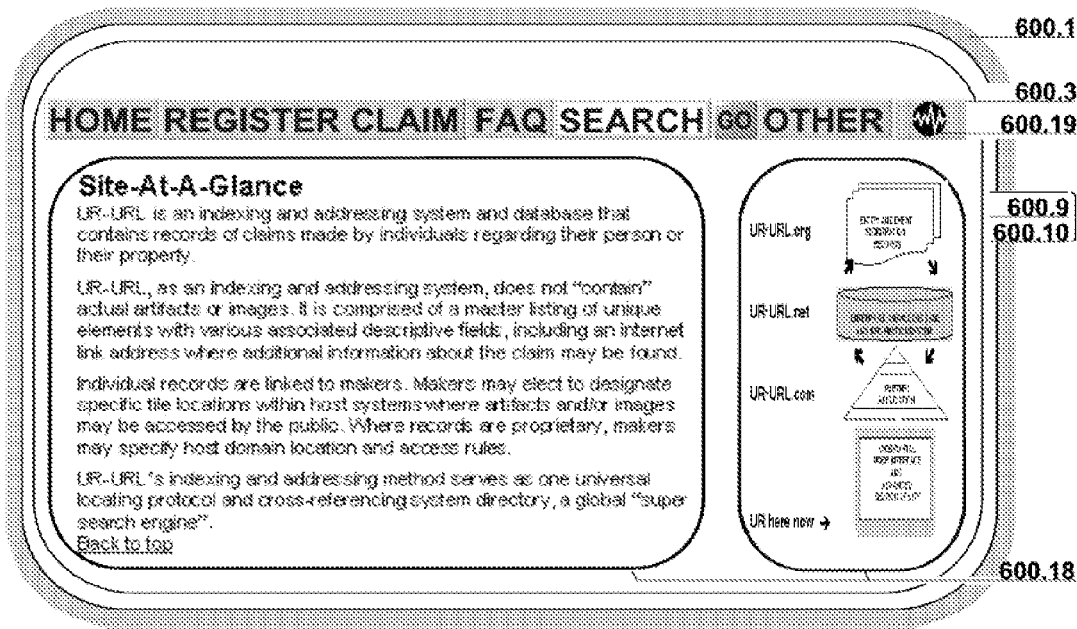

FIG. 85 Homepage 5
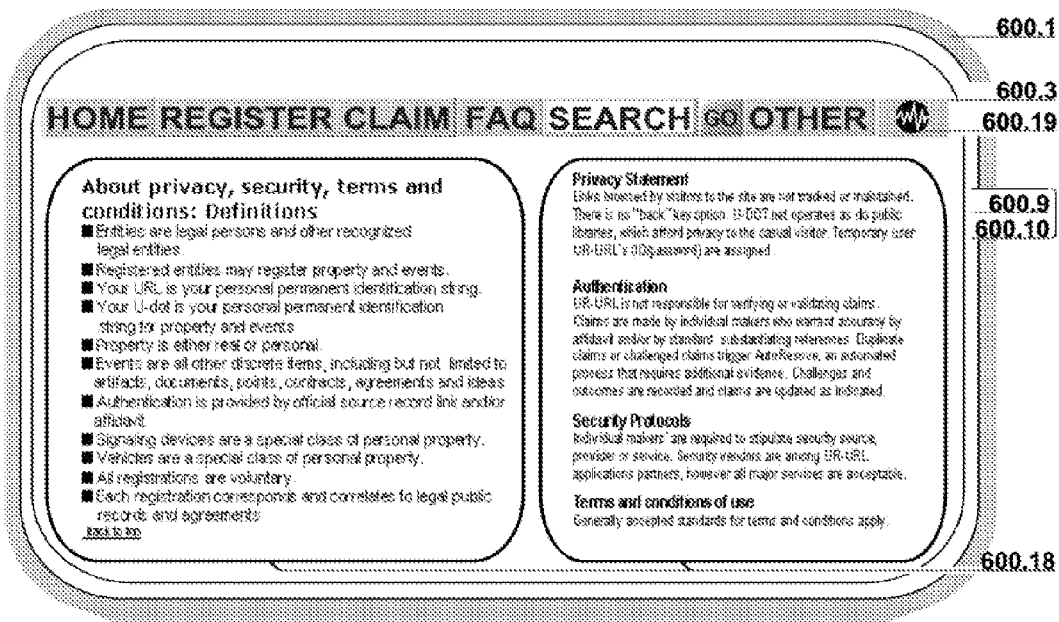
FIG. 86 Homepage 6
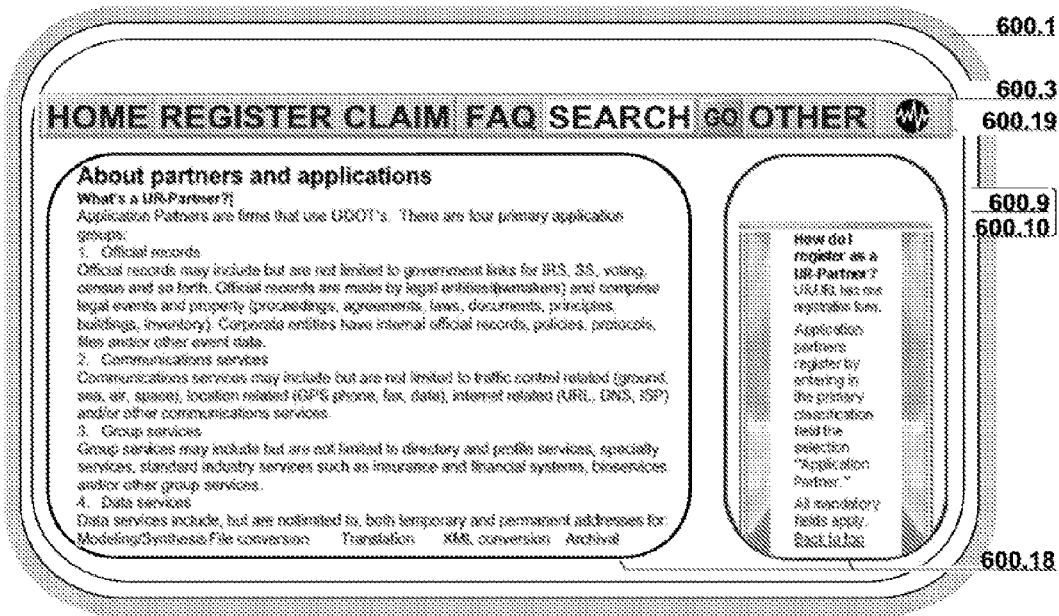

FIG. 87 Homepage 7
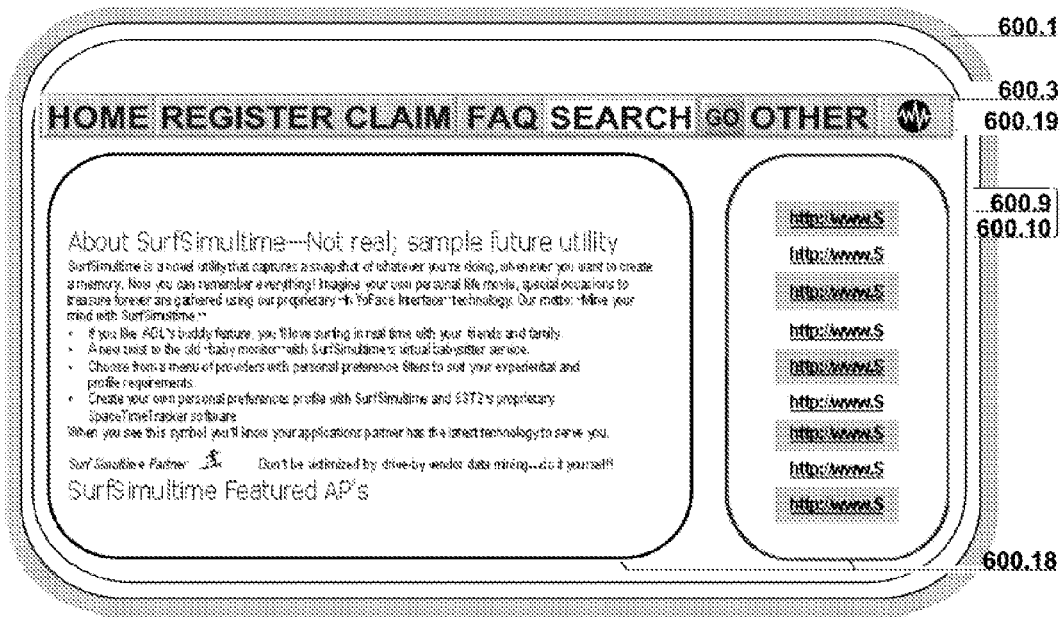
FIG. 88 Homepage 8
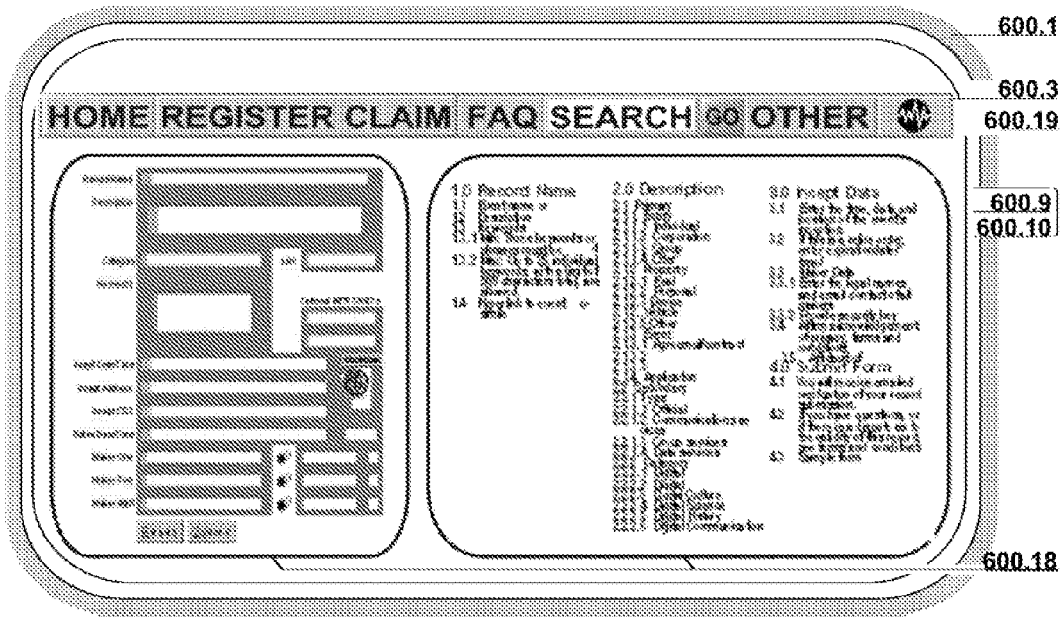

FIG. 89 Homepage 9
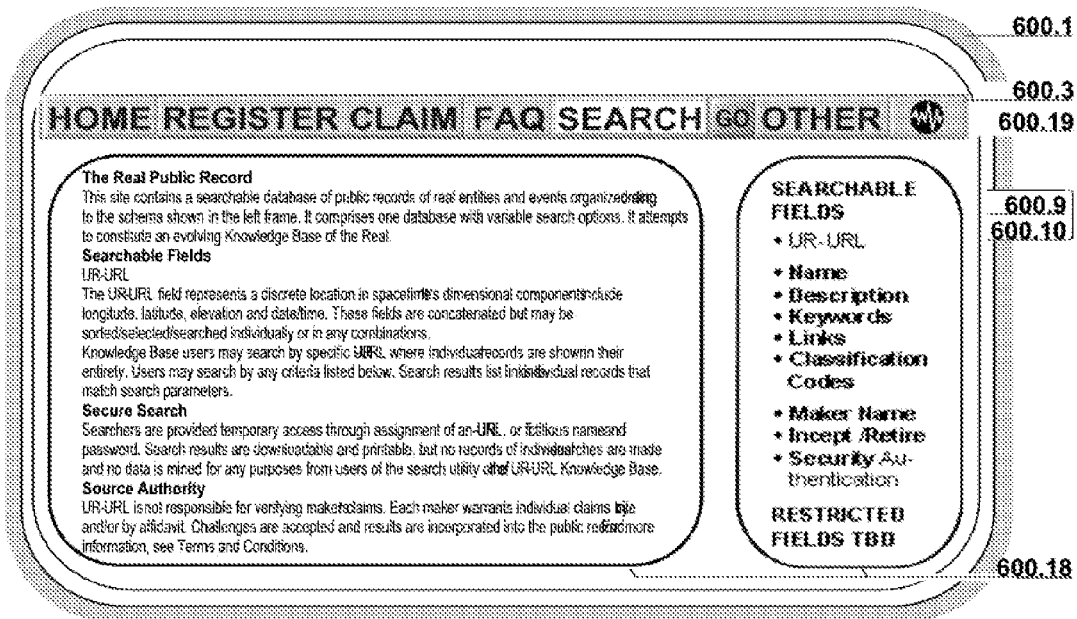
FIG. 90 Homepage 10
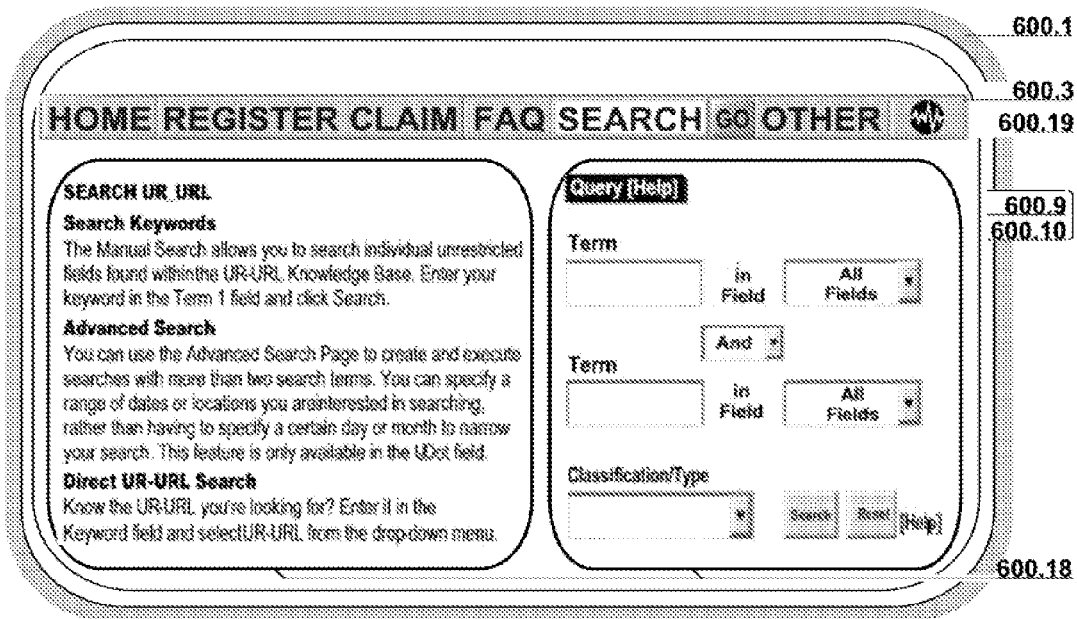

FIG. 91 Homepage 11
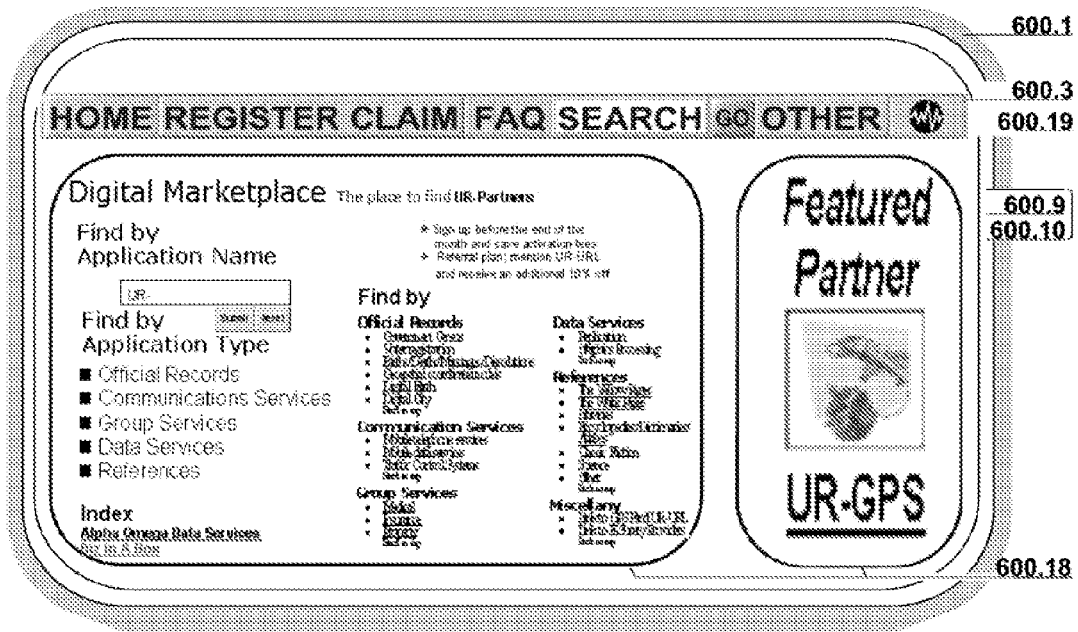
FIG. 92 Homepage 12
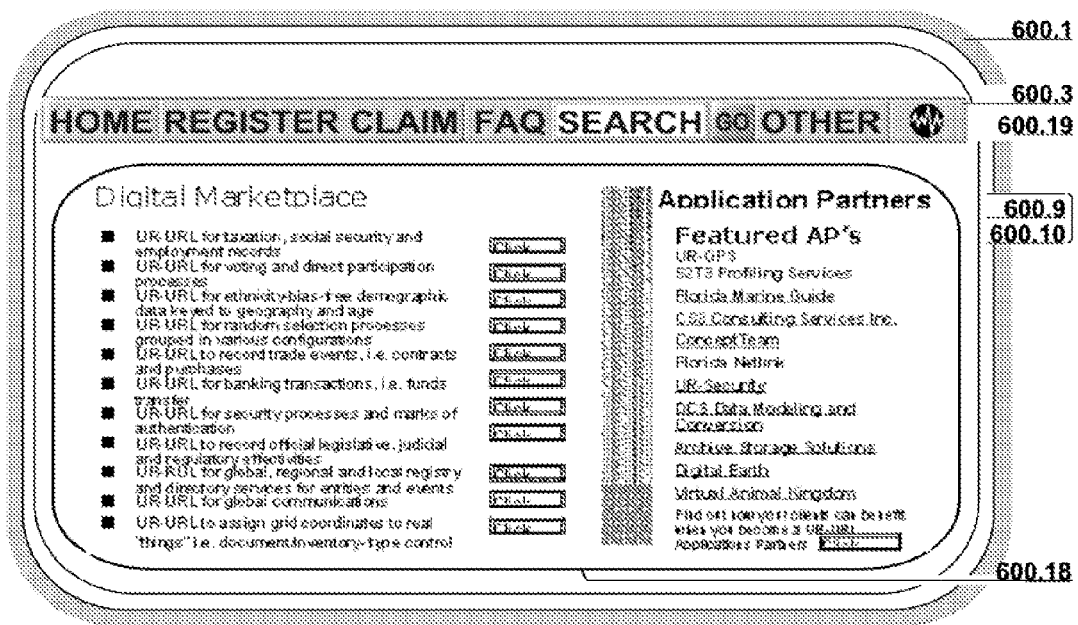

FIG. 93 Alignment Between Components and Component Parts of Unitary Reference Architecture Components of UR-URL Identifier Method —101

| UR-URL | Name | Owner | Authority | Keywords | Path |

Components of List of Everything —102

| UR-URL Identifier Method |
| Tabular Architecture Rows and Columns | Infinite Range With Infinite UR-URL Identifier Method Scope |

Components of Table of Everything —103

| UR-URL Identifier Method | List of Everything | Infinite Range With Infinite UR-URL Identifier Method Scope |
| Unitary Ontology Architecture | Unitary Resource Description Framework (RDF) |
| Commercial Off The Shelf (COTS) or Open Source Computer System | Tabular Architecture Rows & Columns |
| COTS or Open Source Spreadsheet Software With Search and Hyperlinks | Variable Columns | Event Data |

Components of Database of Everything —104

| UR-URL Identifier Method | Table of Everything | Variable Relational Tables |
| COTS or Open Source Database Software | Infinite Integration With Infinite UR-URL Identifier Method Scope |

Components of Platform for Everything —105

| UR-URL Identifier Method | Database of Everything | Shell | Unitary Shell |
| COTS or Open Source Shell Software With Simple Tools | COTS or Open Source Predicate Logic Software |

Components of Web Portal To Everything —106

| UR-URL Identifier Method | Platform for Everything |
| COTS or Open Source Web Page Software | COTS or Open Source Browser Software |
| Frames With and Without Content | Navigation Bar With Links | Access |

FIG. 94 Alignment Between Parts and Part Numbers of Unitary Reference Architecture

The Several Dimensional Views I - VI

| Identity View Zero Dimension | List View One Dimension | Table View Two Dimensions | Database View Three Dimensions | Platform View Four Dimensions | Web Portal View All Dimensions |
|---|---|---|---|---|---|
| \View I | \View II | \View III | \View IV | \View V | \View VI |

Components of Model of Everything 1000

| Unitary Reference Architecture | Unitary Infrastructure | Unitary Ontology Architecture | Unitary Resource Description Framework | Unitary Processes | Unitary Apparatus |
|---|---|---|---|---|---|
| \100's | \200's | \300's | \400's | \500's | \600's |

Components of Unitary Reference Architecture 100

| UR-URL Identifier Method | List of Everything | Table of Everything | Database of Everything | Platform for Everything | Web Portal to Everything |
|---|---|---|---|---|---|
| \101 | \102 | \103 | \104 | \105 | \106 |

Components of Unitary Infrastructure 200

| Information Reference Arch | Civil Infrastructure | Information Infrastructure | Physical Infrastructure | Process Infrastructure | Economic Infrastructure |
|---|---|---|---|---|---|
| \200.1 | \200.2 | \200.3 | \200.4 | \200.5 | \200.6 |

Unitary Scope 201

| All Identities | All Information | All Objects | All Systems | All Domains | All Events |
|---|---|---|---|---|---|
| \201.1 | \201.2 | \201.3 | \201.4 | \201.5 | \201.6 |

Layers of Objects 202.1

| Event Identities | Event Information | Event Objects | Event System Objects | Event Sub-System Objects | Object of Everything |
|---|---|---|---|---|---|
| \202.1.1 | \202.1.2 | \202.1.3 | \202.1.4 | \202.1.5 | \202.1.6 |

Levels of Abstraction 202.2

| Explication | Order | Organization | Synthesis | Resolution | Unification |
|---|---|---|---|---|---|
| \202.2.1 | \202.2.2 | \202.2.3 | \202.2.4 | \202.2.5 | \202.2.6 |

FIG. 95 Sample Embodiment Apparatus Reference
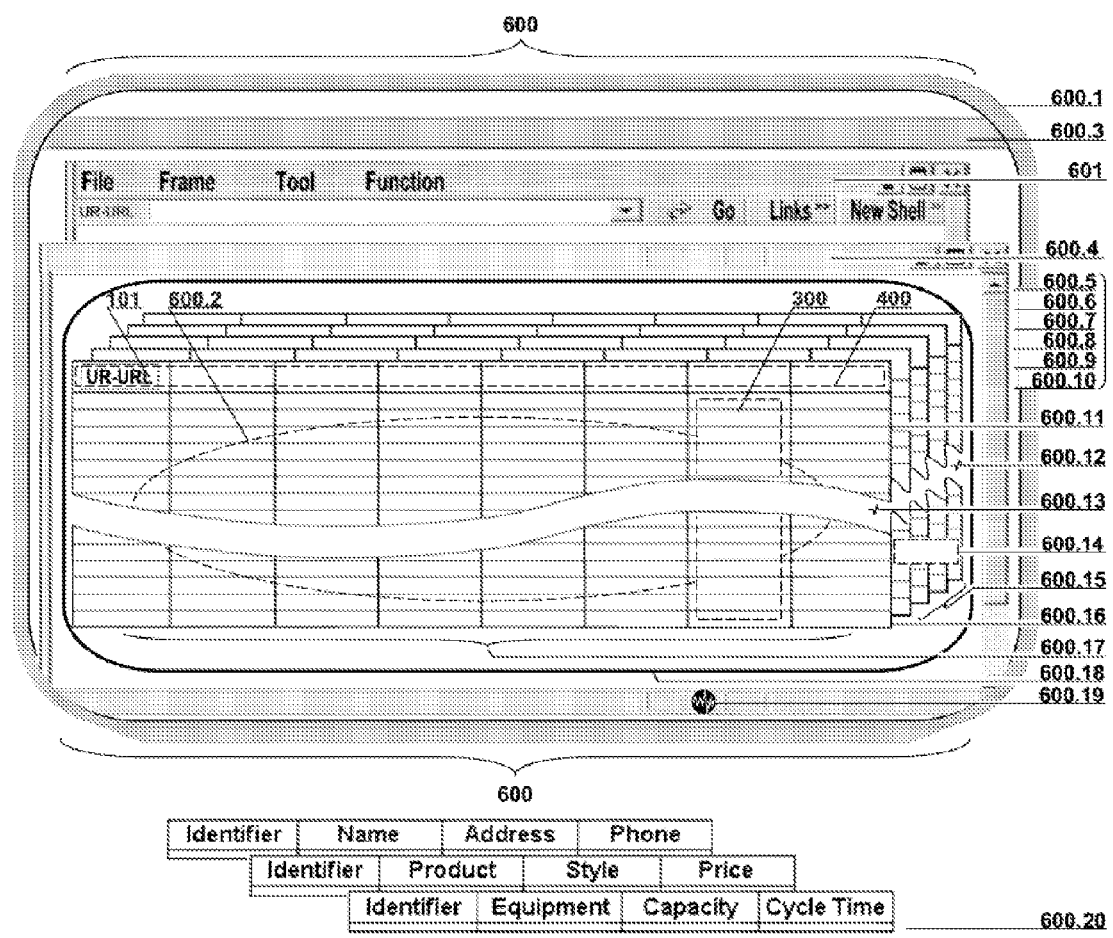

FIG. 96 Sample Embodiment
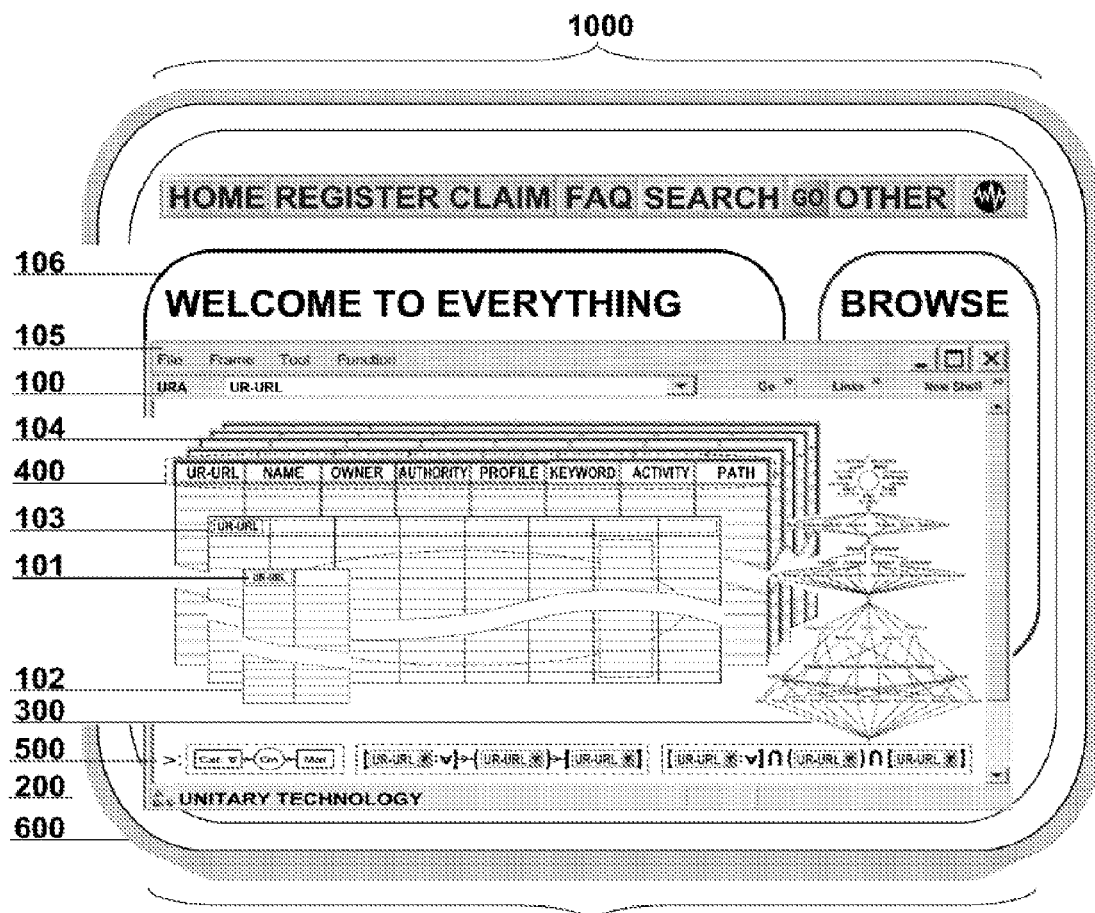
1000
Model of Everything
Unitary Reference Architecture 100
UR-URL Identifier Method 101
List of Everything 102
Table of Everything 103
Database of Everything 104
Platform for Everything 105
Web Portal to Everything 106
Unitary Infrastructure 200
Unitary Ontology Architecture 300
Unitary RDF 400
Unitary Process Architecture 500
Unitary Apparatus 600

FIG. 97 Unitary Object Identity Array

| Latitude | Longitude | Elevation | Time |
|----------|-----------|-----------|------|
| X | Y | Z | T |

101.1.1 UR-URL Real Identity

[UR-URL∩(Label,Value)...(Label,Value)]

101.1 UR-URL Object Identity Array Sample Tuple Format

FIG. 98 Unitary Event Identity Array

| Identifier | Identity | Origin | Agreement | Constituents | System |
|------------|----------|--------|-----------|--------------|--------|
| 401 | 402 | 403 | 404 | 405 | 406 |

| Identifier | Identity | Origin | Agreement | Constituents | System | Resource | Relation |
|------------|----------|--------|-----------|--------------|--------|----------|----------|
| 401 | 402 | 403 | 404 | 405 | 406 | 407 | 408 |

400 RDF Array Tabular Format, Six Public Terms and Eight Enterprise Terms

[Identifier∩(Identity,Value)(Origin,Value)(Agreement,Value)(Consitituents,Value)(System,Value)]

400 RDF as Unitary Event Identity Array Sample Tuple Format

[UR-URL∩(Name,Value)(Owner,Value)(Authority,Value)(Keyword,Value)(Path,Value)]

400 RDF Array as Unitary Event Identity Sample Tuple Format in URA Terms per RDF Synthesis 409

FIG. 99 Unitary Ontological Architecture

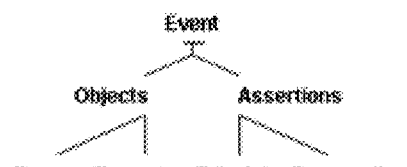
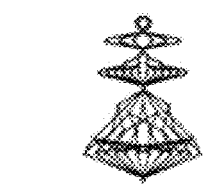

301.1 Unitary Top Level Ontology

309 Unitary Integrated Ontology

FIG. 100 Unitary Apparatus Structure
Part No. 600.11
FIG. 101 Unitary Event RDF Architecture
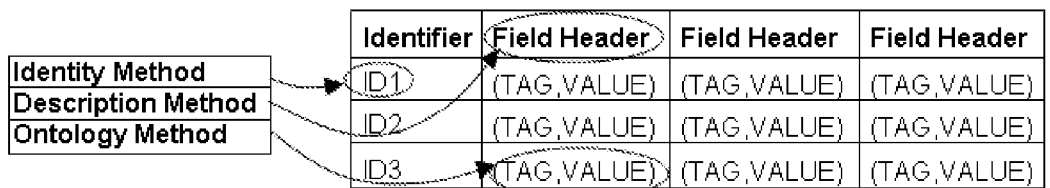
Identity Method - 101.1.1 UR-URL Real Identity
Ontology Method - 309 Unitary Integrated Ontology
Description Method - 400 RDF Array
FIG. 102 Comparison With Common Architectures
Part No. 600.20 Common Architectures
FIG. 103 Integration With Common Architectures
Part No. 600.11 List View

FIG. 104 Event Oriented Semantic Structure Illustrated

| Samples 414 | IDENTIFIER | IDENTITY | ORIGIN | AGREEMENT | CONSTITUENTS | SYSTEM | 101 |
|---|---|---|---|---|---|---|---|
| OFFICIAL RECORD OF OWNERSHIP SAMPLE | N02649095.W089 06333.E00040.10 172000.133000 | Record of single-family home ownership | PoDunk County Tax-Collector | Deed or Title Company; Has artifact | Instantiation: Incept date/time/loc at closing; Has desc | www.pdc.fl.gov/records/titles | 414.1 |
| INDIVIDUAL PUBLIC CLAIM SAMPLE | N02649095.W089 06333.E00040.10 172000.133000 | N02649095.W08006 333.E00040.101720 00.133000 | Public, John Q. and Public, Jane Q. | www.pdc.fl.gov/records/titles | Claim: Incept date/time/loc at closing; Has title, Joint | www.jqpfamily.homepage | 414.2 |
| VENDOR'S CLAIM SAMPLE | S12345675.W222 22333.E00050. 04.012003.108300 | Listing for single-family home | Good Realty Company Inc | Listing 3333-456 | Fl pool home; gated community; water view; 3% to selling broker; 3br; 2ba; FR; Bonus rm; 3C Grg; onr carry 2nd | www..goodrealty.com/listings/homes/florida.htm | 414.3 |
| INDIVIDUAL UPDATE RECORD SAMPLE | N02649095.W089 06333.E00040. 04.012003.108300 (Δ T) | N02649095.W08006 333.E00040.101720 00.133000 | Public, John Q. | www.pdc.fl.gov/records/titles | Now date/time/loc at record registration; Has agent, Good Realty | www..goodrealty.com/listings/homes/florida.htm | 414.4 |
| PUBLIC DIRECTORY RECORD SAMPLE | 2e33n.5e5n.2e10 n.37e47n.1e5n.10 e20n.E00040.101 72000.133000 (alt format) | John Q. Public | Phone Co | www.pdc.fl.gov/r ecords/titles (which references maker and location) | www.jqpfamily.com/co mmunication/access; Constraint, No solicitation | www.phoneco.com | 414.5 |
| ORIGINAL INCEPT CLAIM SAMPLE | S00236666.E555 55555.E00010.08 011951.233022 | NameFirst, John, NameMiddle, Q., NameLast, Public | Makers, Mary Q. Public nee Smith and Jack Q. Public | Witness, www.goodhospit al.com/records/ko ntact.htm | InceptLoc, 50023666 6.E55555555. E00010; Incept D/T.08 011951.23302 | www.pdc.fl.gov/deptvitalstatistics/ | 414.6 |
| US CENSUS RECORD SAMPLE | S00236666.E555 55555.E00010.08 011951.233022 | John Q. Public | US Census Bureau | www.pdc.fl.gov/d eptvitalstatistics/ | Has (name, relation, gender, DOB, Latino Y/N, race) | www.us.gov/census/ | 414.7 |
| PERSONAL RECORD SAMPLE | N236+9095.W089 06333.E00040.10 72000.1330 (chooses home UR-URL) | John Q. Public Homepage | John Q. Public | Affidavit | No solicitation | None | 414.8 |

FIG. 105 Enterprise Information Asset Embodiments

| PERSON | PROPERTY | | PRINCIPLE | TRANSACTION |
|---|---|---|---|---|
| Human Resources | Material Resources | Technology Resources | Referential Resources | Plans |
| Profiles | Inventory | Hardware | Standards, Language, Protocols | Strategic Plan |
| Skills | Supplies | Software | Classification Conventions, Ontology | Operations Plan |
| Roles | Materials | Services | Business Rules, Metrics | Business Plan |
| Grades | Tools | Network Infrastructure | Data Structures, System Architecture | Financial Plan |
| Classifications | Equipment | | | Product Plans, Service Plans |
| Attributes | Property | Capital Resources | Process Resources | Program Plans, Project Plans |
| Assignments | Artifacts | Plant/Real Estate | Policies, Procedures | |
| Utilization | Objects | Instruments | Program Directives | Operations |
| Roles/Responsibilities | Media | Cash | Management Directives | Contracts, Specifications |
| Job Descriptions | | | Department Instructions | Work Packages, Work Orders |
| Preferences | | Document Resources | Specific Process Instructions | Schedules, Activities, Tasks |
| Access Constraints | Files, Text, Images, Graphs, Charts | | Desktop Instructions | WBS's, BOM's |
| Qualifications | Formal/Approved – Server/Intranet | | Process Maps, Process Templates | Routings, OP&RF Applications |
| Credentials | Informal/Draft – Private Desktop | | Activity Forms, Fragnets, Templates | Work Authorizations |
| Certifications | Hosted Services, Sites, Content | | Report Forms and Formats | Time Cards, Performance |
| Contact Numbers | Archives – Back-Up Volumes | | Methods, Practices | Accounts, Ledgers, History |
| Locations | | | Inputs/Outputs – Tools/Techniques | CRM, Customers, Sales |
| Labor Assets | Real & Personal Assets | | Intangible Assets | Capacity Assets |

Part Nos. 301.5 Persons, 301.6 Property, 301.7 Principle, 301.8 Transaction

FIG. 106 Enterprise Information Asset Ownership

400 RDF Array With 415 Enterprise Summary Array

FIG. 107 Sample Enterprise Information Event Functions

| IDENTITY | ORIGIN | AGREEMENT | CONSTITUENT | RESOURCE | RELATION | SYSTEM | IDENTIFIER |
|---|---|---|---|---|---|---|---|
| ՈName | ՈOwner | ՈAuthority | ՈPart | ՈClass | ՈProcess | ՈSysParent | Ո I-USD |
| ՈNameLast | ՈOwnerLink | ՈAuthorityLink | ՈComponent | ՈForm | ՈObligation | ՈSysChild | ՈX-USD |
| ՈNameFirst | ՈEntityCondition | ՈState | ՈFeature | ՈOffice | ՈRole | ՈSysReference | (Real Relative) or |
| ՈNameMiddle | | ՈStatement | ՈProperty | ՈUtility | ՈRelation | | (Referential-Ext) |
| ՈSymbol | | | ՈAttribute | ՈCapacity | ՈAction | | ՈInceptLocDateTime |
| ՈAlias | | | ՈCharacteristic | ՈAccessRule | ՈPredicate | | ՈLocDateTime |
| ՈIcon | | | ՈQuality | ՈPerformance | ՈOperation | | ՈPartNumber |
| Ո※※△ⓒ | | | ՈQuantity | ՈKeyCategory | ՈArgument | | ՈProductCode |
| | | | ՈAssociation | | ՈPredecessor | | ՈIdentifier |
| | | | ՈPossession | | ՈSuccessor | | ՈAddress |
| | | | ՈImage | | ՈVector | | ՈAddressCode |
| | | | ՈGraph | | ՈFunction | | |
| NAME | OWNER | AUTHORITY | KEYWORD | PROFILE | ACTIVITY | PATH | URI-URL |
| What | Who | Why | About | With | How | Where | Which |

Table 2 Sample Event Function Set Options with 400 RDF Array and Colloquial Terms

FIG. 108 Enterprise Information Asset Management

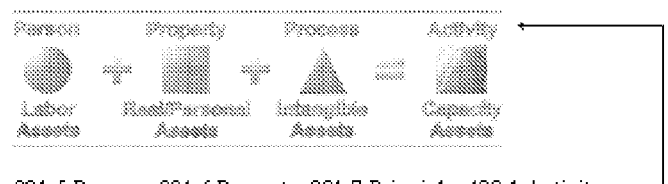

Part Nos. 301.5 Persons, 301.6 Property, 301.7 Principle, 408.1 Activites

FIG. 109 Comparison Between Webs
600.21 Vendor Ownership Web
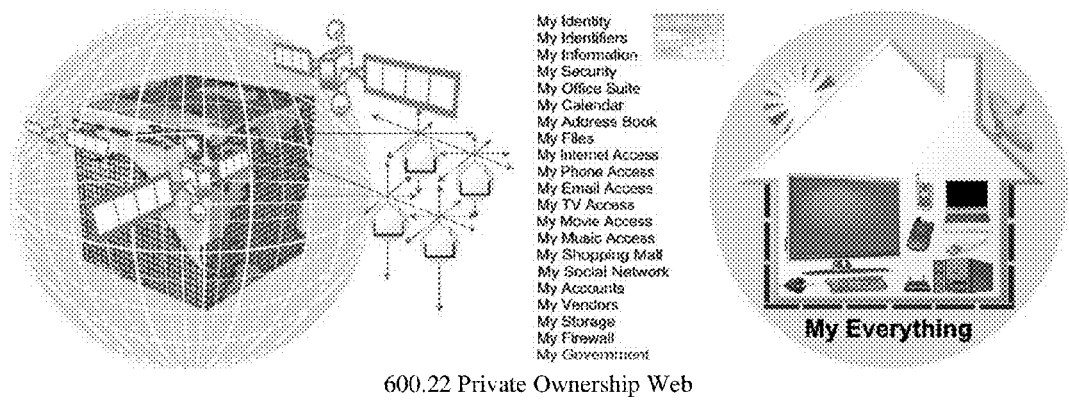
600.22 Private Ownership Web

FIG. 110 Exemplary Embodiment - Unitary Semantic Web

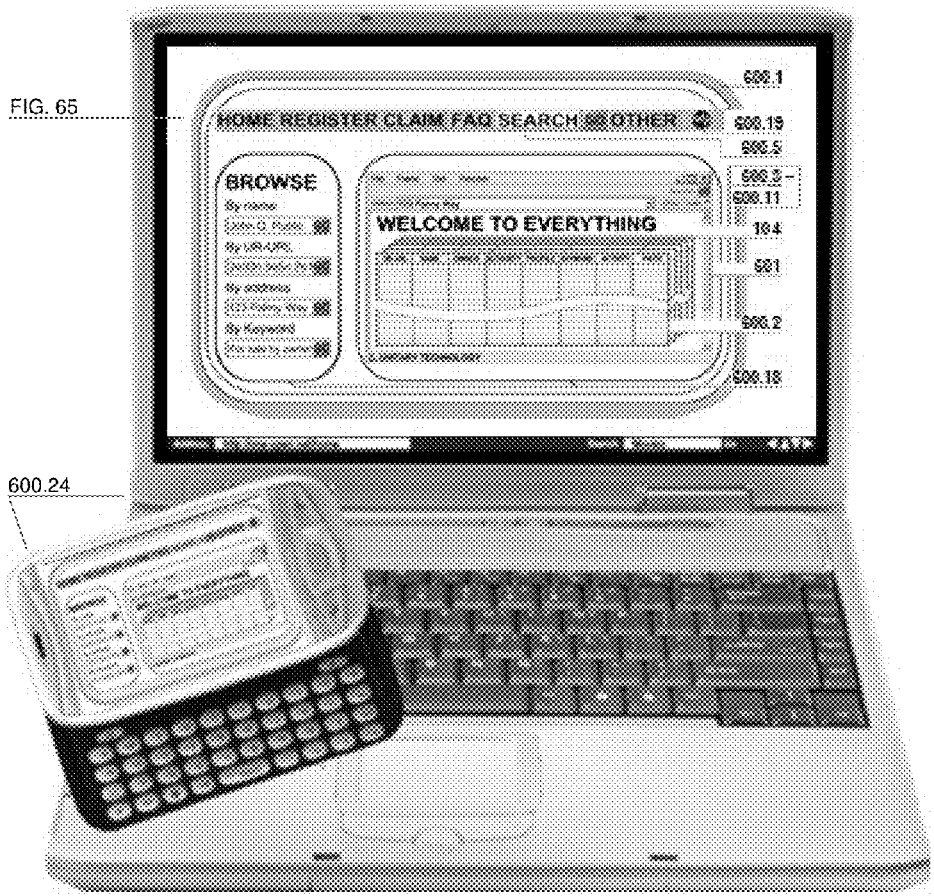

600.23 Website, Search Engine, Registry of Claims, and Directory of Everything in the Public Domain

| | | | |
|---|---|---|---|
| 101 | UR-URL Identifier Method | 600.8 | COTS or Open Source Predicate Logic Software |
| 104 | Database of Everything | | |
| 600 | Unitary Apparatus | 600.9 | COTS or Open Source Web Page Software |
| 600.1 | COTS or Open Source Computer System | | |
| 600.2 | Event Data | 600.10 | COTS or Open Source Browser Software |
| 600.3 | Navigation Bar With Links | | |
| 600.4 | Shell | 600.11 | Tabular Architecture Rows and Columns |
| 600.5 | COTS or Open Source Spreadsheet Software With Search and Hyperlinks | | |
| | | 600.19 | Access |
| 600.6 | COTS or Open Source Database Software | 600.24 | Information Systems |
| 600.7 | COTS or Open Source Shell Software With Simple Tools | 601 | Unitary Shell |
| FIG. 65 | Sample Web Portal to Everything Page 1 | | |

FIG. 111 Block Diagram of Computing Module
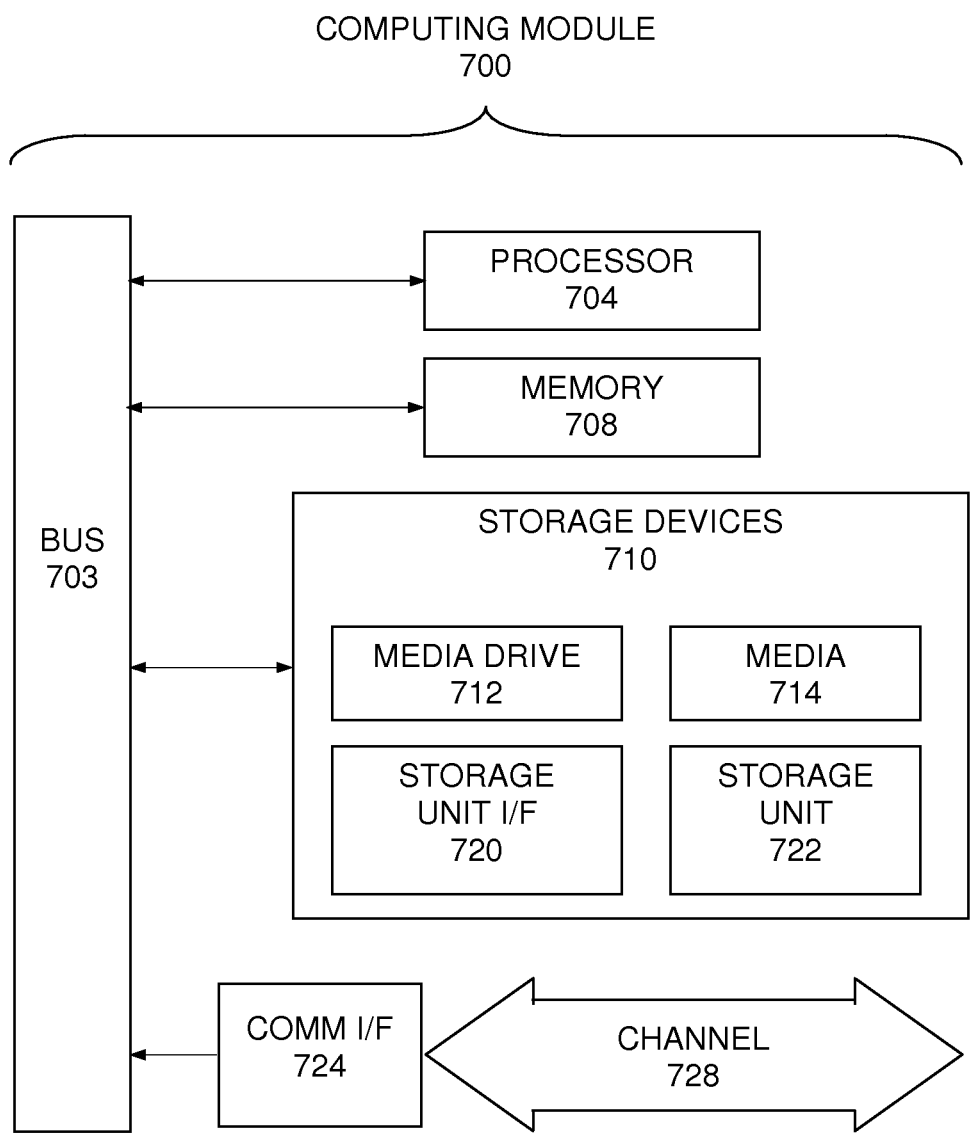

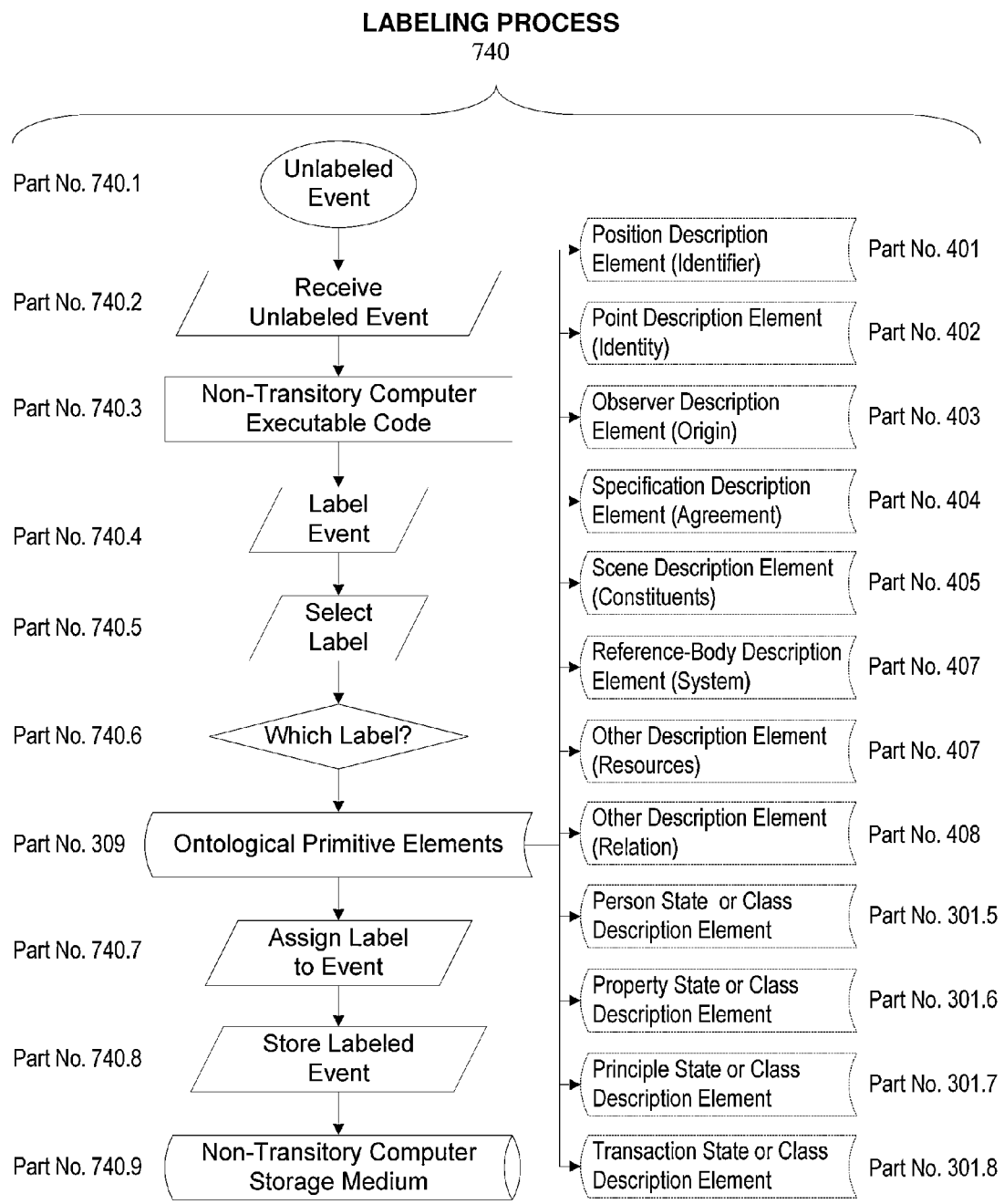
FIG. 112 Block Diagram of Event Claim Labeling Process

FIG. 113 Sample Listings of Labeled Claims to Event Ownership

SAMPLE LABELED CLAIMS
750

| | |
|---|---|
| 101 | UR-URL Identifier Method |
| 750.1 | Claims to Ownership of the Event of "Rock Concert" |
| 750.2 | Claims to Ownership of the Event of "Sky" |
| 750.3 | Claims to Ownership of the Event of "Human Thinking" |
| 750.4 | Claims to Ownership of the Event of "God" |
| 750.5 | Claims to Ownership of the Event of "Fortune Telling" |
| 750.6 | Claims to Ownership of the Event of "Tarot Website" |

| Name | Owner | Authority | Keyword | Path | UR-URL | 101 |
|---|---|---|---|---|---|---|
| Rock Concert | Fan 1 | Affidavit | Class: Claim; Desc Awesome | www.fan1.home/com | xyz1-t1 | 750.1 |
| Rock Concert | Fan 2 | Affidavit | Class: Claim; Desc: Happy to say farewell finally | www.facebook.com/fan2 | xyz1-t1 | |
| Rock Concert | Fan 3 | Affidavit | Class: Claim; Desc Check out selfies with band! | www.instagram.com/fan3 | xyz1-t1 | |
| Rock Concert | Rock Band | State Div Corps | Class: Legal Person; Desc: Tour dates & info | www.rockbandofficialsite.com | xyz1-t1 | |
| Rock Concert | Promoter | City Permit # | Class: Function; Desc: Final Farewell Tour | www.promoter.com/concerts | xyz1-t1 | |
| My Thinking | Person 1 | Affidavit | Class: Declaration; Desc: I'm hungry | www.twitter.com/#Person1 | xyz1-t1 | 750.2 |
| My Thinking | Person 1 | Affidavit | Class: Declaration; Desc: I'm at Pizza Hut | www.twitter.com/#Person1 | xyz1-t2 | |
| My Thinking | Person 1 | Affidavit | Class: Declaration; Desc: Mmm. Good pizza | www.twitter.com/#Person1 | xyz1-t3 | |
| Person 1 Thinking | Monitor-u Corp | Contract # | Class:IP; Desc: Sensor data 1 @ Person 1 | www.monitor-u.com | xyz1-t1 | |
| Person 1 Thinking | Monitor-u Corp | Contract # | Class:IP; Desc: Sensor data 2 @ Person 1 | www.monitor-u.com | xyz1-t2 | |
| Person 1 Thinking | Monitor-u Corp | Contract # | Class:IP; Desc: Sensor data 3 @ Person 1 | www.monitor-u.com | xyz1-t3 | |
| Sky | NOAA | USGOV | Class: Non-Profit; Desc: Natl Weather Svc | www.weather.gov | xyzt1 | 750.3 |
| Today's Sky | The Weather Guy | Fox News | Class: IP; Desc: Weather Forecast | www.fox.com/l | xyzt2 | |
| Vanilla Sky | Vinyl Films | IMDb | Class: IP; Desc: A 2001 scifi thriller film | www.vanillaskymovie.com | xyzt3 | |
| Vanilla Sky | Vanilla Sky LLC | Italy Div Corps | Class: Legal Person; Desc: Italian punkband | www.vanillaskyrock.com | xyzt4 | |
| Sky Blue | Crayola Corp | USPTO | Class: IP; Desc: #108 Hex Code #80DAEB | www.crayola.com | xyzt5 | |
| Sky | Merriam-Webster | USPTO TM#, © | Class:IP; Desc: 1: the upper atmosphere | www.m-w.com/dictionary/sky | xyzt6 | |
| God | Virginia | Affidavit | Class:Declaration; Desc: Yes, there is a God | www.virginia.com | xyzt1 | 750.4 |
| God | Pastor Tom | Holy Bible | Class: IP; Desc: Sermons from the Bible | www.Pastortomsblog.com | xyzt2 | |
| God | Holy See | Encyclical# | Class: Principle; Desc: Infallability | www.vatican.va | xyzt3 | |
| God | Merriam-Webster | USPTO TM#, © | Class: IP; Desc: the supreme or ultimate reality | www.m-w.com/dictionary/god | xyzt4 | |
| Fortune Telling | Astrology Network | Au Div Corps | Class: IP; Desc: readings using different spreads | www.astrology.au | xyzt1 | 750.5 |
| Fortune Telling | Wikipedia | USPTO TM#, © | Class: IP; Desc: predicting info @ a person's life | www.wikipedia.org | xyzt2 | |
| Fortune Telling Fish | Fortune Fish | State Div Corps | Class:IP; Desc: Put 'em in the palm of your hand | www.fortunetellerfish.com | xyzt3 | |
| Fortune Telller | Merriam-Webster | USPTO TM#, © | Class: IP; Desc: one that foretelsl future events | www.m-w.com/dictionary/ft | xyzt4 | |
| Tarot Website | Madame Cleo | State Div Corps | Class: IP; Desc: Call me now! | www.cleo.com | xyzt1 | 750.6 |
| Tarot Web Home | Madame Cleo | Tarot Website | Class: IP; Desc:Products and Services | www.cleo.com/home. | xyzt1.1 | |
| Tarot Layouts | Madame Cleo | Tarot Web Home | Class: IP; Desc: Many layouts to choose | www.cleo.com/home/lo | xyzt1.1.1 | |
| Tarot Cards | Madame Cleo | Tarot Layouts | Class: IP; Desc: Free first reading | www.cleo.com/home/lo/c | xyzt1.1.1.1 | |
| Major Arcana | Madame Cleo | Tarot Cards | Class: IP; Desc: Personality Archetypes | www.cleo.com/home/lo/c/a | xyzt1.1.1.1.1 | |
| 0 Fool Child | Madame Cleo | Major Arcana | Class:IP; Desc: life and a new beginning | www.cleo.com/home/lo/c/a/l | xyzt1.1.1.1.1.1 | |
| 1 Magician | Madame Cleo | Major Arcana | Class:IP; Desc: symbolizes the law of talent | www.cleo.com/home/lo/c/a/l | xyzt1.1.1.1.12 | |

FIG. 114 Unitary Tools
UNITARY TECHNOLOGY
760
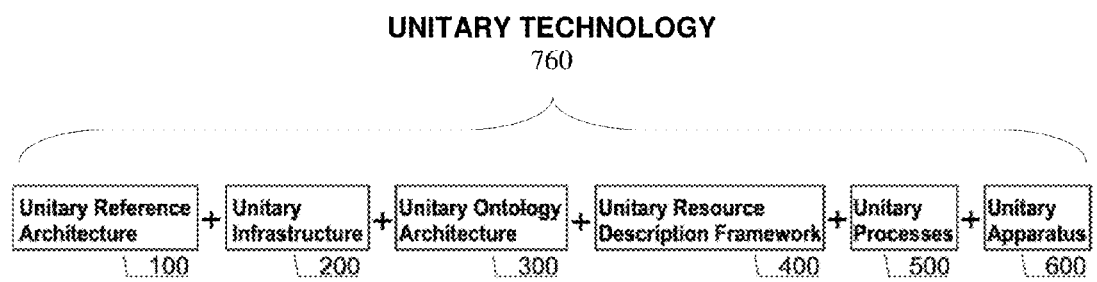
FIG. 115 Concept Map
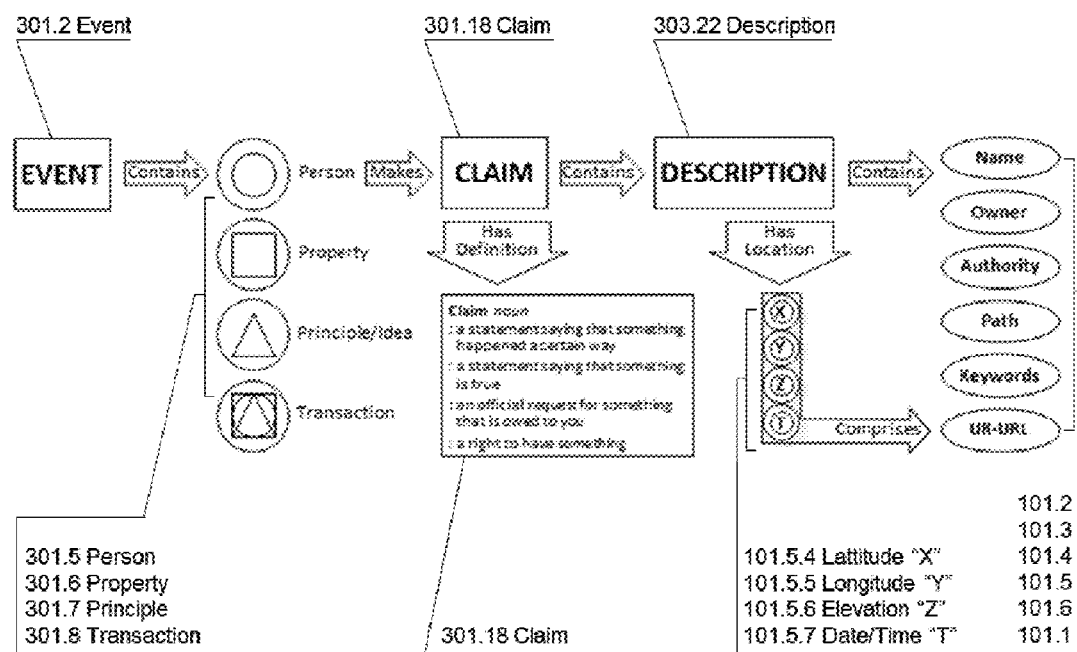

SEMANTIC MODEL OF EVERYTHING RECORDED WITH UR-URL COMBINATION IDENTITY-IDENTIFIER-ADDRESSING-INDEXING METHOD, MEANS, AND APPARATUS

RELATED APPLICATIONS

This application is a continuation-in-part of U.S. patent application Ser. No. 13/725,673 filed on Dec. 21, 2012, which is a continuation-in-part of U.S. patent application Ser. No. 12/802,058 filed on May 28, 2010, which is a continuation of U.S. patent application Ser. No. 10/231,085 filed on Aug. 29, 2002, which claims priority to U.S. Provisional Application No. 60/315,923 filed on Aug. 31, 2001, the contents of which are incorporated herein by reference in their entireties.

TECHNICAL FIELD

The present invention relates generally to event identity, where everything is defined as an event. The general field is event identity as applied in the context of symbolic representation of resources in a global network of information and communication systems. The more specific field is event identity as a control element in lists, tables, and relational database systems, and as essential network information infrastructure. The present invention is a Semantic Model of Everything Recorded according to FIG. 1, hereinafter named and referred to as simply Model of Everything, where everything recorded comprises claims of event description.

Analog Context

Reality is everything real. Real is what's known and agreed to. The public domain represents the record of what's known and agreed to. Assertions are claims made by people about themselves and their property. "Facts" are claims authenticated by credible witness. Ideas, discoveries, theories, principles, and other non-objective things in |EVERYTHING|, as well as real and personal property, are circumscribed by agreements about ownership in the form of authenticated claims by authenticated maker-owners. Individuals and businesses voluntarily record claims of ownership because that's the information they want people to know.

Thus, the terms reality, everything real, and |EVERYTHING|, for the purposes of a Model of Everything, are defined as the sum total of all the agreements we have about it. The scope of a Model of Everything is bounded by the evolving analog (real world) agreements that comprise our social, economic, and political compacts captured and recorded in proceedings, publications, libraries, journals, files, folders, computers, and media, all over the world.

This is the historical record of everything real. This is the scope of the present invention, which usefully identifies, differentiates, and correlates identity for all events, including all property "objects" and all ownership "assertions" with one common reference architecture. Other methods are limited to identifying many events.

Unitary Reference Architecture is at the same time a combination identity-identifier-addressing-indexing method and a new IT architecture for the current generation of information networks. Additionally, it is a next generation unitary programming syntax method. Plus, it is a future generation representational medium for depicting, manipulating, directing, sequencing, synthesizing and controlling information events in digital environments.

It will be made apparent that the present invention meets widespread demand for a comprehensive solution to longstanding problems considered unsolvable by experts who have tried and failed. It also reveals and remedies an unrecognized defect, and provides both the desired end and unexpected collateral results across the whole domain of information systems and application subsystems that use and depend on identity for essential operations.

Structural Context

What's information architecture? "At its most basic, information architecture is the construction of a structure or the organization of information. In a library, for example, information architecture is a combination of the catalog system and the physical design of the building that holds the books. On the Web, information architecture is a combination of organizing a site's content into categories and creating an interface to support those categories."[3]

Here's a definition from experts Rosenfeld and Morville from Argus Associates: "Information architecture involves the design of organization, labeling, navigation, and searching systems to help people find and manage information more successfully."[4] Information architecture is another term for the present invention's identity addressing and indexing method.

According to Webster, a system is "a regularly interacting or interdependent group of items forming a unified whole."[5] In practice, "The System" is the set of regularly interacting and interdependent federal, state, regional and local agreements we call our civil society. It's formalized as rules—laws, contracts, ordinances, covenants, norms, agreements, principles, values—the definitions about how we interact as economic beings. The rules we share are the reference architecture of society. These agreements are captured in various analog media as files, records, microfiche, documents, books, text, graphics, and various lists and tables.

Technical Context

In computer science, a data structure is a particular way of storing and organizing data in a computer so that it can be used efficiently. A data model represents semantic information associated with objects stored in a file system. Arrays are among the oldest and most important data structures, and are used by almost every program. They are also used to implement many other data structures, such as lists and strings. They effectively exploit the addressing logic of computers. In most modern computers and many external storage devices, the memory is a one-dimensional array of words, whose indices are their addresses. Processors, especially vector processors, are often optimized for array operations. In some cases, the term "vector" is used in computing to refer to an array, although tuples rather than vectors are more correctly the mathematical equivalent. Arrays are often used to implement tables, especially lookup tables; the word table is sometimes used as a synonym of array. List and database size is limited by the quantity of available variables within the ID numbering system's nomenclature.

What makes a bunch of data "a system" is that it has at least one thing in common and at least one thing that's different. One way you keep track is by numbering the things, which meets the condition for difference. There can't be two with the same ID number. If you have one list with a number method, say one through ten, and another list with an alpha method, ordered A to Z, and combine them, it's OK as long as all the identifiers are unique. It's still a system, if the two lists have something else in common, maybe the purpose or owner or anything. Having a field for unique identifiers in the first place can be the thing the two systems have in common.

The only mandatory field in a table is the identifier. The unique identifier is usually the first column in a relational table or spreadsheet. Off the shelf programs like Excel and Lotus 1-2-3 have reference architecture that stipulates numbered rows and alpha columns with unique identifiers for each cell made up of the reference coordinates as a code: A1, B2 . . . conveniently built into the page for at-a-glance orientation. Having addresses for all the cells means you can do things with individual data, as well as with groups, or columns and rows of data. This kind of organization is the foundation of information science because pretty much all of the information in the world is part of some kind of list or table in some kind of file.

The easiest way to combine information in two old different systems is to make a new bigger file with both. This is called merging and the technical term is data integration. Regardless of whether your purpose is to upgrade old internal systems or to communicate with new external systems, if you want to integrate data, you have to design a new identifier code that will ensure all the individual items in all the tables have unique identity in one combined system. Common fields, like name and address, are rarely unique. Interoperability is facilitated by common identity nomenclature. If you agree up front about the semantic architecture, you don't have costly conversion projects every time you add another partner.

Integrated End-To-End Solution

The present invention's Unitary Technology delivers an end-to-end architecture for identifying, owning, naming, differentiating, representing, describing, depicting, illustrating, modeling, simulating, synthesizing, replicating, relating, connecting, associating, combining, merging, integrating, unifying, organizing, classifying, indexing, locating, addressing, positioning, routing, maintaining, storing, retrieving, finding, sharing, improving, sequencing, instructing, operating, manipulating, and controlling information events with one approach, one infrastructure, one architecture, one method, and one principled basis—a singular solution.

DESCRIPTION OF RELATED ART

The differences between the present invention and prior art lie in simple scope, as well as specific application. Digital Earth[16] is cited as a massive global initiative to create a digital linked network of terrestrial data using digital mapping and locating technologies (GPS/Global Positioning System geospatial reference coordinates) to represent the earth's geographical features. Their scope includes the spectrum of very large (oceans and continents) to very small (media rich descriptive meta data attached to a narrowly circumscribed area) phenomena. Digital Earth represents objects in a distributed network of servers with multiple addressing methods.

The Universal Semantic World Wide Web[17] is a requirements description of an ideal web representation. According to the World Wide Web Consortium's (W3C) "Principles of URI/ID Design,"[8] the key features of an ideal Universal Resource Identifier (URI) are Uniqueness, Universality, Persistence, Scalability, Evolvability, Opacity, No Side-effects, Global uniqueness, Optional sameness, Fully Non-dereferenceable, Infinite number of referential mints, Myriad interchangeable code variations within same referential system.

Embodiments of the present invention meet these criteria. Furthermore, it demonstrates W3C ideal design principles, which are Simplicity, Modular Design, Tolerance, Decentralization, Test of Independent Invention, and Principle of Least Power.

Embodiments of the present invention combine the content vision of the first with the semantic approach of the second.

BRIEF SUMMARY OF THE INVENTION

The present invention is made up of: a unitary information architecture, a method for self-minted self-service identity, a scalable business process for integrating data from different tables and/or from different systems into one combined system, a method to organize everything, and a search engine and directory to make it all accessible. There's also a programming process and language, a modeling medium, and a number of interesting applications that in further combination provide a new roadmap, a new on-ramp, and a new routing mechanism for commuters on the information super-highway.

Unitary Identity

Traditional object oriented approaches begin with objects as entities that own properties, relations, and participation in events. Objects are accumulated in functional databases where difference—more apparent than commonality—drives an army of upgrade licenses marching side by side. The inventory control system has one kind of information, the human resource system another, which may or may not match the resource pool in the scheduling system, and there are often legacy data pockets that don't match anything.

In contrast, Unitary Technology starts with relativity and an event orientation. Everything is an event. Events are entities that own objects. And makers own events and artifacts. The event of object, what's being recorded in the list, is a semantic representation of either original incept of the aggregation of constituents, the preliminary definition in the system, or update—a change to any aspect of original condition.

Universal Referential—Uniform Resource Locators (UR-URL) comprise relative referential geocoordinates (XYZT). UR-URL provides one common table field and one common nomenclature to describe the one thing that everything has in common—incept. The field that unifies, but differentiates is XYZT/incept. It's already a unique name, if you stipulate both location and time in terms of referential relationship and ownership. Ownership is the key to differentiating many claims sharing one event identity.

Independent Minting

With Unitary Technology, each system (internal and external) may be treated as a subsystem to the whole with addresses relative to any point and scale. Reuse and integration are easy. Systems using different references are easily converted to equivalency. Owners mint identifiers. Identifiers correspond to real objects, assertions, and artifacts, actual times and places. Longitude, latitude, and elevation coordinates come in different varieties. E-Gov will likely apply some standard georeferencing convention for official use. Conversion formats and formulas will be bundled as plug-ins. It won't matter which standard references or syntax are used within any given system, what will matter is real-time agreement to protocols when two systems exchange data.

Unitary Ontology

Unitary ontology is fundamental technology. The following logical statement stipulates one super-ordinate unitary ontological architecture. Basis: Everything is an event. Objects are events. Assertions are events.

| 0. ALL EVENTS - EVERYTHING | | | |
|---|---|---|---|
| 1.0. EVENT ASSERTIONS | | 1.1. EVENT OBJECTS | |
| 1.0.0. PRINCIPLE | 1.0.1. TRANSACTION | 1.1.0. PERSON | 1.1.1. PROPERTY |

The terms Event Assertion and Event Object are defined as inclusive of and synonymous with generally held top-level divisions of everything, i.e.: physical or non-physical, tangible or intangible, matter or mind, thing or concept, object or subject, property or agreement, phenomena or noumena, and so forth. All other ontologies are by this definition Derivative Ontologies.

All existing ontologies, taxonomies, and classification systems fall within their respective domains as either Event Assertions or Event Objects. Unitary Ontological Reference Architecture does not attempt to specify variety or number of referential systems. Indeed, the function of unitary ontology is to establish an all-inclusive framework within which any number of classification systems and parameters may be employed.

The secondary purpose of establishing one unitary ontological reference architecture is to usefully and universally categorize the domain [EVERYTHING] so as to make information accessible. The primary purpose of Unitary Ontological Reference Architecture is to show conclusive evidence that the domain [EVERYTHING], as defined herein, and claimed by the present invention, is indeed inclusive of everything. No other method claims all events, which if you agree with Einstein, is everything. No other method claims all objects and all assertions, which is everything if you use common non-relativistic definitions. Details of Unitary Ontology Architecture are depicted in the several views of the drawings.

Unitary Information Architecture

One information architecture doesn't mean all the information in the universe is contained in one place, on one server, of one type, in one language, or one database. It means all the information everywhere can have the same basic set of terms, the same system of identifiers, the same organizing basis, and the same classification conventions so all the information and communication events can be sensibly integrated for fast access by both users and agents, internally and with partners. Plus, common terms simplify multi-dimensional analysis across disparate data sets.

Unitary Technology

Unitary Technology culminates the drive for information on demand with a blueprint for the ultimate resource—the present invention—one referential system and Semantic Model of Everything Recorded.

BRIEF DESCRIPTION OF THE SEVERAL VIEWS OF THE DRAWINGS

List of Figures

View I—Identity of Everything—Zero Dimension
FIG. 1 Everything
FIG. 2 Construction of Everything
FIG. 3 Deconstruction of Everything
FIG. 4 Dimension of Everything
FIG. 5 Extent of Everything
FIG. 6 Description of Everything
FIG. 7 Unitary Reference Architecture Components
FIG. 8 Alignment of Scope and Components
FIG. 9 Relation of Scope and Components
FIG. 10 Everything Components
FIG. 11 Unitary Reference Architecture Components
FIG. 12 UR-URL Identifier Method Components
View II—List of Everything—One Dimension
FIG. 13 List of Everything Components
FIG. 14 List View
FIG. 15 List With Prior Art Reference Architecture
FIG. 16 List With Unitary Reference Architecture
View III—Table of Everything—Two Dimensions
FIG. 17 Table of Everything Components
FIG. 18 Table View
FIG. 19 Table With Prior Art Reference Architecture
FIG. 20 Table With Unitary Reference Architecture
FIG. 21 Top-Level Ontology
FIG. 22 Event Ontology
FIG. 23 Relative Event Ontology
FIG. 24 Entity Ontology
FIG. 25 Object Ontology
FIG. 26 Ontology of Origination
FIG. 27 Ontology of Dimension
FIG. 28 Ontological Integration
FIG. 29 Dimensional Integration
FIG. 30 Alignment Between Primitive Terms
FIG. 31 Matrix of Ontological Terms
FIG. 32 Ontology of Everything
FIG. 33 Table With Unitary Resource Description Framework (RDF)
FIG. 34 Table With Extended Unitary Resource Description Framework (RDF)
FIG. 35 Table With Simple Unitary Resource Description Framework (RDF)
FIG. 36 Table With Unitary Reference Architecture, Ontology, (RDF), Hardware and Software
View IV—Database of Everything—Three Dimensions
FIG. 37 Database of Everything Components
FIG. 38 Database View
FIG. 39 Database With Prior Art Reference Architecture
FIG. 40 Database With Unitary Reference Architecture
FIG. 41 Database With Unitary Reference Architecture, Hardware and Software
View V—Platform for Everything—Four Dimensions
FIG. 42 Platform for Everything Components
FIG. 43 Platform View
FIG. 44 Identity Expressions
FIG. 45 Logical Expressions
FIG. 46 Correspondence Between Expressions
FIG. 47 Description Expressions
FIG. 48 Programmatic Expressions
FIG. 49 Diagrammatic Expressions
FIG. 50 Menu Expressions
FIG. 51 Prior Art Menu Synthesis and Simplification
FIG. 52 Simplified Menu Expressions
FIG. 53 Unitary Platform
FIG. 54 Current Embodiment Access Process
FIG. 55 Web Services Vendor Mint Access Process
FIG. 56 Worst Case Future Vendor Mint Access Process
FIG. 57 Present Invention Access Process
FIG. 58 Access Process Comparison
FIG. 59 Direct Ownership Process Components
FIG. 60 Intermediary Ownership Process Components
FIG. 61 Ownership Process Components Comparison
View VI—Web Portal to Everything—All Dimensions
FIG. 62 Web Portal to Everything Components
FIG. 63 Web Portal View
FIG. 64 Unitary Web Portal
FIG. 65 Sample Web Portal to Everything Page 1
FIG. 66 Sample Record 1
FIG. 67 Sample Record 2
FIG. 68 Sample Record 3
FIG. 69 Sample Record 4
FIG. 70 Sample Record 5
FIG. 71 Sample Record 6
FIG. 72 Sample Record 7
FIG. 73 Sample Record 8
FIG. 74 Sample Record 9
FIG. 75 Sample Record 10
FIG. 76 Sample Records Summarized
FIG. 77 Sample Web Portal to Everything Page 2

FIG. 78 Enterprise Record Examples
FIG. 79 Enterprise Record Example Detail
FIG. 80 Present Invention Part List Example
FIG. 81 Homepage 1
FIG. 82 Homepage 2
FIG. 83 Homepage 3
FIG. 84 Homepage 4
FIG. 85 Homepage 5
FIG. 86 Homepage 6
FIG. 87 Homepage 7
FIG. 88 Homepage 8
FIG. 89 Homepage 9
FIG. 90 Homepage 10
FIG. 91 Homepage 11
FIG. 92 Homepage 12
FIG. 93 Alignment Between Components and Component Parts of Unitary Reference Architecture
FIG. 94 Alignment Between Parts and Part Numbers of Unitary Reference Architecture
FIG. 95 Model of Everything Apparatus
FIG. 96 Sample Embodiment
View VII—Event-Oriented View—Architectural Dimensions
FIG. 97 Unitary Object Identity Array
FIG. 98 Unitary Event Identity Array
FIG. 99 Unitary Ontological Architecture
FIG. 100 Unitary Apparatus Structure
FIG. 101 Unitary Event RDF Architecture
FIG. 102 Comparison With Common Architectures
FIG. 103 Integration With Common Architectures
FIG. 104 Event Oriented Semantic Structure Illustrated
FIG. 105 Enterprise Information Asset Embodiments
FIG. 106 Enterprise Information Asset Ownership
FIG. 107 Sample Enterprise Information Asset Functions
FIG. 108 Enterprise Information Asset Management
FIG. 109 Comparison Between Webs
FIG. 110 Unitary Semantic Web
FIG. 111 Block Diagram of Computing Module
FIG. 112 Block Diagram of Labeling Process
FIG. 113 Sample Listings of Claims to Event Ownership
FIG. 114 Unitary Tools
FIG. 115 Concept Map

LIST OF TABLES

Table 1 Alignment Between Dimensional Views, Figures, Parts, and Numbering Nomenclature
Table 2 Sample Event Function Set Options
Table 3 MS Office Product Main Menu Examples—One Hundred and Two Objects
Table 4 Main Menu Synthesis—Twenty-Five Objects
Table 5 Sample Unitary Main Menu Optional Arrangements
Table 6 Unitary Terms of Description

DESCRIPTIONS

The present invention is a semantic information Model of Everything 1000. Drawings illustrate the deconstruction of the conceptual singularity "everything" through successive dimensional views of components and parts in order to demonstrate claims to universality: "infinitely extensible" and "universally applicable" and "everything in one system and all systems in one system"—that "everything" really is |EVERYTHING| recordable. Universality is made apparent in figures which define what everything is, and show that everything:

1. can be scientifically identified, differentiated, and integrated with UR-URL Identifier Method 101
2. can be versionalized by dimension with Unitary Infrastructure 200
3. can be grouped and classified with Unitary Ontology Architecture 300
4. can be scientifically described with six universal terms of Unitary Resource Description Framework 400
5. can be operationalized with Unitary Process Architecture 500
6. can be packaged and delivered with Unitary Apparatus 600

At one end of the spectrum, everything is one thing—one whole. At the other, everything is an exponentially huge quantity of quantum particles in various arrangements and versions. There are many ways to systematize everything, and many ways to order explanations and images. To establish and maintain coherence throughout the many figures necessary for as large a subject as |EVERYTHING|, drawings are grouped in six dimensional views. Six high-level components shown in FIG. 1 correlate by dimension as listed in Table 1. Sub-part numbers correlate to components and are, with a few exceptions, coded with the view identity (1, 2, 3, 4, 5, or 6) as the last digit of the part number.

TABLE 1

Alignment Between Dimensional Views, Figures, Parts, and Numbering Nomenclature

| FIG. # | DIMENSIONAL VIEW | COMPONENT | PART # | SUB-PART # |
|---|---|---|---|---|
| FIGS. 1-12 | 0-D Identity | Unitary Reference Architecture | 100 | 100's |
| FIGS. 13-16 | 1-D Information | Unitary Infrastructure | 200 | 200's |
| FIGS. 17-36 | 2-D Object | Unitary Ontology Architecture | 300 | 300's |
| FIGS. 37-41 | 3-D System | Unitary RDF | 400 | 400's |
| FIGS. 42-61 | 4-D Process | Unitary Process Architecture | 500 | 500's |
| FIGS. 62-92 | All-D Unification | Unitary Apparatus | 600 | 600's |

The next four figures show additional big-picture views of the whole organizational structure. FIG. 93 Alignment Between Component Parts of Unitary Reference Architecture shows "parts added" with each successive higher order component; FIG. 94 Alignment Between Part Numbers of Unitary Reference Architecture, shows relationships between substructures; FIG. 95 Model of Everything Apparatus Reference shows all the apparatus parts in one drawing; and FIG. 96 depicts a sample embodiment. The final figures represent event-oriented architectural views.

I Identity of Everything View—Zero Dimension
FIG. 1 Everything

Everything, also referred to in absolute brackets |EVERYTHING|, is not a part or a component. Everything is the analog original that Model of Everything 1000 is a model "of".

Model of Everything 1000 has foundation in Principle 1.1, a term which stands for the principle of unity on which the present invention rests, and the principles combined to make the present invention. Old analog principles of relativity are combined with old and new principles of information science and applied in a new context of event identity architecture. Resultant is further combined with old analog principles of private ownership and old principles of citizenship in a new universal identity architecture—the present invention—method, means, and apparatus for identifying, describing, and locating information events and information resources, with the unique feature of universal extensibility across the domain of |EVERYTHING| recordable, defined on Page 2 [0003], "Analog Context", and again as follows:

Everything$_2$
1a: all that exists
1b: all that relates to the subject
2: every member or individual component of
3: the whole number or sum of All$_2$
1a: the whole amount or quantity of
1b: as much as possible
2: every member or individual component of
3: the whole number or sum of
4: every Reality$_2$
1: the quality or state of being real
2a (1): a real event, entity, or state of affairs
   (2): the totality of real things and
2b something that is neither derivative nor dependent but exists necessarily
   —in reality:in actual fact Model$_2$
2: copy, image
4: a miniature representation of something; also: a pattern of something to be made;
7: archetype;
10b: a type or design of product;
12: a system of postulates, data, and inferences presented as a mathematical description of an entity or state of affairs.

Per above definitions, the present invention's Model of Everything 1000 is at the same time a "semantic copy" of our analog system, a "miniature" digitized information version of analog known and claimed reality, a "pattern" to build modular integrateable systems, a technology "product", and "a system of postulates, data, and inferences presented as a mathematical description of [everything]," where the term "mathematical description" in elemental form is comprised of a reference number (a unique identifier) and name (alpha and/or numeric identity characters/symbols) for each thing.

|EVERYTHING| is taken to mean everything known, specifically all known reality as captured in analog and digital event records of event incept claims made by owners-makers-discoverers-originators in a distributed network of information system resources maintained in various storage media worldwide. The present invention's identifier method, UR-URL 101, is based on the discovery that relative referential geotemporal coordinates, applied as unique identifiers to event claims in a system of ownership that corresponds with analog principles of private ownership and citizenship, make possible the construction of a Model of Everything 1000. As noted in other sections of the present specification, relative referential geotemporal coordinates may be infinitely extended; relative referential geotemporal coordinates may be associated with objective things; and, relative referential geotemporal coordinates may be associated with maker-owner-discoverers at event incept. What's yet to demonstrate is that "everything"=|EVERYTHING|—which will be made apparent in figures.

Figures are best understood as a multi-assembly bill of materials. Components, sub-components, and parts are arranged in tree-form and read as "goes into" charts—what's below "goes into" what's above. Conversely, what's above is "made up of" what's below.

FIG. 1 Everything depicts the structure of |EVERYTHING| as high-level components of the present invention, Model of Everything With UR-URL Combination Identity, Identifier, Addressing, and Indexing Method, Means, and Apparatus 1000, also referred to in embodiment Model of Everything 1000. FIG. 1 provides a reference map for the overall architecture of Model of Everything 1000. Model of Everything 1000 is made up of six components: Unitary Reference Architecture 100, Unitary Infrastructure 200, Unitary Ontology Architecture 300, Unitary Resource Description Framework (RDF) 400, Unitary Process Architecture 500, and Unitary Apparatus 600. Components with sub-components and parts are individually discussed in figures that follow.

FIG. 2 Construction of Everything

FIG. 2 depicts Levels of Abstraction 202.2, which is a sub-component of Dimension 202—shown as a component of Unitary Infrastructure 200 in FIG. 1. Parts of Levels of Abstraction 202.2 are conceptual dimensions of everything;

202.2.1 Explication
202.2.2 Aggregation
202.2.3 Organization
406.3 Integration
202.2.4 Synthesis
202.2.5 Resolution
202.2.6 Unification To understand what anything is made of, Levels of Abstraction 201.2 provide iterative process steps which may be employed top-down or bottoms up, or from any level up or down. By starting with a whole, and using a top-down approach, successive divisions lead to enumeration of individual elements. Conversely, starting with individual elements and a bottoms-up approach, systems are created through successive combinations until the final duality is resolved, and the whole circumscribed.

FIG. 3 Deconstruction of Everything

Levels of Abstraction 202.2 are used to think about what |EVERYTHING| is made of. It would be very difficult to start at the bottom and list everything without thinking in kinds. It would be impossible to know if each thing was represented without using kinds, but it would also be very difficult to list every kind without thinking in systems. And still, there is no assurance that one system or another has not been omitted altogether, so a top-down approach is used to deconstruct everything.

Starting at the top, the question is, what is the system identity of the model? What is the "original" a system "of"? According to Relativity 302 everything is an Event 301.2, and each thing is an Event 301.2. Model of Everything 1000 is a model of All Events 201.6 in everything.

The next question is, what are labels for the top two or three main groupings in everything, such that there are no elements not in a grouping? Animal-vegetable-mineral is a common way people think about everything. More common is physical-abstract, which takes into account the domain of ideas.

FIG. 3 depicts everything as a continuum with All Events 201.6 in the center at the Integration 406.3 dimensional level. All Events 201.6 represents intersection of physical and abstract, with Mountains of Matter 201.1.7 at one extreme on top of Icebergs of Ideas 201.1.8 at the other. Everything known is a lot of things and a lot of information. But everything known is either physical or abstract and nothing known is not physical or abstract. At this first stage of deconstruction, the objective version of the model includes everything.

FIG. 4 Dimension of Everything

Then, Levels of Abstraction 202.2 are also used to think about what Mountains of Matter 201.1.7 and Icebergs of ideas 201.1.8 are made up of. Mountains of Matter 201.1.7, taken as a whole, comprise Object of Everything 201.1.6. That is all of physical reality.

What are labels for the top groupings in physical reality? Physical reality is organized in systems, and systems of systems. Domain Objects 201.1.5 is an inclusive term for "systems of systems" and Event System Object 201.1.4 is a label that applies to systems, which are collections of things or ideas cohered by common group label.

Everything could be divided into successive domain slices, but at this stage of deconstruction the names and knowledge arenas don't matter. What's needed now are terms that generalize the "kinds" of objects that form each level's divisions of everything. Event Domain Objects 201.1.5 and Event System Objects 201.1.4 apply.

At the center, the Integration 406.3 level, is the analog state of material embodiment of wholes in relative motion, each an Event 301.2 and altogether All Events 201.6, comprising the entire complement of singular things and their organized aggregations of parts, pieces, and properties, which are represented as Event Objects 201.1.3, and their descriptive Event Information 202.1.2. The original relation of event object and event information is established when owners make claims that define the identity of each thing with symbols—name and unique Event Identities 201.1.1. FIG. 4 depicts seven universal dimensions of embodiment in Layers of Objects 201.1;

201.1.1 Event Identities
201.1.2 Event Information
201.1.3 Event Objects
201.6 Events
201.1.4 Event System Objects
201.1.5 Event Domain Objects
201.1.6 Object of Everything Each thing in both physical and abstract dimensions is an Event 301.2 in All Events 201.6. Event forms represented in Model of Everything 1000 include embodiments that range from physical to abstract. At this second stage of deconstruction, the dimensional version of the model includes everything.

FIG. 5 Extent of Everything

By considering the dimensions of everything, the extent of everything may be circumscribed as scope elements shown in FIG. 5. Scope of Everything 201, which consolidates dimensional terms into one set of six dimensioned levels of reality which collectively represent everything as inclusive ranges of conceptual description.

201.1 All Identities
201.2 All Information
201.3 All Objects
201.4 All Systems
201.5 All Domains
201.6 All Events In other words, every individual thing known to man could be listed as an identity, as information, as object, as system, as domain, or as event. And correlatively, there is no thing known to man or that will be known that doesn't fit under at least one of these umbrella terms. Thus, the scope of the present invention is Unitary Scope 201, all inclusive of everything, and at this stage of deconstruction, the subjective version of the model includes everything.

FIG. 6 Description of Everything

Scope of Everything 201 labels may be further correlated with socio-political-cultural dimension as conceptual infrastructure terms as articulated in FIG. 6. The institutions of everything are:

Information Reference Architecture 200.1: encompasses principles of information structure, organization, definition of identities and constituents.

Civil Infrastructure 200.2: encompasses principles of democracy, self-representation, ownership, rules, values, norms, principles and processes of citizenship, including original instantiation and current authentication.

Information Infrastructure 200.3: encompasses language, classification, representation, media, devices, hardware and software.

Physical Infrastructure 200.4: encompasses all people, property, events, places, ideas, artifacts, objects, assertions; everything.

Process Infrastructure 200.5: encompasses natural systems, man-made systems, business methodologies, programmatic structures, functions, and tools, production systems, delivery systems, supply chain networks, media, devices, hardware and software.

Economic Infrastructure 200.6: encompasses principles of economics, exchange systems, metrics, markets, financials, communication, systems, the Internet, the telephone system, media, devices, hardware and software.

Infrastructure 200 components are inclusive of abstract principles and conventions that people around the world use to define semantic systems, to communicate with one another, to make and use things, and to participate in both the community and marketplace. Through multiple versions that articulate and circumscribe deeper and wider definitions, the model continues to apply to and include everything.

FIG. 7 Unitary Reference Architecture Components

FIG. 7 depicts the high-level components of Model of Everything 1000 with Unitary Reference Architecture 100, which constitute a copy, pattern, image to be made, miniature representation, and mathematical description of analog |EVERYTHING| including all events 201.6, all event domains 201.5, all event systems 201.4, all event objects 201.3, all event information 201.2, and event identities 201.1. The components that make up Unitary Reference Architecture 100 are;

UR-URL Identifier Method 101
List of Everything 102
Table of Everything 103
Database of Everything 104
Platform for Everything 105
Web Portal to Everything 106

FIG. 8 Alignment of Scope and Components

FIG. 8 shows the alignment between Model of Everything 1000 components and Scope of Everything 201 elements derived according to Levels of Abstraction 202.2 and Layers of Objects 202.1. Everything in Scope of Everything 201 is modeled in Model of Everything 1000.

FIG. 9 Relation of Scope and Components

FIG. 9 shows Scope of Everything 201 elements from top to bottom going into Model of Everything 1000, which is constructed from bottom to top, built on Unitary Reference Architecture 100. Unitary Infrastructure 200 components are the underlying structural members that support the overall architecture of everything. Dimensions are "rebar" that keep columns of part numbers in straight order within states. Scopes are "cross-beams" that span and connect columns to cohere components and parts across the continuum of states.

FIG. 10 Everything Components

Model of Everything 1000 components are modeled after and represent components and dimensions of everything. Model of Everything 1000 is made up of Unitary Reference Architecture 100, Unitary Infrastructure 200, Unitary Ontology Architecture 300, Unitary Resource Description Framework 400, Unitary Process 500, and Unitary Apparatus 600.
FIG. 11 Unitary Reference Architecture Components Unitary Reference Architecture (URA) 100 is made up of UR-URL Identifier Method 101, List of Everything 102, Table of Everything 103, Database of Everything 104, Platform for Everything 105, and Web Portal to Everything 105.
FIG. 12 UR-URL Identifier Method Components UR-URL Identifier Method 101, also referred to as Unitary Identity Architecture and Unitary Identity, is made up of UR-URL 101.1, Name 101.2, Owner 101.3, Authority 101.4, Keywords 101.5, and Path 101.6.

UR-URL 101.1 is made up of unique relative referential geotemporal incept coordinates XYZT/GT asserted by makers. Correlated terms include but are not limited to: UR-URL Real Identifier 101.1.1, XYZT/GT Incept 101.1.2, XYZT/GT Now 101.1.3, XYZT/GT Extension 101.1.4, Other Extension 101.1.5, Other Address 101.1.6, and Other ID 101.1.7.

UR-URL 101.1 establishes a direct association by owner-maker between real identity and real identifiers coincident with event time and location. The form of address a particular event takes, be it coordinate or postal or other, is immaterial to the fact of specificity of a distinct location in spacetime that may be converted to numerous equivalent formats. What makes the identifier work universally for everything and everyone everywhere in all time isn't simply location, as in common navigation systems, and it isn't simply time, as in common date/time stamping, and it isn't simply the combination of location and date/time. What makes UR-URL 101.1 work universally is the combination of location/date/time with assertion of incept identity ownership in a system of legally authenticated claims—exactly what the public domain is in analog. We could not have democracy if vendors owned citizens' legal identities, yet we continue to evolve the Internet—a system of artificial identities—as though it could and will be a substitute for real analog establishments and institutions. It can't. The present invention can.

Point of clarification: UR-URL will work as an identifier for everything anytime anywhere in any given system, even without the principle of incept ownership or other components of Unitary Reference Architecture 100. But the only way to make one universal system of |EVERYTHING| is with Unitary Reference Architecture which employs universal principles of private ownership and citizenship used by people and governments around the world. Officially authenticated privately controlled event identity ownership is the key to utility as one universal system of information addresses in one Model of Everything 1000.

Furthermore, any prior art identifier method may be used modularly with Unitary Reference Architecture 100 components—List, Table, Database, Platform, Web Portal, Ontology, RDF—in place of UR-URLs to build a "Model of Something". However, the resultant model can represent only a portion of |EVERYTHING| insofar as prior art identifier methods are finite combinations and can only identify as many things in |EVERYTHING| as code structure permits.

Name 101.2 is made up of alpha-numeric characters and/or symbols as asserted by makers. Correlated terms include but are not limited to: Claimed Identity Name 101.2.1, Real Name 101.2.2, Real Identity 101.2.3, Named Identity 101.2.4, Title 101.2.5, Term 101.2.6, Other Designation 101.2.7.

Owner 101.3 is made up of the legal name of the entity asserting a claim to ownership of person, property, or idea. Correlated terms include but are not limited to: Claim Maker Owner 101.3.1, Functional Owner 101.3.2, Maker 101.3.3, Inventor 101.3.4, Discoverer 101.3.5, Parent 101.3.6, and Legal Agent 101.3.7.

Authority 101.4 is made up of the legal name of the entity or instrument corroborating or authorizing the claim and instantiating the entity, i.e. Department of Vital Statistics authenticates and records births instantiating person entities as citizens; contract documents authorize expenditure of enterprise resources and instantiate production processes. Correlated terms include but are not limited to: Official Incept Authentication 101.4.1, Official Authentication 101.4.2, Official Anytime Authentication 101.4.3, Maker Affidavit Authentication 101.4.4, Witness Affidavit Authentication 101.4.5, Other Legal Authentication 101.4.6. The vital step of official authentication is missing in the current embodiment and prior art embodiments with vendor authentication.

Keywords 101.5 is made up of links to related things and ideas. Keywords 101.5 can be anything, including but not limited to specific individual terms concatenated in UR-URL 101.1's XYZT/GT method: Coordinate Values 101.5.1, Point of Origin 101.5.2, Differential Quantity 101.5.3, Latitude 101.5.4, Longitude 101.5.5, Elevation 101.5.6, Time 101.5.7, GT 101.5.8, Other Legal Designation 101.5.9.

Path 101.6 is made up of links to the system or parent that has conventions, protocols, and references that govern the thing or idea. The path for an information resource might be the owner's website. The path for a work center resource might be to its parent department. At a minimum, terms of reference must be specified. Correlated terms that clarify address nomenclature include but are not limited to: Referential System 106.1, Parent System 106.2, GPS 106.3, Geo.Domain 106.4, USGS 106.5, Metes and Bounds 106.6, Others 106.7.

II List of Everything View—One Dimension
FIG. 13 List of Everything Components

List of Everything 102 is made up of UR-URL 101, Tabular Architecture Rows and Columns 600.11, and Infinite Range With Infinite UR-URL Identifier Method Scope 600.13.
FIG. 14 List View FIG. 14 illustrates a common list form apparatus with Tabular Architecture Rows and Columns 600.11.
FIG. 15 List with Prior Art Reference Architecture FIG. 15 illustrates a common list form with prior art reference architecture comprising an ID Number 101.1.7 which is not infinitely extensible and which does not apply to everything, depicted as Finite Range With Finite Identifier Scope 600.16. Every element within a system must have a unique identifier. Size of system is limited by available combinations generated by the identifier method's code syntax. GUID has 41 characters which yields over 3E+49, or, 33,452,526,613, 163,800,000,000,000,000,000,000,000,000,000,000 unique identifiers. That looks like a lot of identifiers, but it's still a finite number and not remotely enough for everything.
FIG. 16 List with Unitary Reference Architecture FIG. 16 illustrates List of Everything 102, and contrasts prior art identifier methods' finite range depicted in FIG. 15 with UR-URL Identifier Method 101 and its Infinite Range With Infinite UR-URL Identifier Method 600.13. This is a fundamental distinction between the present invention and prior art lists: the capacity to enumerate everything.

List of Everything 102 is the most elementary expression of everything in apparatus, consisting of one infinitely extensible column containing just UR-URL 101.1 identifiers which define a field in "spacetime" and relate point addresses with Event Potential 302.7 identity. An example is List of Everything 102 with the system identity "navigation instructions" comprising a single column of executable identifiers where both locations within the defined field—where the object of the instructions is scheduled to be and the time it's supposed to be there—are contained in the object's UR-URL Identifier 101.1. The thing, the place, the time, and sequence of events are simultaneously represented as "a path" of successive UR-URLs 101.1.

More commonly, List of Everything would contain columns for UR-URL Identifier 101.1 and Name 101.2, a simple binary pair. In general terms of tabular architecture, each data column represents a property or dimension held in common by all information events recorded in rows. The unique identifier column is mandatory, and not counted as a dimension. Therefore, List of Everything 102 with sequential UR-URLs 101.1 is apparatus in zero dimension. List of Everything 102 with UR-URL 101.2 and Name 101.2 has one dimension—Name 101.2, the identity dimension, and is apparatus in one dimension.

III Table of Everything View—Two Dimensions
FIG. 17 Table of Everything Components Table of Everything 103 is made up of UR-URL Identifier Method 101, List of Everything 102, Infinite range With Infinite UR-URL Identifier Method Scope 600.13, Unitary Ontology Architecture 300, Unitary Resource Description Framework (RDF) 400, Commercial Off The Shelf (COTS) or Open Source Computer System 600.1, Tabular Architecture Columns and Rows 600.11, COTS or Open Source Spreadsheet Software With Search and Hyperlinks 600.5, Variable Columns 600.17, Event Data 600.2. These ten parts are common where Table of Everything 103 is a component.

FIG. 18 Table View

FIG. 17 illustrates a common table form apparatus with Tabular Architecture Rows and Columns 600.11 and Variable Columns 600.17.

FIG. 19 Table with Prior Art Reference Architecture

FIG. 19 illustrates a common table form apparatus with Tabular Architecture Rows and Columns 600.11, Variable Columns 600.17, and prior art reference architecture comprising an ID Number 101.1.7 which is not infinitely extensible and which does not apply to everything, depicted as Finite Range With Finite Identifier Scope 600.16.

FIG. 20 Table with Unitary Reference Architecture

FIG. 29 illustrates a table with Tabular Architecture Rows and Columns 600.11 and Variable Columns 600.17, with Unitary Reference Architecture's UR-URL 101, and contrasts prior art identifier methods' finite range with UR-URL 101 and its Infinite Range With Infinite UR-URL Identifier Method 600.13. This is a fundamental distinction between the present invention and prior art tables: the capacity to enumerate everything.

FIG. 21 Top-Level Ontology

Things in reality come in wholes and are described in terms of features and attributes, which are arranged in systems—systems of systems. A model of what exists in a system is called an ontology. The word traditionally refers to the study of existence—everything—the nature of being. Simply put, technology-wise, an ontology is the map of "kinds" in the whole system |ANYTHING|. It stipulates conceptual linkage between and across subsystems and components, and shows how everything in scope is connected and organized. Node/category names represent a particular dimension, nature, or essential property shared by sets within the system. Irreducible common denominators are called primitives or universal types.

Broadly speaking, ontologies tell the computer how to "know" what something "is" by suggesting associations and patterns between kinds and types so "likeness" can be reduced to math, which is the language computers speak. A computer thinks by reading lists really fast. Just as it's easier for people to find a book in the library by using the subject and author guides, so classification makes computer processing faster and more efficient. Search engines use this basic principle to measure keyword related value equivalence to rank results. On a deeper level, ontologies provide a logical basis for relating semantic concepts with programming rules so software agents can more closely simulate human reasoning processes.

Developing an ontology includes[29]:

Defining the scope of constituency, what it's an ontology of;

Grouping the constituents in classes and subclasses;

Ordering the classes and subclasses in a hierarchy of categories;

Defining roles and properties of classes;

Specifying values for instances of properties.

When the categories and types are defined, you can create a knowledge base by listing individual elements and using the classification terms to label, organize, and cross-reference at every level of description.

Popular enterprise programs are based on tables and requests. Requests are operations performed on a specific dataset drawn from one or more tables. Each row in a human resource database represents a person, aka resource event object. The columns have field category names like job title, departmental assignment, pay grade, skill classification, home address and phone, and each object has specific values in its row for each of the types of information. Similarly, an inventory control database lists products, equipment, tools, materials, and other corporate assets along with descriptive fields such as capacity, location, quantity, and cost. Software operations select and manipulate these various "kinds" of data for display in reports and graphics.

Individual values have particular syntax that matters. If one company uses the name format "Last, First, Middle" and partners use "First Middle Last" it takes an extra step (and extra cost) to convert one or the other to match. Agreement up front—first and foremost, on the identifier method, and second, on the "pick-list" for keyword categories and types—facilitates integration. An event ontology standardizes the "kinds" and resource description framework (RDF) simplifies consistent application. Unitary Reference Architecture 100, Unitary Ontology 300 and Unitary RDF 400 establish a common basis for common purpose.

Object oriented systems and their ontologies start out by dividing everything into "physical" or "abstract" groupings as the first level duality of entity condition. Unitary Ontology Architecture 300 clarifies the term "abstract" by making explicit in the deeper term "assertion" the fact that ideas, as well as their electronic replicas, are created, discovered, and made "legally real" by human articulation, application, authentication, agreement, and public recording of artifact. In the real world, there is a significant difference between an original and a copy.

The largest set is not all objects or all entities. It is All Events 201.6, unified, integrated, and differentiated. Everything is an Event 301.2. Event condition is either Object 301.3 or Assertion 301.4. An assertion is a claim by a maker about their person, property, principle, or transaction—the four states of event, or, event "embodiments". Assertions are abstract ideas made concrete through declaration (a claim by one person), contract (a claim made by two or more people), or collective agreement (a statement of principle; a law, which is either theoretical or statutory; or a primitive, an elemental force or singular essence). Transaction is the assertion of performance.

The terms Event 301.2, Object 301.3, and Assertion 301.4 are universal, comprehensive in their plurality and singular in their extremity. Upon deconstruction, each has multiple terms of inference. Event Object 301.3 and Event Assertion 301.4 were defined on Page 7 [0025] inclusively as synonymous with generally held top-level divisions of everything, i.e. physical or non-physical, tangible or intangible, matter or mind, thing or concept, object or subject, property or agreement, etc.

Conditional duality is resolved by symmetry in that Event Objects 301.3 and Event Assertions 301.4 about object constituents and relations share the same identifiers.

Unitary Top-Level Ontology 301.1 is made up of Events 301.2. Events 301.2 are made up of Objects 301.3 and Assertions 301.4. Objects are either Person 301.5 or Property 301.6, and Assertions 301.4 are either Principle 301.7 or Transaction 301.8. Everything is an Event 301.2, and nothing that exists is not either Person 301.5, Property 301.6, Principle 301.7 or Transaction 301.8. The model continues to apply and extend to everything.

FIG. 22 Event Ontology

Unitary Event Ontology 301 depicted in FIG. 22 is derived using Levels of Abstraction 201.2 in a process of deconstruction. Unitary Event Ontology 301 includes and expands Unitary Top-Level Ontology 301.1. The Primitive Entity 300.1 for the whole ontology, what the ontology is a system "of", is Event 301.2. An ontology of |EVERYTHING| is necessarily an event ontology.

The Condition 403.5 of an Event 301.2 is either Object 301.3 or Assertion 301.4. The States 404.5 of Events 301.2—the embodiments—are Person 301.5, Property 301.6, Principle 301.7, and Transaction 301.8. Classes 407.5 and Sub-Classes 300.2 would fit as nodes under States 404.5 in a larger-sized ontology map, but have been presented in tabular form to fit on one page.

Persons 301.5 are either Real 301.9 or Fictitious 301.10. Real Persons 301.9 are of age and/or competent to make contracts or not, represented by Sui Juris 301.9.1 and Non-Sui Juris 301.9.2 sub-class primitives. Fictitious Persons 301.10 are legal entities that are not real persons, and are represented by For Profit 301.10.1 and Non-Profit 301.10.2 sub-class primitives.

Property 301.6 is Real 301.11, Personal 301.12, Intellectual 301.13, and Public 301.14. Real Property 301.11 is represented by Land 301.11.1 and Rights 301.11.2 sub-class primitives. Personal Property 301.12 is represented by Tangible 301.12.1 and Intangible 301.12.2 sub-class primitives. Intellectual Property 301.13 is represented by Instrument 301.13.1 and Information 301.13.2 sub-class primitives. Public Property 301.14 is represented by Environment 301.14.1 and Emblem 301.14.2 sub-class primitives.

Principle 301.7 is Primitive 301.15, Law 301.16, or Standard 301.17. Primitive 301.15 is represented by Singularity 301.15.1 and Force 301.15.2 sub-class primitives. Law 301.16 is represented by Statutory 301.16.1 and Theoretical 301.16.2 sub-class primitives. Standard 301.17 is represented by Definition 301.17.1 and Convention 301.17.2 sub-class primitives.

Transaction 301.8 is Claim 301.18, Function 301.19, or Action 301.20. Claim 301.18 is represented by Contract 301.18.1 and Declaration 301.18.2 sub-class primitives. Function 301.19 is represented by Operation 301.19.1 and Office 301.19.2 sub-class primitives. Action 301.20 is represented by Act 301.20.1 and Obligation 301.20.2 sub-class primitives.

Prior art ontologies' top-level system identity is most often "entity" so the ontology is a system of "entities" and everything within the system is an instance of "entity". The computer world is object-oriented, based on the principles of information systems. Digitization is an abstraction itself. The computer world begins an entire dimension away from real. In digital terms, an object is an entity and a person is an object. Not so in the real world and not so at the higher level of Unitary Ontology, which is based on the higher combination of the principles of information systems and the principles of private ownership and citizenship and the principles of relativity.

The present invention must necessarily begin at the higher level, "event". Everything is really an event. Everything is not really an entity. By moving up a level of abstraction, Unitary Ontology 301 comes into the real world and provides superordinate primitive terms for the real-world dimension of formal instantiation of entity that is integral to real identity—to citizenship, participation in the economy, self-representation.

In the real world, a baby is not a citizen—not a real entity with legal status—until incept (birth) is claimed by makers (parents), authenticated by witness (usually the hospital) and officially recorded in the public rolls. In the top-levels of description of everything, the terms "condition" and "state" and "class" correspond to legal definitions of rights and responsibilities. This vital first instantiation step in the information life-cycle of the real world is missing in object ontologies and in prior art identification and description schemas. Unitary Event Ontology 301 is an ontology of everything in the real world and in the information world.

FIG. 23 Relative Event Ontology

The Statement of Principle 302.8 and design specification for a whole-system information model are derived from the following excerpt from Einstein's Theory of Relativity$_{24}$:

"Every description of the scene of an event or of the position of an object in space is based on the specification of the point on a rigid body (body of reference) with which that event or object coincides. This applies not only to scientific description, but also to everyday life."

The present invention interprets this statement to mean every event description has six basic elements:

1. Point 302.2 (the actual thing, or entity that "has" the objects in relation);
2. Reference-Body 302.6 (the standard, or "known" point of origin to measure "from," the governing constraints);
3. Observer 302.3 (everything is relative to the observer);
4. Position 302.1 (the mathematical coordinates of the point's location relative to the reference body);
5. Scene 302.5 (objects and assertions about object constituents and relations);
6. Specification 302.4 (explicit or detailed statement of legal particulars).

These groupings are herein considered primitives, or elementary classes in an ontological framework. Things and ideas—entities, objects and artifacts, real and virtual, animate and inanimate—have all six event elements; Scene 302.5 is all inclusive of event constituents 405, resources 407, and relations 408.

Event Potential 302.7 represents that state of being between conception and actualization, and all that exists are points without description—available UR-URL 101.1 identity-identifier-addresses without objects. In order for UR-URL 101.1 or any identifiers to be associated with points/objects, there have to be the other four elements. There has to be a position, which is a coordinate differential in three vector dimensions—latitude, longitude, and elevation plus time; there has to be a reference-body to measure the coordinates "from"; there has to be an entity doing the measuring and naming; and the measurer-namer has to "specify" details of event properties.

Fewer than six terms may be used to describe |EVERYTHING| where two or more terms are identical, such as in a private system where owner, authority, and user are one and the same entity, and in cases where it is not necessary to repeat parameters set at the system level, such as path where all objects in a system share the same path.

Relative Ontology 302 depicts the universal generic structure of an event system. Relative Ontology 302 terms circumscribe the entire range of "kinds" of information all event objects and all event systems are comprised "of" and forms the principled premise for Unitary Resource Description Framework 400.

FIG. 24 Entity Ontology

Top-Level Ontology 303, detailed in John F. Sowa's 2000 book, "Knowledge Representation,"$_{30}$ defines categories, subcategories, types, and subtypes for entity objects and processes in a hierarchical construct with no redundancy. Category names are designed to be used as unique type labels in predicate calculus and are "[ . . . ] defined in terms of the role and the relation Has."$_{30}$ This is machine-readable logic built into the words. The specification is available for download and the intent is for businesses to use these labels for classifying information assets. When they do, everything will match from the inside out. Entity Ontology 303 primitive terms are:

303.1 Term.Entity ( )=⊤ .
303.2 $^{Term.}$⊤ ( ).
303.3 Term.Independent (I).
303.4 Term.Relative (R).
303.5 Term.Mediating (M).
303.6 Term.Physical (P).
303.7 Term.Abstract (A).
303.8 Term.Actuality (IP)=Independent∩Physical.
303.9 Term.Form (IA)=Abstract∩Independent.
303.10 Term.Prehension
303.11 Term.Proposition (RA).
303.12 Term.Nexus (MP)=Physical∩Mediating.
303.13 Term.Intention (MA)=Abstract∩Mediating.
303.14 Term.Continuant (C).
303.15 Term.Occurrent (O).
303.16 Term.Object (IPC)=Actuality∩Continuant.
303.17 Term.Process (IPO)=Actuality∩Occurrent.
303.18 Term.Schema (IAC)=Form∩Continuant.
303.19 Term.Script (IAO)=Form∩Occurrent.
303.20 Term.Juncture (RPC)=Prehension∩Continuant.
303.21 Term.Participation (RPO)=Prehension∩Occurrent.
303.22 Term.Description (RAC)=Proposition∩Continuant.
303.23 Term.History (RAO)=Proposition∩Occurrent.
303.24 Term.Structure (MPC)=Nexus∩Continuant.
303.25 Term.Situation (MPO)=Nexus∩Occurrent.
303.26 Term.Reason (MAC)=Intention∩Continuant.
303.27 Term.Purpose (MAO)=Intention∩Occurrent
303.28 Term.Absurdity (IRMPACO)=⊥.
303.29 Term.Intermediate Category
303.30 Central Category FIG. 25 Object Ontology The IEEE$_{31}$ Suggested Upper Merged Ontology (SUMO) 304, a proposed open standard ontological framework and the collaborative result of some of the best thinkers in the Internet world, is shown in part in FIG. 25. It is linked to Sowa's Top-Level Ontology 303, subordinate in position, and picks up with object ontology where Sowa's entity ontology leaves off.

Sevcenko's$_{32}$ free online SUMO Browser 304 offers SUMO Term Search 304.1 and displays derivative concepts in easy-to-read tree diagrams shown as SUMO Search Results 304.2, permitting quick selection of lowest common terms. All the average everyday person needs to know is where to find them. Additionally, John Sowa's website$_{30}$ has extensive documentation about concepts, design principles, and, particularly helpful, detailed explanations of the math. Copies of relevant portions are included with cited reference volumes.

It would be impossible herein to do justice to Sowa's sophisticated and elegant approach to knowledge representation, and if what you want is interoperability, this system has widespread support. Custom codes can be incorporated and it's built for expansion, extensible to any level of detail, metatag and beyond. However, any and all categories and types can be "had" in a Model of Everything 1000. The intent of Unitary Event Ontology 301 is to stipulate an all-inclusive instantiating construct within which any number of classification systems may be usefully employed—i.e. OWL and other domain ontologies may also be optionally selected in users' keyword claims, but not for instatement terms. Unitary Event Ontology 301 provides primitive designations for legitimizing condition, class, state, and form. For categories and types, the Sowa Top-Level Ontology 303 and IEEE Suggested Upper Merged Ontology 304 represent industry best practices and provide primitive category labels for entities and objects, both physical and abstract, from planets to quantum theory.

FIG. 26 Ontology of Origination

Unitary Ontology Architecture 300 must extend to all aspects and dimensions of being or it wouldn't be |EVERYTHING|. This necessitates incorporating provision for belief systems, which are entered as assertions by makers. Ontology of Being 305 shows Eddy's construct$_{33}$, Infinite Mind and Its Infinite Manifestation, represented by synonymous primitives: Principle 305.1, Mind 305.2, Soul 305.3, Spirit 305.4, Life 305.5, Truth 305.6, Love 305.7, and further described as All Knowing 305.8, All Acting 305.9, All Seeing 305.10, All Being 305.11, All Wise 305.12, All Loving 305.13, Eternal 305.14, All Substance 305.15, Intelligence 306.16. These terms represent the constituents and relations of being. Ontology of Being 305 provides neutral and flexible primitive classification labels that bridge the space between seen and unseen, what we can touch and what we believe.

FIG. 27 Ontology of Dimension

Young's construct$_{34}$, Ontology of Dimension—Four Levels of Reality 306, divides everything into four dimensions: I. Purpose 306.1, II. Value 306.2, III. Concept 306.3, and IV. Matter 306.4.

FIG. 28 Ontological Integration

The composite in FIG. 28, Integrated Ontology 307, aligns primitive sections from four separate sources. Alone, each depicts the author's complete view of everything in reality. The superordinate level inclusively represents the nature of being and progress as defined by Eddy 305. Unitary Identity Architecture 101 precedes Relative Ontology 302 illustrated in the next section, and Unitary Event Ontology 301 in the middle. The next latticework is a rendering of the Sowa Top-Level Ontology 303 for all-purpose object entity description. SUMO 306 and expanding derivatives are referenced but not shown. Sowa/SUMO are together considered one ontology. Each node has a word that signifies an extensible high-order category/type/subtype.

In addition to establishing legitimacy corresponding to analog instantiation, artifacts, and instruments, the further purpose of Unitary Event Ontology 301 is to provide evidence that the domain |EVERYTHING|, as defined herein, and claimed by the present invention, is indeed inclusive and extends to everything known and recorded. No other method claims all events, which if you agree with Einstein, is everything. No other method claims all objects and all assertions, which is everything if you use common non-relativistic definitions. Together, these four unique and complementary ontologies comprise an all-encompassing set of general summary-level category codes/labels for our many diverse claims and agreements about individual and collective human experience.

The components of Integrated Ontology 307 are Ontology of Being 305, Relative Ontology 302, Unitary Event Ontology 301, Entity Ontology 303, Object Ontology 304, and Unitary Reference Architecture 100.

FIG. 29 Dimensional Integration

Young's Ontology of Dimension 306 is overlaid Integrated Ontology 307 to create Dimensioned Integrated Ontology 308. There is alignment between constructs, which indicates model coherence at fundamental levels.

FIG. 30 Alignment Between Primitive Terms

The present invention, Model of Everything With UR-URL Identity, Identifier, Addressing, and Indexing Method, Means, and Apparatus, can identify, address, index and integrate in an information table every molecular constituent of every cell of every person, place, and thing on the planet. The present invention can also include every idea ever claimed by anyone in all time. In terms of detail, how much is enough and how much is too much?

Enough is a function of purpose. Too much has consequences for privacy. The burning question today, in terms of the Internet and web service, is, "What kinds of information are needed to describe things well enough for discovery?" "Well enough" depends on who's looking and what's being described. Business needs to align transaction data formats for supply chain partnership automation. When it's business being described, "well" is a matter of common interest in specific fields and codes. But when it's people, "enough" more often than not means nothing at all. We'd just as soon nobody knew anything about us. The fact of the matter remains, the end product of industry efforts to standardize the "kinds" of information they exchange will be a set of basic templates that specify how information about private citizens is collected and used. The kinds matter a lot.

Privacy isn't about "trust providers" protecting private information; it's about their not owning and controlling it in the first place. We should be asking, "What are the critical kinds of information we want vendors to share with each other about us and our property?" The kinds have both legal and personal ramifications. For this reason, and because quantity doesn't mean quality, just higher cost and longer wait times, Unitary Technology reframes the inquiry to, "How little is adequate?"

All information winds up in tables with columns and rows, so the answer boils down to the labels that should be in the columns—labels that, in order to be universal, have to apply to and describe each thing in |EVERYTHING| in sufficient detail so as to differentiate it from everything else. "Resource Description Framework" refers to the particular selection of terms as column labels in the Tabular Architecture Rows and Columns 600.11 "columns".

Alignment between standard primitive ontological constructs in Resource Description Synthesis 409 suggests common column label RDF requirements for event description and discovery. Relative Ontology's 302 six components map to our analog 413 minimum terms for valid contract, the norm for authenticating identity of person and property. There is commonality with John F. Sowa's Top-Level Categories 303, and there's a parallel with standard programming n-tuple logic 411. In aggregation, they point to six basic ingredients in all event objects—URA Terms 101.

Relative Ontology 302 primitives are: Position 302.1, Point 302.2, Observer 302.3, Specification 302.4, Scene 302.5, and Reference-Body 302.6. Analog primitives are Address, Name, Maker(s), Contract/Artifact, Claim(s), and Witness 101.4.5. Sowa primitives are Proposition 303.11 Actuality 303.8, Prehension 303.10, Intention 303.13, Nexus 303.12, and Form 303.9. Logic 411 primitives are ID 101.1.7, Bearer 411.1, Normative Agent 411.2, Condition of Obligation 411.3, Obligation 411.4, and Sanction 411.5. ERP 412 primitives are ID 101.1.7, Name 101.2, Functional Owner 101.3.2, Work Order/Statement of Work 412.1, Resources 405 and Relations 408, and System 406.

Considered in concert, like terms from the several ontologies are synthesized conceptually in Unitary Resource Description RDF Array 400: Identifier 401, Identity 402, Origin 403, Agreement 404, Constituents 405, and System 406. Then, RDF Array 400 terms are reduced to simplest common user-friendly Unitary Reference Architecture's UR-URL Identifier Method 101 terms: UR-URL 101.1, Name 101.2, Owner 101.3, Authority 101.4, Keyword 101.5, and Path 101.6.

The answer to the question, what kinds of information are needed to describe things well enough for discovery, is, not much—six things, as indicated by Relative Ontology 302 and transformed to common terms Unitary RDF 400 in Resource Description Synthesis 409. However, subdividing constituent into keyword, profile, and activity more closely matches enterprise planning.

The sum total of enterprise assets is a semantic list of resources—things. The objective of business is to leverage human capital assets with intellectual property assets in combination with real and personal property assets following policy, procedure, and process assets to make other things that are worth more in combination than alone.

Business has resources 407. Business has activity 408.1. Activity 408.1 is the assertion of relation between resources. Activity 408.1 is an event 301.2 and a system 406 and an object 301.5 with incept and constituents relating. Just another line item in an enterprise model of Model of Everything 1000. Resources 407 are resources 407, regardless of state 404.5. They all have the same basic kinds of descriptive elements. Differences are all situational. That is, event conditions differ, but when all's said and done, each thing is a system and is in a system. All event objects 201.1.3 and event systems 201.1.4 share six common primitive terms.

Keyword 101.5 is a more common term than Constituent 405, and can refer to anything, including Profile 407 and Activity 408.1. They can all be in the same column, but it's useful to see three groupings. What business needs is a list of resources with common RDF in a table that can be queried—an enterprise Table of Everything 103.

FIG. 31 Matrix of Ontological Terms

Synthesis of ontological constructs produced RDF Array 400, which is further considered in Resource Description Matrix 410, where the terms of Unitary Resource Description Framework 400 are arrayed in five cross-sections that bring out particular facets of application as high-order ontological primitive labels for the many dimensions of |EVERYTHING|: Expression 400.5, Aspect 400.4, Purpose 400.3, Set 400.2, and Logic: Has 400.1.

The Expressions 400.5 of Unitary RDF 400 are:
Address 401.5, Element 402.5, Condition 403.5, State 404.5, Category 405.5, Domain 406.5, Class 407.5, Union 408.5.
The Aspects 400.4 of Unitary RDF 400 are:
Uniqueness 401.4, Representation 402.4, Inception 403.4, Legitimacy 404.4, Composition 405.4, Orientation 406.4, Eligibility 407.4, Context 408.4.
The Purposes 400.3 of Unitary RDF 400 are:
Differentiation 401.3, Designation 402.3, Ownership 403.3, Instantiation 404.3, Classification 405.3, Integration 406.3, Utilization 407.3, Operation 408.3.
The Sets 400.2 of Unitary RDF 400 are:
Record 401.2, Register 402.2, Ontology 403.2, Concordance 404.2, Taxonomy 405.2, Architecture 406.2, Pool 407.2, Model 408.2.
The Logic: Has 400.1 with Unitary RDF 400:
Has UR-URL 401.1, Has Name 402.1, Has Owner 403.1, Has Authority 404.1, Has Keyword 405.1, Has Path 406.1, Has Profile 407.1, Has Activity 408.1.

FIG. 32 Ontology of Everything

Unitary Integrated Ontology 309 arrays Unitary RDF 400 terms and Expressions 400.5 against the combined components of Integrated Ontology 307 to illustrate top-to-bottom applicability from the highest order abstract concepts and event incept origination and instantiation all the way through entity categories to object forms, both physical and abstract. There is a primitive for everything and no thing exists that has no primitive. Unitary Integrated Ontology 309 is an ontology of |EVERYTHING| and demonstrates universal inclusion.

Asterisks note supplementary headers that align with titles and add symmetry and coherence to the illustration. Every effort was made to ensure no terms overlap between ontologies, and that unitary terms correspond with commonly accepted legal definitions. The intent and design of Unitary Ontology Architecture 300 is that the final construct have no redundancy, and as depicted herein, labels are unique across the ontologies integrated.

FIG. 33 Table with Unitary Resource Description Framework (RDF)

FIG. 32 illustrates a table with Tabular Architecture Rows and Columns 600.11, Variable Columns 600.17, Infinite Range With Infinite UR-URL Identifier Method 600.13, and List of Everything 102, with Unitary Resource Description Framework 400 in six terms of UR-URL Identifier Method 101: UR-URL 101.1, Name 101.2, Owner 101.3, Authority 101.4, Keyword 101.5, and Path 101.6, as might be used in a public domain context.

FIG. 34 Table with Extended Unitary Resource Description Framework (RDF)

FIG. 34 illustrates a table with Tabular Architecture Rows and Columns 600.11, Variable Columns 600.17, Infinite Range With Infinite UR-URL Identifier Method 600.13, List of Everything 102, with extended Unitary Resource Description Framework 400 in eight terms of UR-URL Identifier Method 101: UR-URL 101.1, Name 101.2, Owner 101.3, Authority 101.4, Keyword 101.5, Path 101.6, Profile 101.7, and Activity 101.8, as might be used in an enterprise context.

FIG. 35 Table with Simple Unitary Resource Description Framework (RDF)

FIG. 35 illustrates a table with Tabular Architecture Rows and Columns 600.11, Variable Columns 600.17, Infinite Range With Infinite UR-URL Identifier Method 600.13, and List of Everything 102, with Simple Unitary Resource Description Framework 400 in four terms of UR-URL Identifier Method 101: Name 101.2, Keyword 101.5, and Path 101.6, as might be used in a private context where owner and authority are one and the same as the user and it is not necessary to duplicate entries.

FIG. 36 Table with Unitary Reference Architecture, Ontology, (RDF), Hardware and Software FIG. 36 illustrates Table of Everything 103 with Tabular Architecture Rows and Columns 600.11, Variable Columns 600.17, Infinite Range With Infinite UR-URL Identifier Method Scope 600.13, List of Everything 102, Unitary Ontology Architecture 300, Unitary Resource Description Framework 400, UR-URL Identifier Method 101, COTS or Open Source Computer System 600.1, COTS or Open Source Spreadsheet Software With Search and Hyperlinks 600.5, and Event Data 600.2, altogether comprising Table of Everything 103. Table of Everything 103 is apparatus in two-dimensions.

While Model of Everything 1000 may be constructed using old-fashioned analog media, the addition of COTS or Open Source Spreadsheet Software With Search and Hyperlinks 600.5 expands the utility of Table of Everything 103. The following definitions of the term "table" explain additional functionality:

Tables as features offered by application programs$_{28}$

Traditionally, the most familiar media for creating and storing tables have been pen and paper. Given the proliferation of computers at home and in the workplace, computer representations of "paper tables" have become widespread. Common software applications give users the possibility of generating, manipulating, and editing both table data and table formats with ease. Such applications include: word processing applications; Desktop publishing software; spreadsheet applications; presentation software; and tables specified in HTML or another markup language.

Tables as techniques used in programming computers$_{28}$

Data tables are used extensively in computers, in forms as diverse as equal-sized and consecutive blocks of memory locations, on one hand, and "scatter-storage" schemes relying on what are more conventionally known as hash functions, on another. Each is a distinct data structure in computer science.

Spreadsheet$_{28}$

A spreadsheet is a rectangular table (or grid) of information Table of Everything 103 may be created in common commercial spreadsheet programs such as Excel and Lotus 1-2-3. Each row of Table of Everything 103 contains a record for one thing, and columns contain terms for each thing according to the column labels. Terms are also "things" with their own records, which are connected by hyperlink. Thus, every term in every column represents either a value or a link to that term's identity record in Table of Everything 103.

IV Database of Everything View 3

FIG. 37 Database of Everything Components

The components of Database of Everything 104 are: UR-URL Identifier method 101, Table of Everything 103, Variable Relational Tables 600.15, COTS or Open Source Computer System 600.1, COTS or Open Source Database Software 600.6, Infinite Integration With UR-URL Identifier Method Scope 600.12. Database of Everything 104 contains Table of Everything 103, but individual Table of Everything 103 parts included are not called individually.

FIG. 38 Database View

FIG. 38 illustrates a common database form apparatus with Tabular Architecture Rows and Columns 600.11, Variable Columns 600.17, and Variable Relational Tables 600.15.

FIG. 39 Database with Prior Art Reference Architecture

FIG. 39 illustrates a common database form apparatus with Tabular Architecture Rows and Columns 600.11, Variable Columns 600.17, Variable Relational Tables 600.15, with prior art reference architecture comprising an ID Number 101.1.7 which is not infinitely extensible and which does not apply to everything, depicted as Finite Range With Finite Identifier Scope 600.16, and which is not infinitely integrateable, depicted as Finite Integration With Finite Identifier Scope 600.14.

FIG. 40 Database with Unitary Reference Architecture

FIG. 40 illustrates a common database form apparatus with List of Everything 102, Table of Everything 103, Unitary Ontology Architecture 300, Unitary RDF 400, Tabular Architecture Rows and Columns 600.11, Variable Columns 600.17, Variable Relational Tables 600.15, with Unitary Reference Architecture's UR-URL 101, and contrasts prior art identifier methods' finite range with UR-URL 101 and its Infinite Range With Infinite UR-URL Identifier Method 600.13 and Infinite Integration With UR-URL Identifier Method 600.12. This is a fundamental distinction between the present invention and prior art databases: the capacity to enumerate everything. A database with Unitary Reference Architecture 100 is a Database of Everything 104.

FIG. 41 Database with Unitary Reference Architecture, Hardware and Software

FIG. 41 illustrates Database of Everything 104 components depicted in FIG. 40 with the addition of COTS or Open Source Computer System 600.1, COTS or Open Source Database Software 600.6, and Event Data 600.2. Spreadsheet Software With Search and Hyperlinks 600.5 is also shown and may be used optionally instead of database software since, as described in the definitions below, works much the same way.

Row (database)$_{28}$

In the context of a relational database, a row represents a single, implicitly structured data item in a table. For example, in a table that represents companies, each row would represent a single company; in a table that represents the association of employees with departments, each row would associate one employee with one department.

The implicit structure of a row, and the meaning of the data values in a row, requires that the row be understood as providing a succession of data values, one in each column of the table. The row is then interpreted as a relation variable composed of a set of tuples, with each tuple consisting of the two items: the name of the relevant column and the value this row provides for that column.

Each column expects a data value of a particular type. For example, one column might require a unique identifier, another might require text representing a person's name, another might require an integer representing hourly pay in cents.

Column (database)$_{28}$

In the context of a relational database, a column of a table is a set of data values of a particular simple type, one for each row of the table. The columns provide the structure according to which the rows are composed. For example, a table that represents companies might have the following columns: ID (integer identifier, unique to each row); Name (text); Address line 1 (text); Address line 2 (text); City (integer identifier, drawn from a separate table of cities, from which any state or country information would be drawn); Postal code (text); Industry (integer identifier, drawn from a separate table of industries); etc.

Each row would provide a data value for each column and would then be understood as a single structured data value, in this case representing a company. More formally, each row can be interpreted as a relative variable, composed of a set of tuples, with each tuple consisting of the two items: the name of the relevant column and the value this row provides for that column.

Database of Everything 104 is an apparatus with tabular architecture containing rows of object identity records with corresponding columns of universal Unitary RDF 400 data fields containing terms and values specific to each object and relative to the Unitary RDF 400, and classified by Unitary Integrated Ontology 309. Terms are also objects in selfsame Database of Everything 104 with original "term object" identity records that are also classified with primitive ontological terms drawn from Unitary Integrated Ontology 309.

Database of Everything 104 may be created in common commercial spreadsheet and database programs such as Excel, Lotus 1-2-3, dBase, and Access. These programs have basic tabular architecture 600.11 and feature search, hotlink, and other programmatic functionality. Unitary RDF 400 terms in columns represent primitive identities with links to individual term identity records, thus a Database of Everything 104 in a spreadsheet/database program is a searchable inventory of information object identities corresponding to analog objects and assertions in one cross-referenced matrix of everything. Database of Everything 104 is apparatus in three dimensions.

V Platform for Everything View 4

View 4 presents Unitary Process Architecture 500 descriptions, beginning with examples of programmatic functionality, and concluding with process flow diagrams that illustrate application of Unitary Technology in the overall socio-political-economic context of access to information services and resources in the global electronic marketplace.

FIG. 42 Platform for Everything Components

Components of Platform for Everything 105 are: UR-URL Identifier Method 101, Database of Everything 104, Shell 600.4, Unitary Shell 601, COTS or Open Source Shell Software With Simple Tools 600.7, COTS or Open Source Predicate Logic Software 600.8.

FIG. 43 Platform View

FIG. 43 illustrates a common shell apparatus 600.4 with several shells open. Shells are convenient utility platforms that facilitate simple code writing with various popular COTS or Open Source scripting languages and object oriented approaches. A shell is a flexible and versatile canvas that when used in tandem with UR-URL Identifier Method 101 and Database of Everything 104, along with Computer System 600.1, COTS or Open Source Shell Software With Simple Tools 600.7, and COTS or Open Source Predicate Logic Software 600.8, becomes a powerful programmatic tool. Terms are defined:

Ontology$_{30}$

The subject of ontology is the study of the categories of things that exist or may exist in some domain. The product of such a study, called an ontology, is a catalog of the types of things that are assumed to exist in a domain of interest D from the perspective of a person who uses a language L for the purpose of talking about D. The types in the ontology represent the predicates, word senses, or concept and relation types of the language L when used to discuss topics in the domain D. An uninterpreted logic, such as predicate calculus, conceptual graphs, or KIF, is ontologically neutral. It imposes no constraints on the subject matter or the way the subject may be characterized. By itself logic says nothing about anything, but the combination of logic with an ontology provides a language that can express relationships about the entities in the domain of interest. [Emphasis added.]

N-tuple$_{28}$

In mathematics, a tuple is a finite sequence of objects (a list of a limited number of objects). (An infinite sequence is a family.) Tuples are used by mathematicians to describe mathematical objects that consist of certain components.

Usage in computer science$_{28}$

In computer science (especially in programming languages and database theory such as the relational model) a tuple is usually defined as a finite function that maps field names to a certain value. Its purpose is the same as in mathematics, namely to indicate that a certain entity or object consists of certain components and/or has certain properties. In programming languages tuples are used to form data structures.

Programming language is defined:$_{28}$

A programming language or computer language is a standardized communication technique for expressing instructions to a computer. It is a set of syntactic and semantic rules used to define computer programs. A language enables a programmer to precisely specify what data a computer will act upon, how these data will be stored/transmitted, and precisely what actions to take under various circumstances.

Spreadsheet programming$_{28}$

Just as the early programming languages were designed to generate spreadsheet printouts, programming techniques themselves have evolved to process tables (=spreadsheets=matrices) of data more efficiently in the computer itself. A spreadsheet program is designed to perform general computation tasks using spatial relationships rather than time as the primary organizing principle. Many programs designed to perform general computation use timing, the ordering of computational steps, as their primary way to organize a program.

In a spreadsheet, however, a set of cells is defined, with a spatial relation to one another. In the earliest spreadsheets, these arrangements were a simple two-dimensional grid. Over time, the model has been expanded to include a third dimension, and in some cases a series of named grids. The cells are functionally equivalent to variables in a sequential programming model. References between cells can take advantage of spatial concepts such as relative position and absolute position, as well as named locations, to make the spreadsheet formulas easier to understand and manage.

Many of the concepts common to sequential programming models have analogues in the spreadsheet world.

Basic$_{28}$

The idea behind object-oriented programming is that a computer program is composed of a collection of individual units, or objects, as opposed to a traditional view in which a program is little more than a list of instructions to the computer. Each object is capable of receiving messages, processing data, and sending messages to other objects. In this way, messages can be handled, as appropriate, by one chunk of code or by many in a seamless way.

In OOP, objects are simple, self contained and easily identifiable. This modularity allows the program parts to correspond to real aspects of the problem and thereby to model the real world. Object-oriented programming often begins from a written statement of the problem situation. Then by a process of inserting objects or variables for nouns, methods for verbs and attributes for adjectives, a good start is made on a framework for a program that models, and deals with, that situation.

According to the object-oriented principles, the verb is attached to the object and logic associated to the requirement is handled in the object. The paradigm of OOP is essentially not that of programming but one of design. A system is designed by defining the objects that will exist in that system, the code which actually does the work is irrelevant to the object, or the people using the object, due to encapsulation.

The architecture of Model of Everything 1000 facilitates easy use of basic object-oriented programming functionality, and is ideally suited for simple predicate logic tools and applications. In addition to internal cross-referencing by hotlink: 1) links from one object's value term to that term's identity object record, 2) links between terms and terms; 3) and links between objects and objects, there is also a built-in internal link through Unitary Integrated Ontology to predicate logic constructions. Logic provides the semantic basis, and UR-URL Identifiers 101.1 provide the terms inserted into logical forms as relation variables.

Database of Everything 104, which "goes into" Platform for everything 105, is a table with resources in rows and what they "have" in columns. Possession is the relation represented in a system of ownership, i.e. owner has object, object has keywords, resource has role. The symbol ∩ means "intersection" or "has."

Table 2 shows sample "Has Category" fields that might be used in an enterprise information asset management event system database. Each superclass represents a union set [Identifier ∩ Set (Code, Value)(Code, Value) . . . ] where codes are class, category, and type labels drawn from the ontology and values are object-specific properties and attributes.

TABLE 2

Sample Event Function Set Options
(Columns 1-6 and 7-8)

| IDENTIFIER | IDENTITY | ORIGIN | AGREEMENT | CONSTITUENT | SYSTEM |
| --- | --- | --- | --- | --- | --- |
| ∩UR-URL | ∩Name | ∩Owner | ∩Authority | ∩Keyword | ∩Path |
| ∩UR-URL.Extension | ∩NameLast | ∩OwnerLink | ∩AuthorityLink | ∩Component | ∩SysParent |
| ∩InceptLocDateTime | ∩NameFirst | ∩EntityCondition | ∩State | ∩Feature | ∩SysChild |
| ∩NowLocDateTime | ∩NameMiddle | | ∩Statement | ∩Property | ∩SysReference |
| ∩PartNumber | ∩Symbol | | | ∩Attribute | |
| ∩ProductCode | ∩Alias | | | ∩Characteristic | |
| ∩Identifier | | | | ∩Quality | |
| ∩Address | | | | ∩Quantity | |
| ∩AddressCode | | | | ∩Association | |
| | | | | ∩Possession | |
| | | | | ∩Image | |
| | | | | ∩Graph | |

TABLE 2-continued

Sample Event Function Set Options
(Columns 1-6 and 7-8)

| ID | POINT | OBSERVER | SPECIFICATION | SCENE | REFERENCE |
|---|---|---|---|---|---|
| | RESOURCE | | RELATION | | |
| | ∩Profile | | ∩Activity | | |
| | ∩Class | | ∩Process | | |
| | ∩Form | | ∩Obligation | | |
| | ∩Office | | ∩Role | | |
| | ∩Utility | | ∩Relation | | |
| | ∩Capacity | | ∩Action | | |
| | ∩AccessRule | | ∩Predicate | | |
| | ∩Performance | | ∩Operation | | |
| | ∩KeyCategory | | ∩Argument | | |
| | | | ∩Predecessor | | |
| | | | ∩Successor | | |
| | | | ∩Vector | | |
| | | | ∩Function | | |
| | | OPTIONAL "SCENE" SPLITS | | | |

Each record has a pair of values in each essential field, and as many other category/value pairs as desired.

Constituent, Resource, and Relation fields can have any combination of codes and values (or one field "scene" vs. three).

Constraints and relationships are inherited from parent/path.

System and code definitions are listed objects with UR-URLs; codes link to definitions—everything's a link.

Objects are entities with constituents, and also constituents themselves in larger event system objects.

An activity is entered as a new event record that "has" resources in roles—people, property, and processes.

Updates are "has" functions that generate event links with new instances of codes and values for resources used.

Each resource has a UR-URL; old identifiers and codes are listed constituents.

Codes may be entered in series [Identifier ∩ (Code, Value, Value, Value . . . )].

Code pairs too [Identifier ∩ (Code, Value)(Code, Value)] and [Identifier ∩ (UR-URL,UR-URL)(UR-URL,UR-URL)].

Shorthand activity programming—use the schedule to embed due date/time right in planned activity identifiers.

Fields may contain any combinations of codes and values.

Codes link to code definitions, which are listed resources.

Values link to other listed resources or contain literal strings.

Furthermore, just as programmatic functionality accrues to a spreadsheet where "a set of cells is defined with a spatial relation to one another" (per definition of "Spreadsheet Programming"), so UR-URLs are defined not with just spatial relation within the tabular structure of the spreadsheet, but also ontological relation within the Unitary RDF 400 structure, and spatio-temporal relation within the UR-URL Identifier's 101.1 XYZT/GT structure itself. UR-URLs "are functionally equivalent to variables in a sequential programming model" and can be used as such. UR-URL Identifiers 101.1 serve as external executable hotlinks that can invoke identity object terms.

And, abstracting the definition of "programming language" as given, UR-URLs are a programming language. In a modular sub-version Model of Everything 1000 with the system identity "Software Authoring Program", everything that software authoring program is "made of", from the highest domain groupings to lowest granular object, has a record with five descriptive terms and UR-URL.

"Programming Language" is just one of the many domains of "Software Authoring Program" which is in the larger domain "Operating System". Every term in the whole system has a record and UR-URL. Every "standardized communication technique for expressing instructions to a computer" has a record and UR-URL. Every "set of syntactic and semantic rules used to define computer programs" has a record and UR-URL. "Programmers can precisely specify what data a computer will act upon" by specifying UR-URLs for the "data", UR-URLs for the "actions", UR-URLs for the "storage and transmission rules", UR-URLs for conditions that define "circumstances" and alternatives. Architects can also specify UR-URLs 101.1 for hard-drive addresses, real or referential. UR-URLs 101.1 provide an end-to-end architecture for Model of Everything 1000.

Everything means |EVERYTHING| in whatever system is using the present invention. A dictionary is a comprehensive listing of original terms (system identity: term definitions) with descriptions, such that, in usage, when a term is specified the description is invoked, which lets us use words as a shorthand for meaning. Model of Everything 1000 is a comprehensive listing of original event records with descriptions that let us use UR-URLs as a short-hand for meaning in all kinds of forms, and formats, and sentences, and strings in programming tools that use relation variables.

In Model of everything 1000, the identity-identifier, UR-URL 101.1, is the platform for universal interoperability.

FIG. 44 Identity Expressions

Event Identity Forms 501 represent simple forms of expression that associate UR-URL Identifiers 101.1 with real identity. Makers record claims that link entity names with identifiers, as in Unitary Identity Statement 501.1 and they also record claims that link object names with identifiers, and object identifiers with object properties, as in 501.2. Multiple assertions may be in one statement, as in Unitary Object Identity Statement 501.3. Unitary Event Identity Statement 501.4 associates owners with claims to event description with RDF 400 terms and/or UR-URL Identifier Method 101 terms as correlated in Resource Description Synthesis 409.

FIG. 45 Logical Expressions

Event Tuple Forms 502 represent simple forms of expression that associate subject, object, and predicate, where Tuple Statement 502.1 is a standard construction with prior art identifier and Unitary Tuple Statement 502.2 has the same semantic structure with UR-URL Identifiers 101.1. A standard N-Tuple Statement 502.3 is likewise compared with Unitary N-Tuple Statement 502.4. UR-URL Identifiers 101.1 may be used to represent terms in simple COTS or Open Source Predicate Logic Software 600.8 logical constructions.

FIG. 46 Correspondence Between Expressions

Event Statement Forms 503 illustrate correspondence between how English Language 503.2 terms used in logical constructs to represent the sentence "A cat is on a mat" in examples from Sowa's explanatory material and how UR-URL Identifiers 101.1 terms are used to represent the same sentence "A cat is on a mat." 503.1 with the same notation and syntax, substituting UR-URL Identifiers 101.1 for the Event Objects 301.3 "cat" and "mat", and the Event Assertion 301.4 "on", which would correlate to identity objects in Model of Everything 1000.

FIG. 47 Description Expressions

Event Description Forms 504 illustrate the use of simple logical constructions to enter object identity information in Model of Everything's 1000 tabular architectures 600.11.

Single Entry 504.1 form associates resource object UR-URL 101.1 with properties and values entered by makers as Event Data 600.2 or selected from Unitary Integrated Ontology 309, as indicated by the drop selection "Find Term" in both 504.1 and 504.2.

Multiple Entries 504.2 form illustrates how resource object UR-URLs 101.1 may be associated with Unitary RDF terms and values in a compound statement.

FIG. 48 Programmatic Expressions

Programmatic Forms 505 illustrate three of numerous possible examples of programmatic expressions. Resource Planning 505.1 illustrates a typical Activity 101.8 Event Object 201.3 as would relate project terms in activity scheduling programs. The Activity 101.8 is the Event object 201.3 that "has" Resources 407, Constituents 405, Relations 408, and Values-Event Data 600.2. Just as Critical Path Method (CPM) Networks are constructed by associating these elements, so simple logical statements can associate elements. Elements' UR-URL Identifiers 101.1 could be represented graphically as a CPM Network Diagram as shown in FIG. 49, CPM 506.2.

Operations Sequencing 505.2 illustrates a typical "object has sequence of instructions" type of Event Object 201.3, and Binary Pairs 505.3 illustrates the simple association of two UR-URL Identifiers 101.1.

FIG. 49 Diagrammatic Expressions

Diagrammatic Forms 506 illustrate four of numerous possible examples of diagrammatic expressions that may be represented as logical statements or graphical elements, depending on what kinds of COTS and Open Source and other software programs and objects are employed. Spatial arrangements are facilitated by the relative referential geotemporal coordinate basis of UR-URL Identifiers 101.1.

Tree 506.1 illustrates a typical hierarchical organization chart type arrangement; CPM 506.2 illustrates a network diagram with UR-URL Identifiers 101.1 as previously discussed. Cluster 506.3 illustrates a honey-combed representation of relation and/or sequence of UR-URL Identifiers 101.1. Map 506.4 represents an object relationship diagram that maps links between UR-URLs 101.1, such as are used in social network maps, mind maps, associative diagrams, etc.

FIG. 50 Menu Expressions

Menu Forms 507 is a rendering of a portion of the Microsoft Word file menu structure. Main menu bars with most frequently used operations grouped as sub-menus are common features of software programs in general. Typically, menus are represented as a series of drop-down boxes with exploding sub-lists of choices, as shown in Prior Art Menus 507.1.

The same menu structure depicted in 507.1 is depicted in Prior Art Menu Expressions 507.2 as would be represented in a logical selection statement using UR-URLs, and where, in a Model of Everything 1000 with the system identity: MS Word, each menu, sub-menu, and code object are line items in the system's model of Database of Everything 104.

FIG. 51 Prior Art Menu Synthesis and Simplification

MS directories are presented in a version of tree form 506.1 turned sideways that represent paths through the whole. This is a user-friendly way to present a big-picture view of relationships, and it is an intuitive way to organize information at the architectural level—particularly for MS programmers building on the original conceptual architecture of DOS. Plus, linear structures are well suited for computational efficiency.

But in order for trees to maintain relations down through the lowest levels of granularity, there is redundancy as seen in two instances of "Cancel [X on checkbox] in the third "Drop-Down Sub-Menus" column of Prior Art Menus 507.1. "Cancel" is an "object" that is repeated many times in many of the MS Word menus. Redundancy is also apparent across entire complements of "suite" products, as illustrated in Menu Synthesis 506.

Menu Synthesis 508 is made up of a table with menu objects grouped by program, Twelve Program Objects—One Hundred and Five menu Objects 508.2, and a table with common menu objects each represented just once, One Platform—Twenty-Five menu Objects 508.2.

508.1 is made up of a rough tally of menu objects from a twelve-program "premiere" collection of integrated programs that are discussed generically but which are based on the MS products used by the inventor to create, illustrate, and specify the present invention. Many comparable products with similar complements of redundant menu objects are available through COTS and Open Source sources.

Products shown in 508.1 are also shown in Table 3, and have instances of menu types listed. Uncommon menu types are shown in the shaded area. Common suite of products include: Web Browser 508.2.1, Mail Handler 508.2.2, Word Processor 508.2.3, Web Page Creation and Editing 508.2.4, Spreadsheet 508.2.5, Database 508.2.6, Graphics 508.2.7, Presentation 508.2.8, Publishing 508.2.9, Drawing 508.2.10, Project Management 508.2.11, and Directory 508.2.12.

TABLE 3

MS Office Product Main Menu Examples - One Hundred and Two Objects

| WEB | MAIL | WP | HTM-ED | SS | DB | GRFX | PRES | PUB | PNT | PM | DIR |
|---|---|---|---|---|---|---|---|---|---|---|---|
| File | File | File | File | File | File | File | File | File | File | File | File |
| Edit | Edit | Edit | Edit | Edit | Edit | Edit | Edit | Edit | Edit | Edit | Edit |
| View | View | View | View | View | View | View | View | View | View | View | View |
|  |  | Insert | Insert | Insert | Insert | Insert | Insert | Insert |  | Insert |  |
|  |  | Format | Format | Format |  | Format | Format | Format |  | Format |  |

TABLE 3-continued

MS Office Product Main Menu Examples - One Hundred and Two Objects

| WEB | MAIL | WP | HTM-ED | SS | DB | GRFX | PRES | PUB | PNT | PM | DIR |
|---|---|---|---|---|---|---|---|---|---|---|---|
| Tools | Tools | Tools | Tools | Tools | Tools | Tools | Tools | Tools | | Tools | Tools |
| Favorites | Favorites | Table | Table | Data | | Effects | Slideshow | Table | Image | Project | Favorites |
| Search | Actions | | Frames | | | Arrange | | Arrange | Colors | | |
| Address | Contacts | | | | | | | Mailmerge | | | |
| Links | | | | | | | | | | | |
| | | Window | Window | Window | Window | Window | Window | | | Window | |
| Help | Help | Help | Help | Help | Help | Help | Help | Help | Help | Help | Help |
| IE Browser | Outlook | Word | FrontPage | Excel | Access | Photodraw | PowerPoint | Publisher | Paint | Project | WinExplorer |

Menus synthesized in 508.2 are shown in Table 4, and have each instance of menu type listed just once. Synthesized Main File Menu groupings are: File 508.1.1, Edit 508.1.2, View 508.1.3, Insert 508.1.4, Format 508.1.5, Tools 508.1.6, Table 508.1.7, Data 508.1.8, Function 508.1.9, Window 508.1.10, and Help 508.1.11.

TABLE 4

Main Menu Synthesis - Twenty-Five Objects

| File | Edit | View | Insert | Format | Tools | Table | Data | Function | Window | Help |
|---|---|---|---|---|---|---|---|---|---|---|
| Favorites | | | | Image | | | | Action | Arrange | |
| Search | | | | Colors | | | | Project | Frames | |
| Address | | | | Effects | | | | Mailmerge | | |
| Links | | | | | | | | Slideshow | | |
| | | | | | | | | Contacts | | |

FIG. 52 Simplified Menu Expressions

Table 5 Sample Unitary Main Menu Optional Arrangements shows a minimalist configuration with the same synthesis of twenty-five unique objects shown in FIG. 51, but further simplified by grouping into four main menus.

TABLE 5

Sample Unitary Main Menu Optional Arrangements

| File | Frame | Tool | Function |
|---|---|---|---|
| File | Frame | Tool | Function |
| Search | View | Edit | Action |
| Address | Arrange | Table | |
| Links | Insert | Data | |
| | Format | Project | |
| | Image | Mailmerge | |
| | Colors | Slideshow | |
| | Effects | Contacts | |
| | Window | Favorites | |
| | | Help | |

When menus are constructed using logical statements to associate sub-menus and functions, statements may specify any menu object in any grouping. In macro, objects are groups of lines of code, that are grouped functionally, and grouped programmatically, and grouped systemically. There are hierarchical relationships between object functions, and some objects have other objects as constituents, i.e. a main menu "has" sub menus and a sub-menu "has" other sub-menus or programmatic objects. Each term at each level of granularity is represented in a model Model of Everything 1000 with system identity: premier software suite, and terms can be grouped into main menus and sub-menus that suit users.

FIG. 52 illustrates Simplified Menu Forms 509 as a logical selection statement for a model of Model of Everything 1000 with the system identity: premier software suite as would allow selection at the program object level with Program Objects 509.1.1, the menu object level with Menu Objects 509.1.2, and object level with Navigation Objects 509.1.3 or other objects.

Shell With Simplified Menu Forms 510 illustrates the application of unitary menu synthesis groupings to the selection of main file menus that may be associated with shells 600.4. Simplified Menu Forms 509 and Shell with Simplified Menu Forms go into Unitary Shell 601. Navigation Bar 600.3 and Access 600.19 are also illustrated as optional menu object elements.

FIG. 53 Unitary Platform

Platform for Everything 105 is made up of: UR-URL Identifier Method 101, Database of Everything 104, Unitary Shell 601, COTS or Open Source Computer System 600.1, COTS or Open Source Shell Software With Simple Tools 600.7, COTS or Open Source Predicate Logic Software 600.8. Spreadsheet 600.5 and/or Database 600.6 software may also be used and are shown.

Platform for Everything combines the universal utility of Unitary components and capacities with common programmatic forms and features in COTS and Open Source tools in one unitary interoperable platform of universal, persistent, infinitely extensible, identities.

In reality, real citizen identity is the platform for democracy. UR-URL Identifiers 101 are real identity identifiers that correlate real citizen identity with real referential incept ownership identity. Real identity is the platform. Platform for Everything 105 is apparatus in four dimensions.

FIG. 54 Current Embodiment Access Process

Thus far figures have traced the deconstruction and reconstruction of everything as apparatus in five dimensions—0D to 4D. Abstract information infrastructure and architectural contexts have been made concrete as components and parts of physical apparatus. Figures have shown how parts fit together and how parts work together to form one universal Model of Everything 1000. Civil and economic dimensions have been considered mechanically. The following figures address the access process component of |EVERYTHING| which includes the politics of access and control, but without which, Model of Everything 1000 would not be |Everything|. The point of identifying, describing, and co-locating information resources is so people can find and use them. Access is pivotal.

Process flow diagrams that follow share common steps which, once described, are referred to by Part No. in subsequent diagrams, and not described again in detail.

FIG. 54 depicts the Current Embodiment Flow Diagram 511 which begins when people and things are instantiated at incept with Official Incept Authentication 101.4.1. Real Names 101.2.2 are associated with real identity in "the system". "The system" refers to that Western Democratic institution that comprises "We the people", the body politic, where the individual elements in the system are Sui Juris 309.9.1 citizens or Non-Sui Juris 309.9.2 citizens with system identity: USA (or other country) which has sovereign interest in and responsibility for maintaining a public roll of authenticated citizen identities—Real Names 101.2.2.

Sui Juris citizens may participate in the economy, may make contracts for goods and services, may vote, and may otherwise self-represent in the extended marketplace of country of origin. Armed with proof of identity—simple birth certificate and picture ID, a person can travel freely in country, get a drivers license, get a Social Security Number and get a job, open bank accounts, get utility service, phone service, television service, and service of all kinds. He can use public transportation, public libraries, and use public services. Identity in "the system" means access to critical public infrastructure owned in common by the citizenry, held in trust and managed for the people by the "current administration".

Thus, people may contract with vendors to obtain access to the telephone system, access to cable systems, to banking systems, or other service systems, and particularly, access to the Internet. Vendors Mint Artificial Identifiers 500.2 after either No Authentication 500.3 or Authentication 500.4, which assigns a User ID/Password 500.6, that gives Access 600.19 to Vendor Service Providers 500.7.

Layers 500.5 includes the growing number products and services from Authentication Schemas, and Authentication Products, to Privacy and Security Products and Certificates, Federation Partners, and Web Services.

Once access identity is established, and User ID/Password 500.6 formalized, users can access their accounts, buy, receive vendor service. In the case of the Internet, access is to the larger marketplace of Vendor Service Providers 600.7. Part 600.7 signifies participation in the economy, which is the desired end step.

FIG. 55 Web Services Vendor Mint Access Process

The Internet is fast becoming the only system as more and more business is conducted electronically through ever widening arrays of devices and exponentially increasing volumes of transactions. Identity Federations afford business many interoperability improvements, including participation in one system of unique identifiers. Just as universal utility is achieved through UR-URL Identifiers 101.1 for everything, so business partnerships in supply chains achieve the same utility but on a smaller scale.

New Web Services Vendor Mint Model Flow Diagram 512 depicts instantiation 101.4 preceding identity 101.2.2 followed by Vendor Trust Provider 500.8, such as Liberty Alliance and UDDI, which relies on Authentication By Vendor 500.4 and Layers 500.5 of authentication products and services, culminating in Vendor Mint Artificial Identifier 500.2 and Access 600.19.

An important distinction of this flow process as compared to flow processes 511, 513, and 514 is shown in the sub-loop through Vendor Authentication 500.4 and Vendor Anytime Authentication 500.9. to Vendor Service Provider 500.7. In the new federated web services model, vendor partners serve as Trust Providers and authenticate identities for their partners, supply chains, and customers.

Official Authentication 104.2 is missing. Moreover, the anytime authentication necessary to conduct online transactions bypasses the user altogether.

FIG. 56 Worst Case Future Vendor Mint Access Process

The only thing worse than vendor trust providers owning private identity is depicted in Worst Case Future Vendor Mint Model Flow Diagram 513. Diagram 513 is identical to Diagram 512 as regards the flow from 101.4.1 to 101.2.2 to 500.8 to 500.2 to 600.19 to 500.7.

As noted, the difference is in the sub-loop through Official Authentication 101.4.2 and Official Anytime Authentication 101.4.3. The user is again bypassed, but this worst-case scenario shows vendors interacting directly with official authentication processes, positioning vendors squarely between citizens and their government.

FIG. 57 Present Invention Access Process

Present Invention Owner Self-Mint Flow Diagram 514 depicts instantiation 101.4 preceding identity 101.2.2 followed by Official Authentication 101.4.2 provided directly to the user-maker-owner making a claim to Mint Real Identifier 500.1 in Model of Everything's 1000 public domain. User-maker-owners may Access 600.19 the Internet and Vendor Service Providers 500.7, as well as initiate Official Anytime Authentication 101.4.3 to vendors.

FIG. 58 Access Process Comparison

FIG. 56 shows all four flow process diagrams, 511-514 aligned for comparison. The distinction between authentication steps is significant. Without self-minting, the only choices are vendor mints or a national mint, owned and controlled by the government. Without the present invention, the worst is inevitable with vendors churning out privacy solutions as fast as government is automating vital public domains.

FIG. 59 Direct Ownership Process Components

FIG. 59 illustrates detail in Current Embodiment Flow Process 511.

Our current analog system is a system based on Private Ownership 500.10 of Real Identity, Real Property, Personal Property, Tangible Property, Intangible Property, and Intellectual Property.

500.11 We are owners in common with Public Infrastructure Ownership 500.11 of Public Property, including but not limited to Public Resources, Public Broadband, Public "Hot Spots", Public Television Broadcast, Public Radio Broadcast, Public Library System, and Public Mail System.

500.12 We have Privately Owned Systems 500.12 including but not limited to Computers, Monitors, CPU/OSes, Storage Media, Peripherals, and Software Licenses that are our private property.

500.13 We also own Access Devices 500.13 such as Cell Phones, Landline Phone, Walkie-Talkie, Television, Radio, Ham Radio devices, Broadband devices, GPS Receivers, and Satellite Dishes.

500.14 We have service contracts with Access Vendors 500.14 including but not limited to Phone Company, Cable Company, Wireless Company, Cellular Company, Internet Company, Satellite Company, Digital Audio Company, GPS Company, Broadband Company, and Mail Delivery Company.

500.15 Vendors use customer identity as Access Means/ Control 500.15 which takes various forms including but not limited to Phone Number, User/Account Number, Wireless Number, Cellular Number, User ID/Password, User Name/Account Number, User/Account Number, and Name/Account Number.

500.16 Users buy and own products, and rent access and services from multiple vendors in a competitive marketplace with individual Service Contracts 500.16 made between user-maker-owners and individual vendors for specific uses.

FIG. 60 Intermediary Ownership Process Components

In the New Web Services Vendor Mint Model 512, there is Vendor Infrastructure Ownership and Control 500.17 in Television, Radio, Broadband, Telephone, Internet, Cable, Optical Cable, Cellular, and Microwave. The new model relies on early obsolescence of vendor-dependent devices with vendor embedded controls and single-vendor operating instructions. The new model actively promotes Rented Hardware and Access Devices 500.18 including but not limited to Rented Access Hardware, Proprietary RF Receivers, Proprietary Cable Receivers, Proprietary Satellite Receivers, Proprietary Broadband Receivers, Proprietary Digital Audio Receivers, Proprietary GPS Receivers, Proprietary Data Receivers, Rented Identity, Rented Web Software Services Access, Rented Web Service Product Access, Rented Web Service Time Access, Rented Web Service Data Storage Access The new Access Vendors 500.19 are Identity Federations, who use Federated Identity for Access Means and Control 500.20 that establish Vendor Control of Private Identity, Vendor Control of Private Information, Vendor Control of Private Devices, and Vendors Between Citizens and Government. In place of many service contracts with many vendors, the new model is Federated Web Services 500.21 and their product is Trust, embodied as Communication Services, Authentication Services, Privilege Management Services, Security Services, Application Services, Directory Services, Hosting Services, and Search Services, all in one Membership Contract and End User License Agreements (EULA's) with One-Sided and Hidden Terms and Conditions, and Personalization with User Profiling/Data Mining and Content Pre-Screening/Filtering.

FIG. 61 Ownership Process Components Comparison

FIG. 61 illustrates the differences between Owner System—Individual Ownership—Direct Access 515, comprised of the Current Embodiment Flow Diagram 511 enhanced by the Present Invention Owner Self-Mint Flow Diagram 514, and the New Web Services Vendor Mint Model Flow Diagram 512.

The New Web Services Vendor Mint Model 512 is based on the unsupportable premise of vendor ownership of private identity, and, absent alternative, will place Middle-Men 500.24 between Citizen 500.22 and Government 500.23, where the Present Invention Owner Mint Model 514 sustains and builds upon the fundamental covenant between Government 500.23 and Citizens 500.22.

The current embodiment is a real world analog system based on private identity ownership. The Internet embodiment and its evolving new form, Federated Web Services 500.21, replicates the real world as an electronic system based on vendor identity ownership. This is a hugely significant shift in premise. The resultant Vendor Mint Model 512 requires Layers 500.5 of authentication products and services to correct problems created by artificial identity in the first place. A system of artificial identities cannot sustain anything, much less everything. The electronic version of "The System" must be as real as its analog original. The economy depends on it.

The present invention corrects fundamental flaws in the current electronic embodiment by providing method, means, and apparatus based on private identity ownership, thus bringing the electronic replica into alignment with its analog original.

VI Web Portal to Everything View 5

FIG. 62 Web Portal to Everything Components

The components of Web Portal to Everything 106 are: UR-URL Identifier Method 101, Platform for Everything 105 including all parts, Navigation Bar With Links 600.3, COTS or Open Source Web Page Software 600.9, COTS or Open Source Browser Software 600.10, Frames With and Without Content 600.18, and Access 600.19.

FIG. 63 Web Portal View

FIG. 63 illustrates a common web portal form apparatus made up of COTS or Open Source Computer System 600.1, Navigation Bar With Links 600.3, COTS or Open Source Web Page Software 600.9, COTS or Open Source Browser Software 600.10, Frames With and Without Content 600.18, and Access 600.19.

FIG. 64 Unitary Web Portal

Web Portal to Everything 106 is made up of a common web portal form apparatus as shown in FIG. 63, and made up of 600.1, 600.3, 600.6, 600.9, 600.10, 600.18, and 600.19, plus Unitary components 101, 104, and 105 which include Unitary Shell 601, Unitary Ontology 300, and Unitary RDF 400, not called out separately in FIG. 64.

Web Portal to Everything 106 is depicted as a user view of computer monitor with Platform for Everything 105 open in the background to Database of Everything 104, and with a Web Portal to Everything 106 browser frame open in the foreground.

Web Portal to Everything 106 embodies Model of Everything's 1000 cumulative aggregation of unitary components: Unitary Reference Architecture 100 with UR-URL Identifier Method 101, List 102, Table 103, Database 104, Platform 105, and Web Portal 106 to Everything, including Unitary Ontology Architecture 300, Unitary Resource Description Framework 400, Unitary Process Architecture 500, and Unitary Apparatus 600.

Web Portal to Everything 106 is Model of Everything's 1000 electronic replica of our global network of information, transportation, and telecommunications systems—all systems in one system, replacing many systems of artificial access identifiers with one system of universal real identifiers minted by citizens, owned by citizens, controlled by citizens, authenticated as in analog by citizen's official channels, and used by citizens to identify person and property during the course of self-representation in democracy and participation in the economy. Web Portal to Everything 106 is apparatus in all dimensions.

FIG. 65 Sample Web Portal to Everything Page 1

FIG. 65 depicts a sample Web Portal to Everything 106 page made up of 600.1, 600.3, 600.6, 600.9, 600.10, 600.18, and 600.19, 601, 101, and 104 with Frame Contents 600.18 illustrating Database of Everything 104 as might be accessed by a user looking for information, information which in this and subsequent samples corresponds to examples given in the specification about homes in Podunk County.

FIG. 66 Sample Record 1

FIG. 66 illustrates a sample Model of Everything 1000 object record such as would correspond to an Official Record of Ownership 414.1.

FIG. 67 Sample Record 2

FIG. 67 illustrates a sample Model of Everything 1000 object record such as would correspond to an Individual Public Claim 414.2.

FIG. 68 Sample Record 3

FIG. 68 illustrates a sample Model of Everything 1000 object record such as would correspond to a Vendor Claim 414.3.

FIG. 69 Sample Record 4

FIG. 69 illustrates a sample Model of Everything 1000 object record such as would correspond to an Individual Update Record 414.4.

FIG. 70 Sample Record 5

FIG. 70 illustrates a sample Model of Everything 1000 object record such as would correspond to a Public Directory Record 414.5.

FIG. 71 Sample Record 6

FIG. 71 illustrates a sample Model of Everything 1000 object record such as would correspond to an Original Incept Claim 414.6.

FIG. 72 Sample Record 7

FIG. 72 illustrates a sample Model of Everything 1000 object record such as would correspond to an Official US Census Record 414.7.

FIG. 73 Sample Record 8

FIG. 73 illustrates a sample Model of Everything 1000 object record such as would correspond to a Personal Record 414.8.

FIG. 74 Sample Record 9

FIG. 74 illustrates a sample Model of Everything 1000 object record such as would correspond to a Personal Homepage 414.9.

FIG. 75 Sample Record 10

FIG. 75 illustrates a sample Model of Everything 1000 object record such as would correspond to search results for John Q. Public and 123 Palmy Way 414.10.

FIG. 76 Sample Records Summarized

FIG. 76 depicts a summary of Sample 414 records illustrated in FIGS. 66 through 75, Parts 101, and 414.1 through 414.9, as might be represented in Unitary Reference Architecture 100 tabular apparatus forms.

FIG. 77 Sample Web Portal to Everything Page 2

FIG. 77 depicts a sample Web Portal to Everything 106 page made up of 600.1, 600.3, 600.5, 600.9, 600.10, 600.18, and 600.19, 601, and 101, with Frame Contents 600.18 illustrating Table of Everything 103 as might be presented to as user as search results based on specification Samples 414 of records in Podunk County.

FIG. 78 Enterprise Record Examples

FIG. 78 depicts a summary of enterprise records as might be represented in Unitary Reference Architecture 100 tabular apparatus forms with UR-URL Identifiers 101 in a system that applies the principle of ownership in a business asset management context. Enterprise Summary Array 415 is made up of hierarchically related object records that represent hierarchical entity roles within an enterprise which "have" resources, relations, responsibilities, and other properties and values that each have identity object records in an enterprise model of Model of Everything 1000 and extended Unitary RDF 400.

Enterprise Summary Array 415 is made up of object arrays corresponding to Company 415.1, Component 415.2, Division 415.3, Department 415.4, Work Center 415.6, and Work Station 415.6.

FIG. 79 Enterprise Record Example Detail

FIG. 79 depicts the same enterprise information as depicted in FIG. 78, but with more and or different detail. Model of Everything's 1000 dimensional construct supports any level of granularity, as illustrated by comparison of FIGS. 78 and 79.

Enterprise Detail Array 416 is made up of object arrays corresponding to Corporation 416.1, Component 416.2, Division 416.3, Department 416.4, Work Center 416.5, Work Station 416.6, Resource 416.7, Role 416.8, and Process 416.9.

FIG. 80 Present Invention Part List Example

FIG. 80 illustrates the present invention's parts list as might be represented in Unitary Reference Architecture 100 tabular apparatus forms with UR-URL Identifiers 101. Part Number Array 417 shows correspondence between six terms required to describe parts and six terms of UR-URL Identifier Method.

Part Number Array 417 is made up of FIG. No/Path 417.6, Part No./UR-URL 417.1, FIG. Name/Owner 417.3, Part Name/Name 417.2, Sub-Parts/Keywords 417.5, and Parent Component/Authority 417.4.

FIGS. 81-92 Prototype Illustrated

The utility, practicality, and universality of the present invention may be most comprehensively illustrated in a prototype web portal. A model of records of claims of everything, including event objects and event assertions, could be made manifest in other media, and could be depicted with additional detail in both content and active object design. The UR-URL prototype is intended as an illustration only, simple and short, and as such is not intended to represent all possible illustrations.

The actual technical construction of the apparatus itself is elementary, compared to its principles of organization. It was designed only after the indexing and classification system had been developed. A model of everything is a lot of stuff to organize on a few pages. The ontology is the result of much consideration, and its simple framework is evident in the information groups and layouts.

The prototype UR-URL website apparatus was designed in 2001, in order to demonstrate functional utility. A second prototype front end was designed in March of 2002 in order to demonstrate commercial, social, and political utility. FIGS. 81/96 to 92/96 depict the original conceptual rendering.

Prototype Structure

Everyday persons may construct a functional version with COTS hardware and software, i.e. Microsoft Word Web Page Complete front end with linked Excel worksheet back end where records are added through an Excel template and Search performed with built-in "Find" functionality. Persons skilled in the art may construct functional versions with various COTS and proprietary authoring programs. Homepage views are sample depictions as might be developed and are intended to illustrate but not specify interface or application.

FIG. 81 Homepage 1

FIG. 81, Homepage 1, represents the initial web portal user interface. The purpose of Homepage 1 is to provide links to direct visitors to frequently asked questions, and to promote applications partners.

FIG. 82 Homepage 2

FIG. 82, Homepage 2, represents an overview of the web portal and its services.

FIG. 83 Homepage 3

FIG. 83, Homepage 3, continues the representation of the utility and functions of the web portal and its services.

FIG. 84 Homepage 4

FIG. 84, Homepage 4, represents a high-level graphical map of the web portal architecture.

FIG. 85 Homepage 5

FIG. 85, Homepage 5, represents the inclusion of generic terms of use and various policy statements, but does not stipulate contract language in entirety. The purpose of Homepage 5 is to illustrate conformance to typical web portal features. Details of such policies are inconsequential to the utility of UR-URL Addressing and indexing method.

FIG. 86 Homepage 6

FIG. 86, Homepage 6, represents an introduction to the commercial utility of UR-URL, providing general information about how applications may be considered. Groupings are intended to illustrate broad categories of technical functions.

1. "Official records" depicts UR-URL's utility as a compendium of record able public information and combines legal filings, product registration, birth and death recording, certifications and so forth into one system of official records of claims.
2. "Communications services" depicts UR-URL's utility as a compendium of global positioning and locating address protocols, and combines many address protocols for traffic control, voice and data telephony, and so forth into one system of addresses for routing communications and communications signals.
3. "Group services" depicts UR-URL's utility as a compendium of references, and combines directories, search engines, registries, cross-referenced multi-source personal profile data, and so forth into one system of addresses for correlation and integration by/with individual entities, groups, and/or their associated data.
4. "Data services" represents UR-URL's utility as an integration platform, and combines image mapping, synthesis, conversion, translation, correlation, projection, replication, reproduction, archival storage, and so forth into one system of unique control elements.

FIG. 87 Homepage 7

FIG. 87, Homepage 7, represents UR-URL's utility as a gateway for individual entities to connect with one another as well as to control how information about them is collected, stored, and disseminated. Homepage 7 depicts one future application that utilizes user-driven data mining and instant messaging technologies in real time, assigning addresses to information strings as specified by users for their own private information agent purposes. HomePage 7 does not stipulate all possible illustrations, rather is intended to show how technologies may be combined and integrated through the use of UR-URL addressing and indexing method.

FIG. 88 Homepage 8

FIG. 88, Homepage 8, represents the record registration function with classification options, and an automated form that shows relevant data fields and selections.

FIG. 89, Homepage 9

FIG. 89 Homepage 9, represents an overview of a typical search utility where public users may search the entire database. Sample pages are intended to illustrate general search functionality, and are not intended to stipulate all possible illustrations of search functionality. In the present illustration, anonymous searches are facilitated through the use of temporary UR-URL ID codes; simple and advanced search options enable selection specification.

FIG. 90 Homepage 10

FIG. 89 Homepage 9 FIG. 90, Homepage 10, continues the representation of a typical search function.

FIG. 91 Homepage 11

FIG. 91, Homepage 11, represents UR-URL's commercial utility where applications vendors' products and services correlated to UR-URL are accessed by the public.

FIG. 92 Homepage 12

FIG. 92, Homepage 12, represents UR-URL's utility an illustration of the value equation derived from public-private partnership. UR-URL addressing and indexing properties have universal applicability and as such provide an ideal standard nomenclature for linking individuals and vendors with disparate systems and data. Users require unique identification and desire convenience; vendors must provide unique identification and UR-URL provides convenience. Increasing needs for interoperability at every level can be met through natural three-way demand/supply partnerships, such as those illustrated in FIG. 92 Homepage 12, that generate value all parties.

FIG. 93 Alignment Between Components and Component Parts of Unitary Reference Architecture FIG. 93 shows the progressive development of Unitary Reference Architecture 100 components, beginning with UR-URL Identifier Method 101.1, which goes into List of Everything 102, which goes into Table of everything 103, which goes into Database of Everything 104 which goes into Platform for Everything 105 and Web Portal to Everything 106.

FIG. 94 Alignment Between Parts and Part Numbers of Unitary Reference Architecture FIG. 94 shows the relation between the Several Dimensional Views I-VI and the part number coding schema correlating components and parts 1000, 100, 200, 201, 202.1, and 201.2.

FIG. 95 Sample Embodiment Apparatus

FIG. 95 illustrates apparatus parts and part numbers used in descriptions and figures:

600.1 COTS or Open Source Computer System
600.2 Event Data
600.3 Navigation Bar With Links
600.4 Shell
600.5 COTS or Open Source Spreadsheet Software With Search and Hyperlinks
600.6 COTS or Open Source Database Software
600.7 COTS or Open Source Shell Software With Simple Tools
600.8 COTS or Open Source Predicate Logic Software
600.9 COTS or Open Source Web Page Software
600.10 COTS or Open Source Browser Software
600.11 Tabular Architecture Rows and Columns
600.12 Infinite Integration With UR-URL Identifier Method Scope
600.13 Infinite Range With Infinite UR-URL Identifier Method Scope
600.14 Finite Integration With Finite Identifier Method Scope
600.15 Variable Relational Tables
600.16 Finite Range With Finite Identifier Method Scope
600.17 Variable Columns
600.18 Frames With and Without Content
600.19 Access
600.20 Common Architectures
600.21 Vendor Ownership Web
600.22 Private Ownership Web
600.23 Website, Search Engine, and Directory of Everything in the Public Domain
601 Unitary Shell FIG. 96 Sample Embodiment FIG. 96 represents an embodiment of the present invention, Model of Everything 1000, with main components made up of Unitary Reference Architecture 100—made up of UR-URL Identifier Method 101, List of Everything 102, Table of Everything 103, Database of Everything 104, Platform for Everything 105, and Web Portal to Everything 106—, Unitary Infrastructure 200, Unitary Ontology Architecture 300, Unitary Resource Description Framework (RDF) 400, Unitary Process Architecture 500, and Unitary Apparatus 600.

VII Event-Oriented View—Architectural Dimensions

An event-oriented semantic data method, model, and resource description framework representing a system of information event claims. The present invention has the distinction that RDF Array (RDF Array 400) applies to events irrespective of embodiment type, also called event states (404.5), comprising Person (301.5), Property (301.6), Principle (301.7), and Transaction (301.8). The system may include a storage device configured to store a plurality of files and a file system configured to manage access to the storage device and to store file system content. In one embodiment, the semantic model may comprise tabular apparatus. In another embodiment, the semantic model may comprise predicate logic n-tuple statements and concept graphs. In other embodiments, the semantic model may comprise field labels for identifying, addressing, indexing, and organizing event records in digital and physical formats.

FIG. 97 Unitary Object Identity Array

Each object has a unique set of XYZT designations that correspond to an established standard "address" (many equivalent formats). UR-URL provides one common database field and one common nomenclature to describe the one thing that everything has in common—incept. When incept event location and time are stipulated in terms of maker-owner-discoverers' claims to origination and ownership, it's a unique name in recorded history and instantiation matches real-world legal standards. Geocoordinates are numbers which are not patentable but which are freely available for application, indeed many prior arts incorporate geocoordinates in object-oriented identifier schemas. The novelty and utility of the present invention derives from the combination of XYZT spacetime coordinates as one field of six in an event-oriented resource description framework. Because time is infinitely extensible to the extent that numbers are infinite, and because space is infinitely granular to the extent that numbers are infinite and universal, relative referential geocoordinates are also infinite and universal, therefore Unitary Object Identity Array and Unitary Event Identity Array are accordingly infinite and universal.

FIG. 98 Unitary Event Identity Array

Unitary Event Identity Array comprises Unitary RDF Array Part No. 400, which comprises a position description element (Identifier 401), a point description element (Identity 402), an observer description element (Origin 403), a specification description element (Agreement 404), a scene description element (Constituents 405), and a reference-body description element (System 406). Where the XYZT identifier field alone (401) differentiates each event from every other event, Unitary Event RDF Array's (400) particular six elements in combination comprise a unique identifier that differentiates each event description from every other event description. Multiple claims about same events share same identifiers but have different assertions, which represents a fundamental shift away from standard object oriented practice to an event orientation. The semantic model may be optimally represented in six terms for public systems (401-406), eight terms for enterprise systems (401-408), or in any combination of terms in addition to Identifier 401 for private systems, and in tabular, tuple, and other formats.

FIG. 99 Unitary Ontological Architecture

Each thing in |Everything| is defined by Albert Einstein, and also herein by the present invention, as an event. According to Unitary Top Level Ontology 301.1, event condition is either objective or assertive and event states are person, property, principle (idea), and transaction. Duality is resolved by symmetry in that event objects and event assertions share identity-identifiers. |Everything| comprises claims—assertions of event description—claims are incept events. Unitary Top-Level Ontology sets terms for instantiating event condition, state, and class. Unitary Integrated Ontology 309 has extensible primitives in 4-D: concept, point, event, object.

FIG. 100 Unitary Apparatus Structure

The most common apparatus of information systems are tables and lists. Information architecture specifies how entries are identified, described, and related. The "container materials" to "make" a table apparatus are rows and columns. Utility depends on how well the column field labels, known as Resource Description Framework (RDF), are designed to capture shared attributes of list objects.

FIG. 101 Unitary Event RDF Architecture

Semantic information architecture specifies data kinds and organization. The only mandatory element is the unique identifier. System size is limited by the quantity of identifiers available. Common identity algorithms are finite; Unitary Identity is not.

FIG. 102 Comparison With Common Architectures

Standard object oriented practice is many different systems and different architectures. Common architectures typically segregate by data type and/or use because each type of resource has its own particular terms of description. A phone directory of people has columns for name, address, zip code, and phone number; a sales database has fields for product names and details; and an equipment listing has columns for model numbers, sizes, capacities, cycle times, and so forth.

FIG. 103 Integration with Common Architectures

You can merge tables as long as each element in the combined list has its own unique identifier, but the description fields can rarely be mapped directly one-to-one. Equipment doesn't have zip codes and people don't have sales prices but the new combined table has to have both fields. You end up with way too many columns. Integration with common architectures takes many fields. Integration with Unitary Event Architecture (UEA) takes only six fields, the minimum to uniquely differentiate, describe, and discover each event.

FIG. 104 Event Oriented Semantic Structure Illustrated

414 Samples [FIG. 76] with circles superimposed illustrate multiple event claims sharing same identifiers. Common semantic architectures would show only one record per unique identifier. Boxes superimposed illustrate two claims for the same event, the listing of a home. Realtor identifier is not the owner's property identifier but the transaction date/time is the same. The XYZ's are different but the T is the same.

FIG. 105 Enterprise Information Asset Embodiments

The present invention reduces "big data" management to simplest terms and processes with one information architecture for the entire complement of enterprise resources regardless of product, service, function, resource type, or corporate organization. Every file, folder, document, and user—every activity, system, operation and element—every keystroke—is an event that can be instantiated as either Person, Property, Principle, or Transaction, and furthermore can be listed and directorized with six universal terms of description. Business isn't always tidy—things change—change happens to individual resources, and to groups and types of resources—new conditions are just new tags and values FIG. 106 Enterprise Information Asset Ownership Ownership scales from people to policy to process to product—it's the most common basis for fiscal accountability, i.e. roles from top-to-bottom own resources, scopes of work, and budgets—"who owns what" is the key criterion and the key operator is "has" ("∩").

FIG. 107 Sample Enterprise Information Asset Functions

Using eight fields for enterprise records more closely aligns with business functions where resources and roles are commonly defined in those terms. This illustration [Table 2 with colloquial terms added] shows sample "Has Category" fields that might be used in an enterprise information asset management event system database. Each superclass represents a union set [Identifier ∩ Set (Code, Value)(Code, Value) . . . ] where codes are class, category, and type labels drawn from the ontology and values are object-specific properties and attributes.

FIG. 108 Enterprise Information Asset Management

Resources are manpower, materials, and methods (or people, property, principles). Activity is a transaction with an identifier, name, owner, authorizing instrument, path, and keywords that specify predecessor and successor relations. A Critical Path Network with the "where" and "when" resources will be deployed already embedded in the identifiers is particularly useful for enterprise applications.

FIG. 109 Comparison Between Webs

The current version of our web has layers of intermediaries between users and the policies and standards that determine what information they can view, how much information they can exchange, and who they can share with.

We have vendor ownership and control of private identity. We want public access to our public resources—our bandwidth, our airwaves, our public records, our public infrastructure. We want real world principles of private ownership applied in the digital version of our socio-economic systems. We want autonomous control of identity and information assets FIG. 110 Exemplary Embodiment—Unitary Semantic Web An Exemplary Embodiment is framed as an independent global public information systems network and semantic web with searchable online directory and registry of incept event ownership claims made by owners about their person, property, ideas, and transactions. The components of Unitary Semantic Web include an information system (600.24) likened to prior art systems (FIG. 60) such as AOL, UDDI, Liberty Alliance, Yahoo!, Google, et al. (512), delivered in a common semantic web service portal apparatus (600) using common commercial off the shelf hardware, software, and storage media (600.1), common public accessibility infrastructure (600.19), common search engine utility (600.5), common online browser interface (600.10), and common tools (600.3 through 600.11), to make an information system (1000) for users that features a phone-book-like directory (FIG. 65) of user-maker-owner-published (FIG. 61) searchable, sortable, updateable, discoverable information records (600.2).

Present functional capacities and unique interoperational synergies are achieved through specific combination of specific architectural components defined in the present specification and depicted in present drawings, comprising:
a) the precise definition of the network system identity (information incept-origination events) (1000)
b) the capacity of the specific identity criterion defined (incept-origination claim) (100)
c) the capacity of the specific organizing basis defined (incept-origination event ownership) (200)
d) the capacity of the specific ontological structure defined (derived from relativity) (300)
e) the capacity of the specific field labels defined (derived from synthesis) (400)
f) the capacity of the specific addressing schema defined (incept origination event coordinates, in any of numerous equivalent standard formats) (100, 500, 600)

All subcomponents are required to make each component and all components are required to make the present invention. No prior arts have all present components, and no prior arts employ components in present combination to present purpose or with present resultant combined functionality or utility.

FIG. 111 Block Diagram of Computing Module

A depiction of a typical computing module which might contain but is not limited to such elements as Bus 703, Processor 704, Memory 708, Storage Devices 710, Media Drive 712, Media 714, Storage Unit I/F 720, Storage Unit 722, COMM I/F 724, and Channel 728.

FIG. 112 Block Diagram of Labeling Process

The process of labeling (Part No. 740) an unlabeled event (Part No. 740.1) may be performed by non-transitory computer executable program code (Part No. 740.3) configured for receiving (Part No. 740.2) the representation of an unlabeled event, and labeling (Part Nos. 740.4-740.7) it with ontological primitive terms (Part No. 309) according to Relative Event Ontology (Part No. 302) with point, reference-body, observer, position, scene, and specification descriptive elements, and according to Unitary Event Ontology (Part No. 301) with person, property, principle, or transaction state or class elements, and then storing (Part No. 740.8) the labeled event in non-transitory computer storage medium (Part No. 740.9).

FIG. 113 Sample Listings of Claims to Event Ownership

Unitary Reference Architecture defines and applies UR-URL relative referential geotemporal xyzt coordinates as unique resource identifiers (URI) within a claims-based system of incept ownership event records. Thus constrained UR-URLs can function as all-purpose identifiers applicable to not only physical geography and geo-information, but also to people, things, ideas, and activity, as well as the transactions that formalize agreements about them—everything—all events in everyday life. Events are either objective or assertive, that is, things or ideas. Framed as claims to event incept ownership, people can associate their person, their property, their principles (ideas, values, opinions, thoughts, etc.), and their interactions with the time and location of the occurrence.

Sample Labeled Claims (Part No. 750) comprises a selection different claims (Part Nos. 750.1-750.5) illustrative of events that may be described, listed, labeled, and integrated with Unitary Reference Architecture's UR-URL Identifier Method (Part No. 101).

Subcomponents grouped by topic name. Part No. 750.1 Rock Concert shows how many different claims about the same event can share the same identifier—same location, same time, in this case, the concert location and date/time. Part No. 750.2 Human Thinking shows how Person 1 can claim his own ideas himself, and at the same time have a physical monitor that reports sensor data about Person 1's state of satiety to a vendor, who presumably analyzes his state of being. Part No. 750.3 shows different claims about the event of Sky from different makers at different locations and times. Part No. 750.4 is a particularly interesting example. It shows that where many people believe in God, and many churches have perspectives on God, as to the permanent public record, the existence of God is a claim with different makers and positions. Part No. 750.5 also speaks to a domain not commonly thought of as serious or recordable, yet fortune telling certainly can be captured as claims to event ownership, again different makers and positions. Part No. 750.6 rounds out the example with detail from a hypothetical fortune telling website, a la Madame Cleo—Call Me Now! These represent internal company records and have identifiers keyed to parent, same base but different extensions.

Mme Cleo's products/services are Tarot Readings and P2P consultations. Tarot is a system that draws conclusions about a subject by accessing, sorting, selecting, and combining various sets of event attributes as revealed on cards during the "reading" process. Mme Cleo's corporate information assets are well defined. Tarot is a system of about 50 elements in three classes (Major and Minor Arcana, Archetypes), each with an assumed limit of 20 attributes, or qualities and characteristics. Each quality and characteristic may be considered discrete and definable in key words and other descriptive fields. Inference is drawn from user-selected card combinations. For the purposes of this illustration, two types of inference are possible: 1) inference from the individual cards taken in isolation, and, 2) additive value of individual pairs, triads, and in total. Each instance of inference may be associated with the element itself as additional discrete descriptions. Total quantity of uniquely differentiable list items is assumed to be around 1,000,000 records. This entire system of definitions and relationships can be defined, listed, labeled, and accessed pretty easily.

There is no mystery. First stage development efforts would include first formalizing her system of definitions, and then purchasing and loading each of the sets of definitions from the dozens of off-the-shelf books available through Barnes and Noble. Cross reference all of it, and you have a Tarot Search Engine. Once the back end database has been populated, and the portal front end is in place, all she has to do is add her URL to the commercials and start saying, "Log-on now for your free tarot reading . . . " In this simple application, users select either a personalized reading, which asks for some user specified parameters that add customization through choice of "layouts" and random or user specified card elements. Results are personalized and displayed for a fee.

Why would a fortune teller care about recording ownership of claims? What "property" would she register? She would record ownership of her ideas: the database elements, as a set of defined system elements that she invested time in gathering and making accessible are intellectual property. Each of the 1,000,000 individual discrete definitions (1, 1+2, 1+2+3 . . . ) is a claim of meaning. Cleo owns the concept, the system as a whole and the elements within the system. They are copyrightable, remarkable, and the system itself might be patentable.

Madame Cleo's internal database uses UR-URLs for customer ID numbers which corresponds to actual real people as research subjects. When Madame Cleo completes an electronic contract, there is a record of the user and the values generated for and about that user. It constitutes a snapshot in time of a conclusion and/or a prediction. Regular user feedback and updates constitute a growing knowledge base of testimonies—claims—as to whether the forecast was right or wrong. A series of entries could comprise a user profile that could be tested and validated. While "proof" hinges on personal interpretation and attestation, as responses are collected, studied, correlated, and refined over time, heretofore-unknown patterns could emerge with data analytics. One permanent ID provides an absolute reference point from which to confirm or disprove the systems' accuracy over time.

FIG. 114 Unitary Tools

Reference architecture means the identity metasystem—how all the individual elements in an information system are operationalized—principally, the unique identifiers. Reference architecture also refers to the descriptive terms and their structure as field names/column headers, and to the specified complement of standard data labels. These are the three essential ingredients for tables and databases.

The term Unitary Reference Architecture (Part No. 100) and acronym URA refer to the combined toolset comprising:
1. Unitary Identity Architecture (UR-URL Identifier Method (Part No. 101));
2. Unitary Infrastructure for foundational definition (Part No. 200);
3. Unitary Event Architecture/Resource Description Framework (UEA) for field names/column headers (Part No. 300);
4. Unitary Ontology Architecture (UOA) for data labels (Part No. 400);
5. Unitary Process Architecture for programming (Part No. 500);
6. Unitary Apparatus for delivery (Part No. 600).

FIG. 115 Concept Map

A concept map (or graph) is a diagram that depicts suggested relationships between concepts, which can be articulated in linking phrases such as "causes", "requires", or "contributes to". A concept map (or graph) is a graphical tool that designers, engineers, technical writers, and others use to organize and structure knowledge. FIG. 115 depicts one aspect of the present invention, the relation between Event, Claim, and Description.

LIST OF REFERENCE NUMERALS

| Part No. | Part |
|---|---|
| 1000 | Model of Everything |
| 1.1 | Principle |
| 101 | UR-URL Identifier Method |
| 101.1 | UR-URL |
| 101.1.1 | UR-URL Real Identifier |
| 101.1.2 | XYZT/GT Incept |
| 101.1.3 | XYZT/GT Now |
| 101.1.4 | XYZT/GT Extension |
| 101.1.5 | Other Extension |
| 101.1.6 | Other Address |
| 101.1.7 | Other ID Number (ID) |
| 101.2 | Name |
| 101.2.1 | Claimed Identity Name |
| 101.2.2 | Real Name |
| 101.2.3 | Real Identity |
| 101.2.4 | Named Identity |
| 101.2.5 | Title |
| 101.2.6 | Term |
| 101.2.7 | Other Designation |
| 101.3 | Owner |
| 101.3.1 | Claim Maker Owner |
| 101.3.2 | Functional Owner |
| 101.3.3 | Maker |
| 101.3.4 | Inventor |
| 101.3.5 | Discoverer |
| 101.3.6 | Parent |
| 101.3.7 | Legal Agent |
| 101.4. | Authority |
| 101.4.1. | Official Incept Authentication |
| 101.4.2 | Official Authentication |
| 101.4.3 | Official Anytime Authentication |
| 101.4.4 | Maker Affidavit Authentication |
| 101.4.5 | Witness Affidavit Authentication |
| 101.4.6 | Other Legal Authentication |
| 101.5. | Keywords |
| 101.5.1 | Coordinate Values |
| 101.5.2 | Point of Origin |
| 101.5.3 | Differential Quantity |
| 101.5.4 | Latitude |
| 101.5.5 | Longitude |
| 101.5.6 | Elevation |
| 101.5.7 | Date/Time |
| 101.5.8 | GT |
| 101.5.9 | Other Legal Designation |
| 101.6 | Path |
| 101.6.1 | Referential System |
| 101.6.2 | Parent System |
| 101.6.3 | GPS |

-continued

List of Reference Numerals

| Part No. | Part |
|---|---|
| 101.6.4 | Geo.Domain |
| 101.6.5 | USGS |
| 101.6.6 | Metes & Bounds |
| 101.6.7 | Others |
| 101.7 | Profile |
| 101.8 | Activity |
| 102 | List of Everything |
| 103 | Table of Everything |
| 104 | Database of Everything |
| 105 | Platform for Everything |
| 106 | Web Portal of Everything |
| 200 | Unitary Infrastructure |
| 200.1 | Information Reference Architecture |
| 200.2 | Civil Infrastructure |
| 200.3 | Information Infrastructure |
| 200.4 | Physical Infrastructure |
| 200.5 | Process Infrastructure |
| 200.6 | Economic Infrastructure |
| 201 | Unitary Scope |
| 201.1 | All Identities |
| 201.2 | All Information |
| 201.3 | All Objects |
| 201.4 | All Systems |
| 201.5 | All Domains |
| 201.6 | All Events |
| 202 | Everything Dimensions |
| 203 | Layers of Objects |
| 203.1 | Event Identities |
| 203.2 | Event Information |
| 203.3 | Event Objects |
| 203.4 | Event System Objects |
| 203.5 | Event Sub-System Objects |
| 203.6 | Object of Everything |
| 203.7 | Icebergs of Ideas |
| 203.8 | Mountains of Matter |
| 204 | Levels of Abstraction |
| 204.1 | Explication |
| 204.2 | Aggregation |
| 204.3 | Organization |
| 204.4 | Synthesis |
| 204.5 | Resolution |
| 204.6 | Unification |
| 300 | Unitary Ontology Architecture |
| 300.1 | Term.Primitive Entity |
| 300.2 | Term.Sub-Class |
| 300.3 | Term.Type |
| 300.4 | Term.Field |
| 300.5 | Term.Unity |
| 300.6 | Term.One |
| 300.7 | Term.All |
| 300.8 | Term.All In All |
| 301 | Unitary Event Ontology |
| 301.1 | Unitary Top-Level Ontology |
| 301.2 | Event |
| 301.2.1 | Condition, Objects |
| 301.2.2 | Condition, Assertions |
| 301.3 | Objects |
| 301.3.1 | State.Person |
| 301.3.2 | State.Property |
| 301.4 | Assertions |
| 301.4.1 | State.Principle |
| 301.4.2 | State.Transaction |
| 301.5 | Person |
| 301.5.1 | Class.Real |
| 301.5.2 | Class.Fictitious |
| 301.6 | Property |
| 301.6.1 | Class.Real |
| 301.6.2 | Class.Personal |
| 301.6.3 | Class.Intellectual |
| 301.6.4 | Class.Public |
| 301.7 | Principle |
| 301.7.1 | Class.Primitive |
| 301.7.2 | Class.Law |
| 301.7.3 | Class.Standard |
| 301.8 | Transaction |
| 301.8.1 | Class.Claim |
| 301.8.2 | Class.Function |
| 301.8.3 | Class.Action |
| 301.9 | Person.Real |
| 301.9.1 | Sub-Class.Sui Juris |
| 301.9.2 | Sub-Class.Non-Sui Juris |
| 301.10 | Person.Fictitious |
| 301.10.1 | Sub-Class.For-Profit |
| 301.10.2 | Sub-Class.Nonprofit |
| 301.11 | Property.Real |
| 301.11.1 | Sub-Class.Land |
| 301.11.2 | Sub-Class.Rights |
| 301.12 | Property.Personal |
| 301.12.1 | Sub-Class.Tangible |
| 301.12.2 | Sub-Class.Intangible |
| 301.13 | Property.Intellectual |
| 301.13.1 | Sub-Class.Instrument |
| 301.13.2 | Sub-Class.Information |
| 301.14 | Property.Public |
| 301.14.1 | Sub-Class.Environment |
| 301.14.2 | Sub-Class.Emblem |
| 301.15 | Principle.Primitive |
| 301.15.1 | Sub-Class.Singularity |
| 301.15.2 | Sub-Class.Force |
| 301.16 | Principle.Law |
| 301.16.1 | Sub-Class.Theoretical |
| 301.16.2 | Sub-Class.Statutory |
| 301.17 | Principle.Standard |
| 301.17.1 | Sub-Class.Definition |
| 301.17.2 | Sub-Class.Convention |
| 301.18 | Transaction.Claim |
| 301.18.1 | Sub-Class.Statement |
| 301.18.2 | Sub-Class.Contract |
| 301.19 | Transaction.Function |
| 301.19.1 | Sub-Class.Operation |
| 301.19.2 | Sub-Class.Office |
| 301.20 | Transaction.Action |
| 301.20.1 | Sub-Class.Act |
| 301.20.2 | Sub-Class.Obligation |
| 302 | Relative Event Ontology |
| 302.1 | Primitive.Position |
| 302.2 | Primitive.Point |
| 302.3 | Primitive.Observer |
| 302.4 | Primitive.Specification |
| 302.5 | Primitive.Scene |
| 302.6 | Primitive.Reference-Body |
| 302.7 | Event Potential |
| 302.8 | Statement of Principle - C1920 Einstein |
| 303 | Entity Ontology - C2000 Sowa |
| 303.1 | Term.Entity ( ) = $\top$ . |
| 303.2 | Term.$\top$ ( ). |
| 303.3 | Term.Independent (I). |
| 303.4 | Term.Relative (R). |
| 303.5 | Term.Mediating (M). |
| 303.6 | Term.Physical (P). |
| 303.7 | Term.Abstract (A). |
| 303.8 | Term.Actuality (IP) = Independent∩Physical. |
| 303.9 | Term.Form (IA) = Abstract∩Independent. |
| 303.10 | Term.Prehension |
| 303.11 | Term.Proposition (RA). |
| 303.12 | Term.Nexus (MP) = Physical∩Mediating. |
| 303.13 | Term.Intention (MA) = Abstract∩Mediating. |
| 303.14 | Term.Continuant (C). |
| 303.15 | Term.Occurrent (O). |
| 303.16 | Term.Object (IPC) = Actuality∩Continuant. |
| 303.17 | Term.Process (IPO) = Actuality∩Occurrent. |
| 303.18 | Term.Schema (IAC) = Form∩Continuant. |
| 303.19 | Term.Script (IAO) = Form∩Occurrent. |
| 303.20 | Term.Juncture (RPC) = Prehension∩Continuant. |
| 303.21 | Term.Participation (RPO) = Prehension∩Occurrent. |
| 303.22 | Term.Description (RAC) = Proposition∩Continuant. |
| 303.23 | Term.History (RAO) = Proposition∩Occurrent. |
| 303.24 | Term.Structure (MPC) = Nexus∩Continuant. |
| 303.25 | Term.Situation (MPO) = Nexus∩Occurrent. |

List of Reference Numerals

| Part No. | Part |
|---|---|
| 303.26 | Term.Reason (MAC) = Intention∩Continuant. |
| 303.27 | Term.Purpose (MAO) = Intention∩Occurrent. |
| 303.28 | Term.Absurdity (IRMPACO) = ⊥. |
| 303.29 | Term.Intermediate Category |
| 303.30 | Central Category |
| 304 | Object Ontology - SUMO Browser C2001 IEEE |
| 304.1 | SUMO Term Search |
| 304.2 | SUMO Term Results |
| 305 | Ontology of Origination C1875 Eddy |
| 305.1 | Term.Principle |
| 305.2 | Term.Mind |
| 305.3 | Term.Soul |
| 305.4 | Term.Spirit |
| 305.5 | Term.Life |
| 305.6 | Term.Truth |
| 305.7 | Term.Love |
| 305.8 | Term.All Knowing |
| 305.9 | Term.All Acting |
| 305.10 | Term.All Seeing |
| 305.11 | Term.All Being |
| 305.12 | Term.All Wise |
| 305.13 | Term.All Loving |
| 305.14 | Term.All Eternal |
| 305.15 | Term.All Substance |
| 305.16 | Term.Intelligence |
| 306 | Ontology of Dimension |
| 306.1 | I Purpose |
| 306.2 | II Value |
| 306.3 | III Concept |
| 306.4 | IV Matter |
| 307 | Integrated Ontology |
| 308 | Dimensioned Integrated Ontology |
| 309 | Unitary Integrated Ontology |
| 400 | Unitary RDF Array |
| 400.1 | Logic: Has |
| 400.2 | Set |
| 400.3 | Purpose |
| 400.4 | Aspect |
| 400.5 | Expression |
| 401 | Identifier |
| 401.1 | Logic.Has UR-URL |
| 401.2 | Set.Record |
| 401.3 | Purpose.Differentiation |
| 401.4 | Aspect.Uniqueness |
| 401.5 | Expression.Address |
| 402 | Identity |
| 402.1 | Logic.Has Name |
| 402.2 | Set.Register |
| 402.3 | Purpose.Designation |
| 402.4 | Aspect.Representation |
| 402.5 | Expression.Element |
| 403 | Origin |
| 403.1 | Logic.Has Owner |
| 403.2 | Set.Ontology |
| 403.3 | Purpose.Ownership |
| 403.4 | Aspect.Inception |
| 403.5 | Expression.Condition |
| 404 | Agreement |
| 404.1 | Logic.Has Authority |
| 404.2 | Set.Concordance |
| 404.3 | Purpose.Instantiation |
| 404.4 | Aspect.Legitimacy |
| 404.5 | Expression.State |
| 405 | Constituent |
| 405.1 | Logic.Has Keyword |
| 405.2 | Set.Taxonomy |
| 405.3 | Purpose.Classification |
| 405.4 | Aspect.Composition |
| 405.5 | Expression.Category |
| 406 | System |
| 406.1 | Logic.Has Path |
| 406.2 | Set.Architecture |
| 406.3 | Purpose.Integration |
| 406.4 | Aspect.Orientation |
| 406.5 | Expression.Domain |
| 407 | Resource |
| 407.1 | Logic.Has Profile |
| 407.2 | Set.Pool |
| 407.3 | Purpose.Utilization |
| 407.4 | Aspect.Eligibility |
| 407.5 | Expression.Class |
| 408 | Relation |
| 408.1 | Logic.Has Activity |
| 408.2 | Set.Model |
| 408.3 | Purpose.Operation |
| 408.4 | Aspect.Context |
| 408.5 | Expression.Union |
| 409 | Resource Description Matrix |
| 410 | Resource Description Synthesis |
| 411 | Logic |
| 411.1 | Bearer |
| 411.2 | Normative Agent |
| 411.3 | Condition of Obligation |
| 411.4 | Obligation |
| 411.5 | Sanction |
| 412 | ERP |
| 412.1 | Work Order/Scope of Work (SOW) |
| 412.2 | Constraints |
| 413 | Analog |
| 414 | Sample Records |
| 414.1 | Official Record of Ownership Sample |
| 414.2 | Individual Public Claim Record Sample |
| 414.3 | Vendor Claim Record Sample |
| 414.4 | Individual Update Record Sample |
| 414.5 | Public Directory Record Sample |
| 414.6 | Original Incept Record Sample |
| 414.7 | Government Record Sample |
| 414.8 | Personal Record Sample |
| 414.9 | Personal Homepage Record Sample |
| 415 | Enterprise Summary Array |
| 415.1 | Company Record |
| 415.2 | Component Record |
| 415.3 | Division Record |
| 415.4 | Department Record |
| 415.5 | Work Center Record |
| 415.6 | Work Station Record |
| 416 | Enterprise Detail Array |
| 416.1 | Company Record |
| 416.2 | Component Record |
| 416.3 | Division Record |
| 416.4 | Department Record |
| 416.5 | Work Center Record |
| 416.6 | Work Station Record |
| 416.7 | Resource Record |
| 416.8 | Role Record |
| 416.9 | Process Record |
| 417 | Part Number Array |
| 417.1 | Part Number - UR-URL |
| 417.2 | Part Name - Name |
| 417.3 | FIG Name - Owner |
| 417.4 | View Name - Authority |
| 417.5 | Sub-Parts - Keywords |
| 417.6 | FIG Number - Path |
| 500 | Unitary Processes Architecture |
| 500.1 | Mint Real Identifier |
| 500.2 | Vendor Mint Artificial Identifier |
| 500.3 | No Authentication |
| 500.4 | Authentication By Vendor |
| 500.5 | Vendor Layers Block |
| | Authentication Schemas |
| | Authentication Products |
| | Privacy Products |
| | Security Products |
| | Certificates |
| | Federations |
| | Web Services |

List of Reference Numerals

| Part No. | Part |
|---|---|
| 500.6 | User ID/Password |
| 500.7 | Vendor Service Provider |
| 500.8 | Vendor Trust Provider |
| 500.9 | Vendor Anytime Authentication |
| 500.10 | Private Ownership Block |
| | Real Identity |
| | Real Property |
| | Personal Property |
| | Tangible Property |
| | Intangible Property |
| | Intellectual Property |
| 500.11 | Public Infrastructure Ownership Block |
| | Public Resources |
| | Public Broadband |
| | Public "Hot Spots" |
| | Public TV Broadcast |
| | Public Radio Broadcast |
| | Public Library System |
| | Public Mail System |
| 500.12 | Owned Systems Block |
| | Computer |
| | Monitor |
| | CPU |
| | Storage |
| | Peripherals |
| | Software Licenses |
| 500.13 | Owned Access Devices Block |
| | Cell Phone |
| | Landline Phone |
| | Walkie-Talkie |
| | Television |
| | Radio |
| | Ham Radio |
| | Broadband Receiver |
| | GPS Reader |
| | Satellite Dish |
| 500.14 | Access Vendors Block |
| | Phone Company |
| | Cable Company |
| | Wireless Company |
| | Cellular Company |
| | Satellite Company |
| | Internet Company |
| | Digital Audio Company |
| | GPS Company |
| | Broadband Company |
| | Mail Delivery Company |
| 500.15 | Access Means Block |
| | Phone Number |
| | User Account |
| | Wireless Number |
| | Cellular Number |
| | User ID |
| | Name |
| 500.16 | Service Block |
| | Service Contracts |
| 500.17 | Vendor Infrastructure Ownerhsip Block |
| | Television |
| | Radio |
| | Broadband |
| | Telephone |
| | Internet |
| | Cable |
| | Optical Fibre |
| | Cellular |
| | Microwave |
| | Satellite |
| 500.18 | Rented.Proprietary Access Devices Block |
| | Rented Access Hardware |
| | Proprietary Cell Phone |
| | Proprietary RF Receiver |
| | Proprietary Cable Receiver |
| | Proprietary Satellite Receiver |
| | Proprietary Broadband Receiver |
| | Proprietary Digital Audio Receiver |
| | Proprietary GPS Receiver |
| | Proprietary Data Receiver |
| | Rented Identity |
| | Rented Web Software Services Access |
| | Rented Web Service Product Access |
| | Rented Web ServiceTime Access |
| | Rented Web Service Data Storage Access |
| 500.19 | Access Vendors Block |
| | Identity Federations |
| 500.20 | Access Means Block |
| | Federated Identity |
| | Vendor Control of Private Identity |
| | Vendor Control of Private Information |
| | Vendor Control of Private Devices |
| | Vendor Between Citizen and Govt |
| 500.21 | Federated Web Services Block |
| | Communication Services |
| | Authentication Services |
| | Privilege Management Services |
| | Security Services |
| | Application Services |
| | Directory Services |
| | Hosting Services |
| | Search Services |
| | Membership Contract |
| | End User License Agreement |
| | One-Sided Terms and Conditions |
| | Hidden Terms and Conditions |
| | Personalization |
| | Content Pre-Screening/Filtering |
| | User Profiling and Data Mining |
| 500.22 | Citizen |
| 500.23 | Government |
| 500.24 | Middle-Man |
| 501 | Event Identity Forms |
| 501.1 | Unitary Entity Identity Statement |
| 501.2 | Unitary Event Ownership Statements |
| 501.3 | Unitary Object Identity Statement |
| 501.4 | Unitary Event Identity Statement |
| 502 | Tuple Forms |
| 502.1 | Tuple Statement |
| 502.2 | Unitary Tuple Statement |
| 502.3 | N-Tuple Statement |
| 502.4 | Unitary N-Tuple Statement |
| 503 | Event Statement Forms |
| 503.1 | Unitary Forms |
| 503.2 | English Language Forms |
| 504 | Event Description Forms |
| 504.1 | Single Entry |
| 504.2 | Multiple Entry |
| 505 | Programmatic Forms |
| 505.1 | Resource Planning |
| 505.2 | Operations Sequencing |
| 505.3 | Binary Pairs |
| 506 | Diagrammatic Forms |
| 506.1 | Tree Diagram |
| 506.2 | Critical Path Method Diagram (CPM) |
| 506.3 | Cluster Diagram |
| 506.4 | Map Diagram |
| 507 | Menu Forms |
| 507.1 | Prior Art Menus |
| 507.2 | Prior Art Menu Expressions |
| 508 | Menu Synthesis |
| 508.1 | Twelve Programs - 105 Menu Objects |
| 508.2 | One Platform - 25 Menu Objects |
| 509 | Simplified Menu Forms |
| 509.1 | Program Objects |
| 509.2 | Menu Objects |
| 509.3 | Navigation Objects |
| 510 | Shell With Simplified Menu Forms |
| 511 | Present Invention Owner Self-Mint Flow Diagram |

-continued

List of Reference Numerals

| Part No. | Part |
|---|---|
| 512 | Current Embodiment Flow Diagram |
| 513 | New Web Services Vendor Mint Model Flow Diagram |
| 514 | Worst Case Future Vendor Mint Model Flow Diagram |
| 515 | Owner System Individual Ownership Direct Access |
| 516 | Renter System-Vendor Ownership-Vendor Control |
| 600 | Unitary Apparatus |
| 600.1 | COTS or Open Source Computer System |
| 600.2 | Event Data |
| 600.3 | Navigation Bar With Links |
| 600.4 | Shell |
| 600.5 | COTS or Open Source Spreadsheet Software With Search and Hyperlinks |
| 600.6 | COTS or Open Source Database Software |
| 600.7 | COTS or Open Source Shell Software With Simple Tools |
| 600.8 | COTS or Open Source Predicate Logic Software |
| 600.9 | COTS or Open Source Web Page Software |
| 600.10 | COTS or Open Source Browser Software |
| 600.11 | Tabular Architecture Rows and Columns |
| 600.12 | Infinite Integration With UR-URL Identifier Method Scope |
| 600.13 | Infinite Range With Infinite UR-URL Identifier Method Scope |
| 600.14 | Finite Integration With Finite Identifier Method Scope |
| 600.15 | Variable Relational Tables |
| 600.16 | Finite Range With Finite Identifier Method Scope |
| 600.17 | Variable Columns |
| 600.18 | Frames With and Without Content |
| 600.19 | Access |
| 601 | Unitary Shell |
| 600.20 | Common Architectures |
| 600.21 | Vendor Ownership Web |
| 600.22 | Private Ownership Web |
| 600.23 | Website, Search Engine, and Directory of Everything in the Public Domain |
| 600.24 | Information Systems |
| 700 | Computing Module |
| 703 | Bus |
| 704 | Processor |
| 708 | Memory |
| 710 | Storage Devices |
| 712 | Media Drive |
| 714 | Media |
| 720 | Storage Unit !/F |
| 722 | Storage Unit |
| 724 | COMM I/F |
| 728 | Channel |
| 740 | Labeling Process |
| 740.1 | Unlabeled Event |
| 740.2 | Receive Unlabeled Event |
| 740.3 | Non-Transitory Computer Executable Code |
| 740.4 | Label Event |
| 740.5 | Select Label |
| 740.6 | Which Label |
| 740.7 | Assign Label to Event |
| 740.8 | Store Labeled Event |
| 740.9 | Non-Transitory Computer Storage Medium |
| 750 | Sample Labeled Claims |
| 750.1 | Claims to Ownership of the Event of "Rock Concert" |
| 750.2 | Claims to Ownership of the Event of "Sky" |
| 750.3 | Claims to Ownership of the Event of "Human" |
| 750.4 | Claims to Ownership of the Event of "God" |
| 750.5 | Claims to Ownership of the Event of "Fortune Telling" |
| 750.6 | Claims to Ownership of the Event of "Tarot Website" |
| 760 | Unitary Technology |

DETAILED DESCRIPTION OF THE INVENTION

Overview

It isn't immediately obvious how an inventory control database and human resources database could have the same information structure as the financial transaction database and the document knowledge base. At the objective level these resources seem to be very different with widely differing properties and applications. But in abstraction everything in an information system—every file, every folder, every document, every record, every activity, every system, every object—every asset—is an event that can be listed and directorized with eight universal terms of description common to all resources (FIG. 34). Integration and interoperability, both internally and with clients and partners, depends on such correspondence in data structures and formats. The defining criterion is ownership, the cohering basis is incept identity, and UR-URL relative referential geotemporal coordinates are universal resource identifiers for all users and all uses. Identity is the platform.

The same architecture works for personal and civic systems too, but with six terms (FIG. 33). Value and distinction lie in breadth of public scope, not depth of private detail. The resultant directory looks like a big phone-book-like list of links to everything everyone needs to find in a simple table that everyone knows how to use. What you want is what you get Unitary Event Information Architecture

TABLE 6

Unitary Terms of Description

| ARRAY | IDENTIFIER | IDENTITY | ORIGIN | AGREEMENT | CONSTITUENT | SYSTEM | RESOURCE | RELATION |
|---|---|---|---|---|---|---|---|---|
| EXPRESSION | Address | Element | Condition | State | Category | Domain | Class | Union |
| ASPECT | Uniqueness | Representation | Inception | Legitimacy | Composition | Orientation | Eligibility | Context |
| PURPOSE | Differentiation | Designation | Ownership | Instantiation | Classification | Integration | Utilization | Operation |
| SET | Record | Register | Ontology | Concordance | Taxonomy | Architecture | Pool | Model |
| LOGIC | ∩ UR-URL | ∩ Name | ∩ Owner | ∩ Authority | ∩ Keyword | ∩ Path | ∩ Profile | ∩ Activity |

Note:
Table 6 data is represented in FIG. 31 Matrix of Ontological Terms

Overall Structure and Function

Items 200.1-6 comprise components of a global network of information communication systems. The components of the present invention are identified as sub-components of Unitary Technology, the name that expresses the universal utility of the main embodiment, Unitary Reference Architecture 100. Further sub-components 101 through 106 comprise alternate functional embodiments that extend utility. Infrastructure Components are illustrated in FIG. 6.

Unitary System Components

200.6 Economic Infrastructure: Principles of economics, exchange systems, metrics, markets, financials, communication systems, the Internet, the telephone system, media, devices, hardware and software

200.5 Process Infrastructure: Business methodologies, production systems, delivery systems, supply chain networks, media, devices, hardware and software.

200.4 Physical Infrastructure: All people, all property; all places, ideas, artifacts, objects, assertions; everything.

200.3 Information Infrastructure: Language, classification, representation, media, devices, hardware and software.

200.2 Civil Infrastructure: Principles of democracy, self-representation, ownership, rules, values, norms.

200.1 Information Architecture: Unitary Reference Architecture Universal Resource Identifier (URI)

100 Unitary Reference Architecture—URA Self-service single sign-on identity for all users and all uses.

101 Event Identity Model—Unitary Identity Architecture (UR-URL Identifier Method)

102 Event Information Model—Unitary Event System (List of Everything)

103 Event Object Model—Unitary Event Field Modeling Method (Table of Everything)

104 Event System Model—Unitary Event Integration and Network Architecture (Database of Everything)

105 Event Process Model—Unitary Event Programming (Platform for Everything)

106 Unitary Event Model—(Web Portal to Everything)

Taken in aggregation, this high-level list of components is intended to represent the full spectrum of scientific principles and technology currently governing the interpretation and application of identity as essential information architecture. Each domain of systems uses identity for varying purposes and applications. Systems within each domain have different architectures. There's overlap, but more difference than commonality in the numbering schemas. URA unifies all schemas and purposes with one method.

Example of Unitary Identity Applied

One Entity>Many Claims

One Claim>Many Entities

Let's imagine a unitary system contains all the public property records for Podunk County. You want to use the system to find a house to buy. You go to the search utility, enter the location coordinates for the neighborhood in question, and the search results screen pops up. It lists all the houses by street and owner, either way, or by keywords in the description. Each home may have more than one listing, more than one database address primary URA ID key (UR-URL).

The county property records will all be owned by, and show as the maker, PDC. The link to more information directs the browser to the PDC homepage. The primary key for each property would have as the URA an XYZT that has the latitude, longitude and elevation as the first three sets of code variables, and then the date and time of sale as the last set. Because this is an official public record, the format for the digits might be fixed; a "standard" for all addresses would probably use the US Geological Survey (USGS) system. This URA and record might look like:

| THE OFFICIAL RECORD OF OWNERSHIP SAMPLE - FIG. 66 | |
|---|---|
| UR-URL | N02649095.W08006333.E00040.10172000.133000 |
| Name | Record of single-family home ownership |
| Owner | PoDunk County Tax-Collector |
| Authority | Deed or Title Company; Has artifact |
| Keywords | Instantiation: Incept date/time/loc at closing; Has desc |
| Path | Web: pdc.fl.gov/records/titles |

The owner might also register the property in preparation for selling it. They want to be known as the owner, they want to be visible and locatable. So they register. The ID would be the same, because URA could use the standard format for the event object house. This is what would be same/different:

| INDIVIDUAL PUBLIC CLAIM SAMPLE - FIG. 67 | |
|---|---|
| UR-URL | N02649095.W08006333.E00040.10172000.133000 |
| Name | N02649095.W08006333.E00040.10172000.133000 |
| Owner | Public, John Q. and Public, Jane Q. |
| Authority | Web: pdc.fl.gov/records/titles |
| Keywords | Claim: Incept date/time/loc at closing; Has title, Joint |
| Path | Web: jqpfamily/homepage |

The real estate company might also register the same house on a commercial site. They don't want people to know who owns the house or where it is. They want the users to come to them. Their record would have a totally different initial URA based not on the piece of property, but based on the Real Estate Company's URA. They would not be registering the house as property, because they don't own it. They're registering the listing. The listing is their property and resides at their location in a file folder in the file room. The listing would look like this:

| VENDOR'S CLAIM SAMPLE - FIG. 68 | |
|---|---|
| UR-URL | S12345675.W22222333.E00050.04012003.108300 |
| Name | Listing for single-family home |
| Owner | Good Realty Company Inc |
| Authority | Listing 3333-456 |
| Keywords | Fl pool home; gated community; water view; 3% to selling broker; 3br; 2ba; FR; Bonus rm; 3CGrg; owner will carry 2nd |
| Path | Web: goodrealty.com/listings/homes/florida.htm |

Part of the contract with the realtor might stipulate that John add the realtor's link to his own registration record, or he would maybe set a flag in his mailbox that "read" the email and if it matched the keywords "house" "for sale," the email would go automatically (redirected) to the realtor and not John. Realtors don't like it when owners snag buyers directly. So John would go to the site, click on "Update record" and add the realtor's http to the LINK field. Now, John's personal record would look like:

| INDIVIDUAL UPDATE RECORD SAMPLE - FIG. 69 | |
|---|---|
| UR-URL | N02649095.W08006333.E00040.04012003.108300 (? T) |
| Name | N02649095.W08006333.E00040.10172000.133000 |
| Owner | Public, John Q. |
| Authority | Web: pdc.fl.gov/records/titles |
| Keywords | Now date/time/loc at record registration; Has agent, Good Realty |
| Path | Web: goodrealty.com/listings/homes/florida.htm |

Finally, the telephone company may also assign a URA "phone number" for the house. ATT "owns" the phone numbers now, they are the mint. They issue identifiers—phone numbers. Their method of formatting GPS signals might use an abbreviated system that's easier for users to remember. Instead of the whole standard longitude, they might use an alternate system like Geo Domain. It generalizes regions, like area codes, but they make sense to the location relative to the basic "standard." Imagine date formats, you can use Apr. 2, 2002 or 02APR02 and they mean the same thing, they're just different formats. And you can change the format at a click, convert. This means they are the same but different. This one uses: "minutes.degrees.tendegrees.geo."

Also, if it's a device, it may be fixed or mobile. The time signature is a constant string of location signals that correspond to where the device is. Technically, every minute (or billing increment) is a transaction at certain location. Transactions are grouped into units of "calls" between locations and numbers. So the phone company's internal database and directory record might look like this, if they used the Geo Domain method as an alternat referential ID format:

| PUBLIC DIRECTORY RECORD SAMPLE - FIG. 70 | |
| --- | --- |
| UR-URL | 2e33n.5e5n.2e10n.37e47n.1e5n.10e20n.E00040.10172000.133000 |
| Name | John Q. Public |
| Owner | Phone Co |
| Authority | Web: pdc.fl.gov/records/titles (which references maker and location) |
| Keywords | Web: jqpfamily.com/communication/access; Constraint, No solicitation |
| Path | Web: phoneco.com (where this record is) |

John Smith was originally registered as a dependent citizen entity at the time of his birth, which was witnessed by the hospital and authenticated by the local governmental agency that maintains vital statistics. His incept record would include standard information:

| ORIGINAL INCEPT CLAIM SAMPLE - FIG. 71 | |
| --- | --- |
| UR-URL | S00236666.E55555555.E00010.08011951.233022 |
| Name | NameFirst, John, NameMiddle, Q., NameLast, Public |
| Owner | Makers, Mary Q. Public nee Smith and Jack Q. Public |
| Authority | Witness, Web: goodhospital.com/records/contact.htm |
| Keywords | InceptLoc, S00236666.E55555555.E00010; Incept D/T .08011951.233022 |
| Path | Web: pdc.fl.gov/deptvitalstatistics/(where the authenticating artifact is) |

John Smith is an "object" in the USGOV system. This could be his personal URA for everything, if he wants. It's linked to a county or hospital registration of live birth or personal affidavit that "authenticates" his existence. The rest of the government's internal database fields can be anything, but this would be the public record displayed. It simply acknowledges that John Smith is a person with a name and a link. It is the URA for everything official.

This is not a system anyone can see or get into. It is the USGOV and it is behind firewalls. The public part of the public record is the name and URA ID. The USGOV records and other regional public entities are also registered and listed in the pubic domain with the following kind of entry:

| US CENSUS RECORD SAMPLE - FIG. 72 | |
| --- | --- |
| UR-URL | S00236666.E55555555.E00010.08011951.233022 |
| Name | John Q. Public |

| US CENSUS RECORD SAMPLE - FIG. 72 | |
| --- | --- |
| Owner | US Census Bureau |
| Authority | Web: pdc.fl.gov/deptvitalstatistics/(where the authenticating artifact is) |
| Keywords | Has (name, relation, gender, DOB, Latino Y/N, race) |
| Path | Web: us.gov/census/(where this record is) |

John Smith can also register himself, and this main person entry is what he chooses to reveal to the world. The URA is public. The information associated with it is limited to what the maker wants to put in the public record. Most people like to be in the phone book. They want to be found. Registering your self as an entity is a prerequisite to registering your property, but ATT can register your phone number and name as part of a whole phone book of people's phone numbers and names because they "own" the mint and information in it. Users can request exclusion, just like with regular user-owned personal data today.

| PERSONAL RECORD SAMPLE - FIG. 73 | |
| --- | --- |
| UR-URL | N02649095.W08006333.E00040.10172000.133000 (chooses home UR-URL) |
| Name | John Q. Public |
| Owner | John Q. Public |
| Authority | Affidavit |
| Keywords | No solicitation |
| Path | None |

Or John Smith might want to be found, so he might add to his record "Link" the device ID-phone number, or his homepage, or his business, whatever he wants. But just because the link is there and people can find his homepage, does not mean they can get into his personal private data behind that homepage. It might just have a "log on" screen for family members to see the photo's page, or a "sign-up here if you want me to receive your email" where he makes the people give HIM information before he'll accept the email. Whatever, this page is what he wants the world to see and know about him. His listing in might look like this:

| PERSONAL HOMEPAGE RECORD SAMPLE - FIG. 74 | |
| --- | --- |
| UR-URL | N02649095.W08006333.E00040.10172000.133000 (chooses home UR-URL) |
| Name | John Q. Public Homepage |
| Owner | John Q. Public |
| Authority | Affidavit |
| Keywords | PMP, CPF, project management; Resume: jqpfamily.com/resume.htm |
| Path | Voice/data Web: jqpfamily.com/communication/access (his routing program) |

Search Results Sample—FIG. 75

If someone wanted to find John Smith's phone number, they could search on the name John Smith and the following results would be displayed:

| | |
| --- | --- |
| Search: | John Q.Public |
| UR-URL | N02649095.W08006333.E00040.10172000.133000 |
| Homepage: | Web: jqpfamily.com/login.htm |
| Phone Co: | Web: phoneco.com/jqpfamily.com/login.htm |
| PDCFL: | Web: pdc.fl.gov/records/titles.index.htm |
| Search | 123 Palmy Way, City of Warmtown, County of Po Dunk |
| UR-URL | N02649095.W08006333.E00040.10172000.133000 |

-continued

| | |
|---|---|
| PDCFL | Web: pdc.fl.gov/records/titles.index.htm |
| Owner | Web: jqpfamily.com/login.htm |
| Agent | Web: goodrealty.com/listings/homes/florida.htm |

The beauty of a semantic web such as this is it anticipates the messy naturally evolving cross-referenced linkages across and between entities, domains, contexts, and applications around the world and in the universe at large. All exist harmoniously side-by-side in URA. At each location, unless you have the password and authorization to get in, you can't find out anything except his name and the URA number and the fact that he is listed as an element in each of these proprietary databases. If it is the ATT site, it would go right to the phone number URA and it would be displayed or say Unpublished, just like a paper phone book. If you went to the IRS site, it would not even let you search. If you go to county records homepage, you can search on name or URA of the property or the owner and get one record, the record you're looking for.

If they go to the realty website, there is only information about the house and the phone number of the real estate agent. If the searcher really wanted to, just like today, they could go to the county records and find the house, then go to the ATT site to find the phone number, or to the owner's site and find them or their agent. The point is to automate a public system, not make private systems public.

Information Architecture

An existing upgrade proposal for web infrastructure is the addressing method Geo Domain, which stipulates use of DNS to encode latitude/longitude for any element in a hierarchical n-tree. This is an alternate to the lon/lat architecture we use for navigation, and it has a different way of dividing up the grid:

Geo.Domain Method:
Minutes.Degrees.Tendegrees.Geo, e.g,
37e47n.1e5n.10e20n.geo

Digital Earth and W3C suggest identification using geographical coordinates in an abbreviated format. Unitary Technology is capable of accommodating this and all GPS formats. It is anticipated that ultimately one standard format will be adopted worldwide for telephony, and this one seems to have the most flexibility.

The examples shown are not intended to specify formats or specific code variations for particular applications. Rather, they seek to illustrate the flexibility with which individuals can manage the way information about them is represented in the systems of those they chose to do business with.

Operation—Main Embodiment

Ordinary Everyday Person

The present invention assumes current technology as would be known to an everyday person of reasonable intelligence and education that has a library card, computer, surfs the web, and watches the Discovery Channel. Unitary Reference Architecture is fundamental technology. It's big but simple.

URA is an combination identity-identifier-addressing-indexing business method for information system integration and control, and is not dependent on medium, just like "information" isn't. It's harder to do this manually, even though you can. An ordinary everyday person would buy a personal computer, big or small, doesn't matter, and select an operating architecture—such as one that's cheap or free like Unix or Linux, but Windows and Mac are OK too.

Common off the shelf components are assumed, so, it's reasonable to further assume no special understanding of computers or programming is necessary. The ordinary everyday person may know a little, or a lot, but whenever they hit a point where they need help, they get it, or hire a professional. Assumption of prior art functionality is captured in global terms and common narrative both for simplicity and because the present invention really is that simple. The way you do anything better, if it has to do with identity, is to take its old system of identifiers with limited intent, less capacity, and no universality, and instead use Unitary Reference Architecture and get unlimited unitary integration interoperability opportunities.

How To Make A Semantic Model of Everything Recorded

1. Reference Architecture

Take a piece of paper and draw six columns. Leave the first column blank.

2. Identity—Name—Point

In the second column, list all the things you know about. That's all the people, all the places, all the stuff, and all the ideas. It doesn't matter if you get everything the first time, you can add more later. You have to do that anyway, as new stuff happens. For now, just list all the names of individual things you can think of. Identity means what it is, its name.

3. Origin—Owner—Observer

In the third column, put the name of the person who owns each thing. Everything has an owner. People own themselves. Event ownership is what representation is all about. If it's a mountain or something you're not sure about, the country where it is probably owns it. Put them on the list. You can list great ideas using the inventors or discoverers as the owners. Everything known can be listed as an event. Even stuff that happens is owned by the people there. There would be lots of owners for the event "Super-Bowl." You might want to have just "Super-Bowl Broadcast" which is probably owned by the television network. Same thing with stuff. For your first version, you should probably have a few big mountains rather than a million little molehills. Just a suggestion. It's still a Model of Everything, just bigger clumps. You can break out the detail later.

4. Agreement—Authority—Specification

In the fourth column, put the name of the instrument or agency that corroborates ownership. Just because someone claims ownership doesn't make it so. This could be a deed, or birth certificate, or contract, or the Department of Vital Statistics, or county that maintains property records.

5. Constituents—Keywords—Scene

In the fifth column, put some keywords and phrases that describe the thing. If you want, you can just copy other lists of things like dictionaries and atlases. If you're using a computer, you can load the words in the second column in the first place. Saves a lot of time listing basics.

Also in this column, if it's a thing, put the address where it is. If it's a person, put the address where s/he was born, and the date and time they were born (or, the date and time the thing was bought, or made, or began or was discovered)

6. System—Path—Reference-Body

In the sixth column, put the path or address of each thing's governing system, the system it's in—the source of applicable standards and protocols.

7. Identifier—UR-URL—Position

Now we get to the part where it's particularly helpful if your list is in a spreadsheet or relational database. You can do this manually, but it will take longer. Your list is probably pretty big. Look at a map or use a hand-held GPS navigation tool to find the locational coordinates that match the physical addresses in column five. You could do this part faster with software package, probably inexpensively. Put these coordinates in the first column, and put the name of the GPS system in column six. Then, convert the incept dates and times to number-strings, and put those new numbers at the tail end of the first numbers in the first column. Even though today's GPS isn't exact to millimeters, it doesn't matter. All you need is one exact reference. Everything else is an offset. Use a measuring tape if you have to.

This is the identity address, or "identifier" or ID—the UR-URL. This is important. People and things have real incept identity. The real identity address is used as the UR-URL identifier. Just don't call these numbers identity. They are identifiers. It's a legal thing. All identifiers in a system must be unique, and these are. We're using the real Unitary Reference Architecture as our database reference architecture. We all know the math, so uniqueness is naturally maintained without central mints.

Once we have UR-URLs for everything, we can do anything. Like make more lists of stuff in groups. But we can also do a whole lot more.

8. Cross-References

Compare all the stuff's keywords in column five, and every time there's a match, put the UR-URL from column one of the thing that matches into the Keyword column. This will be lots of cross-references. The universe gets pretty messy after a while. So do databases. If the Keyword column gets too full, you can group them into some other columns.

9. Ontology

If you have a classification system, you can use that with the keywords to organize stuff according to things like science or public records or things that are red. Whatever. But the organizing only comes when someone wants to find something specific. The rest of the time, this is just a list and the basic order in its raw form is location, based on the number order of the UR-URLs.

10. Universality

If you want, you can put in some other columns, like maybe the code string that makes an elemental image or unitary waveform of the thing, but that would only be needed if you wanted to replicate it. That's not something you're probably going to do, so these few columns are pretty much all you need for a basic Model of Everything. You have all the stuff and all the people, and where there is ownership, a cross-link between their identifiers.

This is a Semantic Model of Everything Recorded. The reference architecture is the network. If anything new happens, it already has identity ready and waiting. Just use the identities as identifiers and add them in.

11. Product

It's really just a big Model of Everything and who owns it and where it is, cross-referenced to everything else—one set of event identities in one system that's already real, already verifiable, already a matter of public record. The thing that's new is who owns and controls access to the information. Here, like in life, makers do. Self-service identity makes digital self-representation possible.

How to Make a New Net with New Network Information Architecture (1) Construct a model of |everything| (1000) by creating a unique ur-url real identity-identifier for each event according to the steps a) claim ownership of a real event as is common everyday practice in the public domain b) identify the real event by name and/or symbols c) claim a real address of said real event d) claim a real event incept time of said real event e) relate term symbol "t" to "time" as is everyday practice f) relate the real event incept time value to symbol "t"

g) select any standard referential system and set of referential protocols from numerous standard referential systems commonly used with mathematical constructs and/or georeferencing applications h) relate term symbols "x", "y", and "z" to three dimensional vector coordinates as is everyday practice i) relate coordinate terms "x", "y", and "z" with terms "latitude", "longitude", and "elevation" respectively, as is everyday practice j) apply selected standard protocols to determine real three-dimensional vector coordinate values of the real event address k) associate said real event address values with real three-dimensional "xyz" vector coordinates corresponding to said real event address l) concatenate values "x" and "y" and "z" and "t" corresponding to said real event address, resultant "xyzt" combination comprising the unique ur-url real identity-identifier, and m) assign said unique ur-url real identity-identifier to said real event n) claim relation of said unique ur-url real identity-identifier to said real event as is common in everyday identity instantiation practice in the public domain o) secure official authentication as is common everyday practice p) publish claim to ownership of event identity as is common everyday practice q) repeat steps (a) through (q) for each event in all events.

(2) Construct a zero-dimensional model of |everything| (101) comprising constructing table apparatus with tabular architecture, column and rows, and making one column, and making an infinitely extensible number of rows, and cohering the infinitely extensible number of rows with one system of said unique ur-url real identity-identifiers according to the method and steps of (1), and placing one unique ur-url real identity-identifier for each event in all events, one per row in column one, such that each point of zero-dimension event potentiality in spacetime is represented by the particular ur-url with which it coincides.

(3) Construct a one-dimensional model of |everything| (102) according to the steps according to (2) with the addition of a second element comprising constructing a zero-dimensional model of |everything| according to the method and steps of (2), and making a second column, and listing in the second column names which represent identity of each real event claimed according to the method and steps of (1), and placing names one per row in correspondence with the particular ur-url real identity-identifier with which its claimed real address coincides, and continuing until each real named event is associated with the particular ur-url real identity-identifier with which it coincides according to the method and steps of (1).

(4) Construct a two-dimensional model of |everything| (103) according to the steps according to (3) with the addition of steps comprising employing commercial off the shelf or open source computer system, and using commercial off the shelf or open source spreadsheet software with search and hyperlink functionality, and making a one-dimensional model of everything according to the method and steps of (3) and adding columns, and assigning to additional columns, beyond ur-url column and name column, column field labels selected from the group consisting of owner, authority, keyword, path, profile, activity, and classifying named event properties with ontology terms, and describing named events by inserting particular values and properties in row cells corresponding to field labels for each named event, and creating hyperlinks between instances of particular events according to common everyday spreadsheet usage, and continuing until each named event is classified and/or described.

(5) Construct a three-dimensional model of |everything| (104) comprising the steps according to (4) with the addition of steps comprising employing commercial off the shelf or open source database software, and making a two-dimensional model of everything according to the method and steps of (4) and adding relational tables, and updating original real event records with new real-time event data, and using original claimed incept real xyz for each updated event, and using real event update activity real time as value related to "t", and concatenating new xyzt real event real identity-identifier ur-url, and assigning the new xyzt real event real identity-identifier ur-url to real event update activities in corresponding relational tables, and integrating any and all relational tables that share same ur-url real identity-identifier terms.

(6) Construct a four-dimensional model of |everything| (105) comprising the steps according to (5) with the addition of steps comprising employing commercial off the shelf or open source shell software with simple tools, and employing commercial off the shelf or open source predicate logic software, and making a three-dimensional model according to the method and steps of (5) containing said named real events relating to original event term identities defined according to the method and steps of (1) and which identities were related to all other real event identities according to the method and steps of (2) and which were listed by said real identity name and said real ur-url real identity-identifier according to the method and steps of (3) and which were described and classified according to the method and steps of (4), and which were associated in relational tables according to the method and steps of (5), and employing said ur-url real identity-identifiers as relation variables in standard programmatic forms, and creating programmatic sentences by specifying "words" of consisting of said ur-url real identity-identifiers that refer to and invoke by hotlink original terms and definitions contained in corresponding real event records, and creating sentences in english or any language by specifying said ur-url real identity-identifiers that refer to and invoke by hotlink original english or other language terms and definitions in corresponding real event records, and drawing pictures with "palettes" of said ur-url real identifiers that refer to and invoke by hotlink original programmatic objects contained in corresponding real event records, and assigning said ur-url real identity-identifiers to real hard drive and operating system event addresses, and creating activity schedules by linking real named event's predecessor and successor ur-url real identity-identifiers.

(7) Construct an all-dimensional model of |everything| (106) comprising the steps according to (6) with the addition of steps comprising employing commercial off the shelf or open source web page software with simple tools, and employing commercial off the shelf or open source browser software, and applying laws, rules, norms, conventions, and legal requirements corresponding to everyday analog institutions and instantiation processes, and making a four-dimensional model according to the method and steps of (6), and employing simple web page software to create website page text and graphics, and employing simple browser software to access website page text and graphics, and recording owned property and identity ownership claims according to the method and steps of (1) for instantiating new real event identity, and operating a web portal front end to deliver access to everything by everyone, and employing said ur-url real identity-identifiers in place of telephone communication identity addresses, and at the same time using said ur-url real identity-identifiers in place of internet identity-identifiers, domain addresses, and internet protocol addresses, and at the same time employing said ur-url real identity-identifiers in place of vendor account identity-identifiers, and at the same time employing said ur-url real identity-identifiers for official governance and participation process identity-identifiers owned by private citizens, and at the same time employing said ur-url real identity-identifiers in any and all capacities and instances where identity-identifiers are employed, and achieving universal interoperability by means of shared said system of said ur-url real identity-identifiers applied in constructs of zero to all dimensional product versions of the present invention.

How to Make an Operating System Information Architecture
1. Take a computer off the shelf
2. And some C++, or any semantic specification tool
3. Add URA
4. Assign identifiers to operating instructions the same way you do now
5. Assign identifiers to memory storage medium the same way you do now
6. Assign identifiers to data events the same way you do now, but use unitary event identifiers instead of other identifier methods, for everything in the whole system By using the same system of identifiers you use for event object identifiers also for memory address identifiers, you could eliminate one whole extra term—probably not as much as a thirty percent overall reduction in memory, but every byte counts. In the old computer information architecture, if you use real physical location, all the identifiers would always be unique, but they'd change every time you performed routine disk maintenance. You could maybe add a rule in the old reference architecture that kept track all the changes, but usually there's just another identifier. This way you always know what and where everything is.

But if your operating system information architecture uses the same URA referential method, code syntax, and nomenclature as the system of URA event objects, then the principle of symmetry would be invoked to the max. At its most primitive level, the system identifier is the object identifier is the object identity when object identifier used is its real microscopic location address in the computer. Now you have operating system information architecture.

How to Make an Event Oriented Programming Language
1. Take a box of Object Oriented Programming, and a box of Model Driven Architecture
2. Make a Model of Everything with the system identity: Event Object Oriented Programming
3. Construct programmatic instructional sequences by making mini-lists of executable identifiers.

Object Oriented Programming automates programming by clumping frequently used lists of instructions that do frequently needed operations into one reusable functional template or "object." Single operation objects can be connected to other objects to make bigger objects. A program is a bunch of objects in a certain order. Model Driven Architecture means bigger clumps for more functionality at higher and broader levels. Event object orientation is the next higher level of combination, followed by system event object, and unitary object. URA completes the object orientation evolution. Everything's a system object—an operation is an event object, a process is an event object, resources are event objects, terms and protocols—all event objects in one system.

Unitary Reference Architecture provides one unitary system of identifiers for all event objects. Writing a program is as simple as linking identifiers when the object and its identity and its location and it's assertion of utility are all referentially embedded in the unique identifier primary key code. Real referential geo-temporal mathematical coordinates are conveniently grouped and inherently indexed. The time vector provides a handy way to assign duration and sequence. Event identity inheres force and field, process and content, object and assertion and it describes, locates, differentiates, integrates, orders, directs, routes, and controls. Unitary programming tools and techniques also apply as method and means for simulation, replication, synthesis, and molecular models of systems of all sizes and complexities. A Model of Everything provides a larger construct for modeling event phenomena in whole-systems contexts.

Nanotechnology.

Reference architecture for a Model of Everything includes very small things too. The key aspect that makes this model not just bigger but dramatically different from the many partial models and modeling techniques used today is the fact that, with URA, event objects and event assertions share the same identity, and same identifier. This principle of symmetry between analog identity and digital identifier is especially useful in controlling nano-processes.

Broadly speaking, agents (miniature machine agents, biological agents, information agents) are controlled by software programs that consist of identified lines of code that first define the field and then establish the terms of relationship and interaction. Then, transactional instructions are applied to produce desired results. A typical transaction would consist of an identifier, an object name or description, and an operation, which itself consists of a process step and sequence or time. An operation might be as simple as "move object from one place to another in the system," or as complex as a group of software or machine compound objects that execute additional operations with other objects in the system.

A Unitary simulation would similarly define the field and establish terms of relationship and interaction. Once all points are addressed, the whole set of operating instructions would consist of a series of object addresses alone, where the address is XYZT/gt and applies to both the point and the object that occupies it along it's path of interaction. Thus, the object and the place where it's supposed to be as well as the time it's supposed to be there are all in the identifier. This is about as efficient as code gets. It concurrently leverages signaling technology by using real identity addresses as communication identifiers, plus models can be easily linked and merged without quantity constraints imposed by standard addressing methods. With huge quantities of nano-objects, every character counts. Inherent extensibility facilitates aggregation of subsections which may be constructed independently and assembled modularly.

Alternate Embodiments

Grid Computing
Unlimited grid addresses. Unlimited relative grid addresses.
Blade Technology
IBM Blade technology specifies a "fabric" of I/O addresses; URA provides fabric grid addresses, and a method of referential relative addresses.
Virtual Storage Solutions
Virtual storage theory links data stored in non-contiguous physical locations and simulates unitary configuration through address/ID code structure nomenclature. URAs addresses provide system unification at the identity level, making physical location constraints not only transparent but also meaningless. What coheres a system is its primary key identity definition.

Wireless Communication
In the future, mobile communication from multiple devices will connect more of us, where hard-wired infrastructure now predominates. URA provides identity for the caller, for the device, and for the transaction, thereby extending mobile wireless data capabilities for transaction management. Furthermore, URA provides a multiple-option schema for alternate telephone numbers themselves.

Short Message Systems
Theoretically, anyone could set up a COM business/phone company using their own URA identity addresses as phone numbers. This is more likely in the smaller domain of messaging; however, alternate national and global systems could be established.

Bar Code Adhesive Strips
With URA, individuals as well as corporations can easily track their property items with mini-lo-jack strips. Examples: personal home inventory, children, eyeglasses, pets, anything that gets lost, slap a sticky-back beeping strip with programmable address options that signals directly to the main system exactly where each and every item may be found. When the "thing" is children ("jewelry" or "accessory" tags), a national public record domain becomes a vital resource.

Governance, Secure "Public ID" Structure
URA is the only national ID schema that applies universally to all citizens of the world. It contains only demographically neutral information about claims to ownership specified voluntarily by makers.

Artificial Intelligence
Memory is just a stored event description. URA integrates complex systems of assertions as easily as objects. The identifier's time/location simplifies both linear and non-linear dynamics of conceptual relationship.

Miscellaneous Representational Whole-System Applications
Genetic Simulation/DNA Modeling Platform; Knowledge Base Management; Traffic Control; Directories/Registries, Inventory Systems; Emergency Healthcare Profiles, Cameras that capture grid addresses as real-time address identifiers with meta data.

Alternate Referential Addressing Method Embodiment
As an alternate embodiment and addressing schema for assigning referential addresses associated with a single entity or event address, UR-URL uses a modified Sierpinski carpet algorithm. In this embodiment, individual unique ID's are assigned relative to an original unique ID, in a manner that corresponds to the standard "make hole" method, starting with a square, dividing it into a 3-by-3 grid, and removing the center square; then repeating the process for each remaining square.$_{27}$ Referring now to FIG. 111, computing module 700 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 703, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 703 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD, DVD or Blu-ray drive (R or RW), or other removable or fixed media drive might be provided. Accordingly, storage media 714 might include, for example, a hard disk, a floppy disk, magnetic tape, cartridge, optical disk, a CD, DVD or Blu-ray, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system platform, comprising:
   a computer system comprising:
   a processor;
   a non-transitory computer-readable storage medium;
   a computer program product embodied on the non-transitory computer-readable storage medium;
   wherein the computer program product comprises COTS or open source shell computer-executable code and predicate logic computer-executable code;
   a registry and directory of UR-URL Identifier Method identity elements, the registry and directory being stored on the non-transitory computer-readable storage medium and taking the form of a database comprising a table having a plurality of rows and columns; and
   a unitary shell, comprising a utility platform that facilitates code writing with COTS or Open Source programming languages and object-oriented approaches, the unitary shell being stored on the non-transitory computer-readable storage medium;
   wherein the COTS or open source shell computer-executable code and predicate logic computer-executable code are configured to employ the UR-URL Identifier Method identity elements as programmatic variables in sentences, concept graphs, n-tuples, and spreadsheet functions.

2. The system platform of claim 1, further comprising a monitor, a COTS or open source computer system, and a web portal, the web portal comprising:
   a navigation bar with links; and
   frames with and without content and access;
   wherein the COTS or open source computer system comprises:
   COTS or open source web page software; and
   COTS or open source browser software; and
   wherein the COTS or open source computer system causes the web portal to be displayed on the monitor.

3. The system platform of claim 2, further comprising a host device that hosts the web portal and one or more client devices connected to the host device by a network, such that the client devices can access the web portal.

4. The system platform of claim 3, wherein the host device and the client devices connected by the network are configured to perform the steps of:
   receiving, at the host device, a request for access to the host device, the request received from the client devices;
   authenticating the identity of the client devices;
   granting the client devices access to the host device, for the client devices that are authenticated;
   initiating, in the client devices, a client request for registration of an owned event;
   submitting the owned event to the host device; and
   storing the owned event at the host device in a host non-transitory computer-readable storage medium.

5. The system platform of claim 4, wherein the host non-transitory computer-readable storage medium comprises a plurality of owned event descriptive elements so registered by clients, and wherein the host non-transitory computer-readable storage medium is accessible for searching by the client devices.

6. The system platform of claim 1, wherein the computer system is selected from the group consisting of a desktop computer, a laptop computer, and a notebook computer.

7. The system platform of claim 1, wherein the computer system is a hand-held computing device.

8. The system platform of claim 1, wherein the computer system is selected from the group consisting of mainframes, supercomputers, workstations and servers.

9. The system platform of claim 1, wherein the computer system comprises one or more removable storage devices.

10. The system platform of claim 4, wherein the host device and the client devices connected by the network are configured to perform the steps of:
    identifying the owned event using the UR-URL Identifier Method;
    storing the owned event in the database; and
    labeling a representation of the owned event in the database with at least one label of a set of labels according to an RDF Array to create a labeled owned event, the RDF Array comprising a resource description framework that unique identifies a description of the owned event from any other description of any other event, wherein labeling the representation of the owned event associates the representation of the owned event with at least one of the labels;
    wherein labeling the owned event comprises associating terms in the RDF Array with Unitary Ontology terms, and wherein the labeled owned event is submitted to and stored at the host device.

11. A computer-implemented method, comprising:
    storing a registry and directory of UR-URL Identifier Method identity elements on a non-transitory computer-readable storage medium;
    configuring the registry and directory as a database, the database comprising a table having a plurality of rows and columns;
    facilitating, by a unitary shell comprising a utility platform stored in the non-transitory computer-readable storage medium, code writing with COTS or Open Source programming languages and object-oriented approaches; and
    employing the UR-URL Identifier Method identity elements as programmatic variables in sentences, concept graphs, n-tuples, and spreadsheet functions.

12. The method of claim 11, further comprising causing a web portal to be displayed on a monitor, the web portal comprising:
- a COTS or open source computer system having COTS or open source web page software and COTS or open source browser software stored thereon, wherein the COTS or open source computer system causes the web portal to be displayed on the monitor;
- a navigation bar with links; and
- frames with and without content and access.

13. The method of claim 12, further comprising:
- connecting, by a network, one or more client devices to a host device that hosts the web portal; and
- accessing the web portal using the client devices.

14. The method of claim 13, further comprising:
- receiving, at the host device, a request for access to the host device, the request received from the client devices;
- authenticating the identity of the client devices;
- granting the client devices access to the host device, for client devices that are authenticated;
- initiating, in the client devices, a client request for registration of an owned event;
- submitting the owned event to the host device; and
- storing the owned event at the host device.

15. The method of claim 14, further comprising registering a plurality of owned event descriptive elements in response to the client request, wherein the host device comprises the owned event descriptive elements registered, and wherein the owned event descriptive elements are accessible for searching by the client devices.

* * * * *